United States Patent [19]

Winston et al.

[11] Patent Number: 5,303,322
[45] Date of Patent: Apr. 12, 1994

[54] TAPERED MULTILAYER LUMINAIRE DEVICES

[75] Inventors: Roland Winston; Benjamin A. Jacobson, both of Chicago; Robert L. Holman, Naperville; Neil A. Gitkind, Chicago, all of Ill.

[73] Assignee: NiOptics Corporation, Evanston, Ill.

[21] Appl. No.: 29,883

[22] Filed: Mar. 11, 1993

Related U.S. Application Data

[63] Continuation-in-part of Ser. No. 855,838, Mar. 23, 1992, Pat. No. 5,237,641.

[51] Int. Cl.⁵ .............................................. G02B 6/26
[52] U.S. Cl. ..................................... 385/146; 385/43; 385/901; 385/129; 385/131
[58] Field of Search ................ 385/43, 129, 130, 131, 385/140, 146, 147, 901, 31; 359/599, 833, 834

[56] References Cited

U.S. PATENT DOCUMENTS

| | | | |
|---|---|---|---|
| 2,347,665 | 5/1944 | Christensen et al. | 362/31 |
| 2,712,593 | 7/1955 | Merchant | 362/27 |
| 3,617,109 | 11/1971 | Tien | 385/43 |
| 3,752,974 | 8/1973 | Baker et al. | 240/1 |
| 3,832,028 | 8/1974 | Kapron | 385/43 |
| 3,980,392 | 9/1976 | Aunacher | 385/43 |
| 4,059,916 | 11/1977 | Tachihara et al. | 40/130 |
| 4,111,538 | 9/1978 | Sheridon | 353/122 |
| 4,114,592 | 9/1978 | Winston | 126/270 |
| 4,161,015 | 7/1979 | Dey et al. | 362/263 |
| 4,176,908 | 12/1979 | Wagner | 350/96.15 |
| 4,212,048 | 7/1980 | Castleberry | 362/19 |
| 4,240,692 | 12/1980 | Winston | 350/96.10 |
| 4,257,084 | 3/1981 | Reynolds | 362/31 |
| 4,277,817 | 7/1981 | Hehr | 362/31 |
| 4,323,951 | 4/1982 | Pasco | 362/27 |
| 4,373,282 | 2/1983 | Wragg | 40/546 |
| 4,420,796 | 12/1983 | Mori | 362/32 |
| 4,453,200 | 6/1984 | Troka et al. | 362/31 |
| 4,528,617 | 7/1985 | Blackington | 362/32 |
| 4,547,043 | 10/1985 | Penz | 362/32 |
| 4,573,766 | 3/1986 | Bournsy, Jr. et al. | 350/345 |
| 4,618,216 | 10/1986 | Suzawa | 359/49 |
| 4,648,690 | 3/1987 | Obe | 350/321 |
| 4,649,462 | 3/1987 | Dobrowolski et al. | 362/2 |
| 4,706,173 | 11/1987 | Hamada et al. | 362/341 |
| 4,729,068 | 3/1988 | Ohe | 362/31 |
| 4,735,495 | 4/1988 | Henkes | 362/310 |
| 4,737,896 | 4/1988 | Mochizulki et al. | 362/301 |
| 4,747,223 | 5/1988 | Bonds | 40/219 |
| 4,765,718 | 8/1988 | Henkes | 359/49 |
| 4,799,050 | 1/1989 | Prine et al. | 340/765 |
| 4,799,137 | 1/1989 | Abo | 362/309 |
| 4,832,458 | 5/1989 | Fergason | 350/338 |

(List continued on next page.)

OTHER PUBLICATIONS

"Flat Panel Backlight Reflecting Device," R. L. Garwin and R. T. Hodgson, *IBM Technical Disclosure Bulletin*, vol. 31, No. 2, Jul. 1988, pp. 190–191.

"Dielectric Totally Internally Reflecting Concentrators" Xisohui, Ming, Roland Winston and Joseph O'Gallagher, *Applied Optics*, vol. 26, Jan. 15, 1987, pp. 300–305.

*Primary Examiner*—John D. Lee
*Assistant Examiner*—Phan Thi Heartney
*Attorney, Agent, or Firm*—Reinhart, Boerner, Van Deuren, Norris & Rieselbach

[57] ABSTRACT

An optical device for collecting light and selectively outputting or concentrating the light. A wedge layer has an optical index of refraction $n_1$, and top, bottom and side surfaces intersecting to define an angle of inclination d. A back surface spans the top, bottom and side surface. A first layer is coupled to the bottom surface of the layer and has an index of refraction $n_2$. The first layer index $n_2$ causes light input through the back surface of the layer to be preferentially output into the first layer. A second layer is coupled to the bottom of the first layer and selectively causes output of light into ambient. Additional layers, such as an air gap, can be provided adjacent to the wedge shaped layer. The wedge shaped layer can also have a variable index of refraction $n(x,y,z)$.

69 Claims, 23 Drawing Sheets

U.S. PATENT DOCUMENTS

| | | | |
|---|---|---|---|
| 4,838,661 | 6/1989 | McKee et al. | 350/345 |
| 4,842,378 | 6/1989 | Flasck et al. | 350/345 |
| 4,907,044 | 3/1990 | Schellborn et al. | 357/17 |
| 4,907,132 | 3/1990 | Parker | 362/32 |
| 4,914,553 | 4/1990 | Hamada et al. | 362/321 |
| 4,915,479 | 4/1990 | Clarke | 358/345 |
| 4,936,659 | 6/1990 | Anderson et al. | 359/49 |
| 4,950,059 | 8/1990 | Roberts | 362/32 |
| 4,958,915 | 9/1990 | Okada et al. | 350/345 |
| 4,965,876 | 10/1990 | Foldi et al. | 362/247 |
| 4,974,122 | 11/1990 | Shaw | 362/31 |
| 4,974,353 | 12/1990 | Norfolk | 40/447 |
| 4,985,809 | 1/1991 | Matsui et al. | 362/31 |
| 4,989,933 | 2/1991 | Duguay | 350/96.10 |
| 4,992,916 | 2/1991 | Henkes | 362/255 |
| 4,998,188 | 3/1991 | Degelmann | 362/147 |
| 5,019,808 | 5/1991 | Prince et al. | 340/765 |
| 5,039,207 | 8/1991 | Green | 359/49 |
| 5,040,098 | 8/1991 | Tanaka et al. | 362/31 |
| 5,040,878 | 8/1991 | Eichenlaub | 350/345 |
| 5,044,734 | 9/1991 | Sperl et al. | 359/49 |
| 5,046,805 | 9/1991 | Simon | 385/31 |
| 5,046,829 | 9/1991 | Worp | 359/49 |
| 5,050,946 | 9/1991 | Hathaway et al. | 385/33 |
| 5,051,551 | 9/1991 | Doyle | 250/341 |
| 5,053,765 | 10/1991 | Sonehara et al. | 340/815.31 |
| 5,083,120 | 1/1992 | Nelson | 340/784 |
| 5,101,325 | 3/1992 | Davenport et al. | 362/31 |
| 5,128,783 | 7/1992 | Abileah et al. | 359/49 |
| 5,128,787 | 7/1992 | Blonder | 359/70 |
| 5,128,846 | 7/1992 | Mills et al. | 362/224 |

OTHER PUBLICATIONS

"Optics of Two-Stage Photovaltaic Concentrators with Dielectric Second Stages", Xisohul, Ning, Roland Winston and Joseph O'Gallagher, *Applied Optics*, vol. 26, Apr. 1, 1987, pp. 1207–1212.

"New Backlighting Technologies for LCDs", Hathaway et al., *Society for Information Display Digest*, vol. 22, May 1991, pp. 751–754. "Parts that Glow", A. Bhumenfeld and S. Jones, *Machine Design*, Jul. 1985, pp. 1–11.

"Directional Diffuser Lens Array for Backlit LCDs", R. I. McCartney and D. Syroid, *Japan Display*, pp. 259–262 (1992).

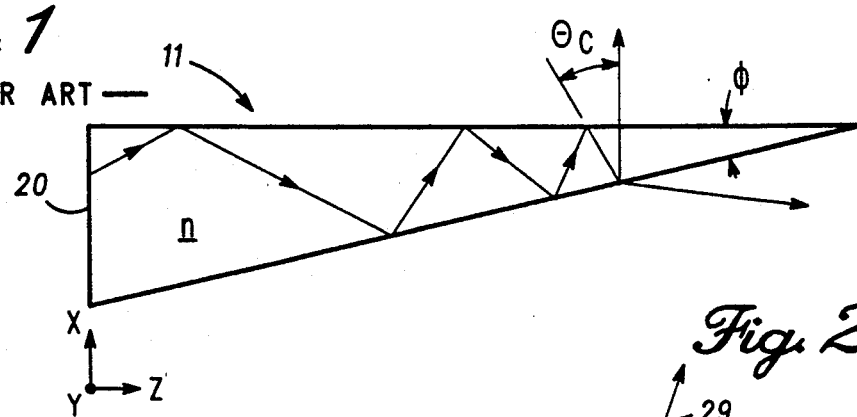
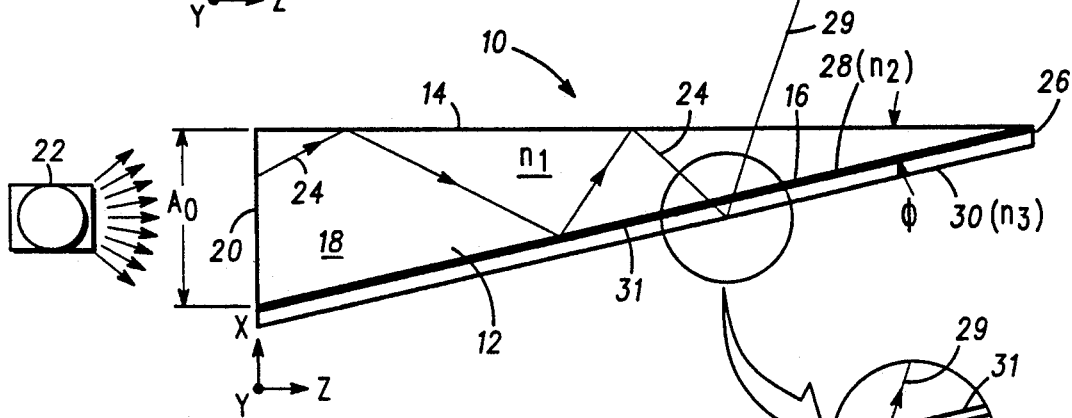
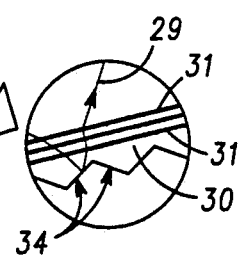
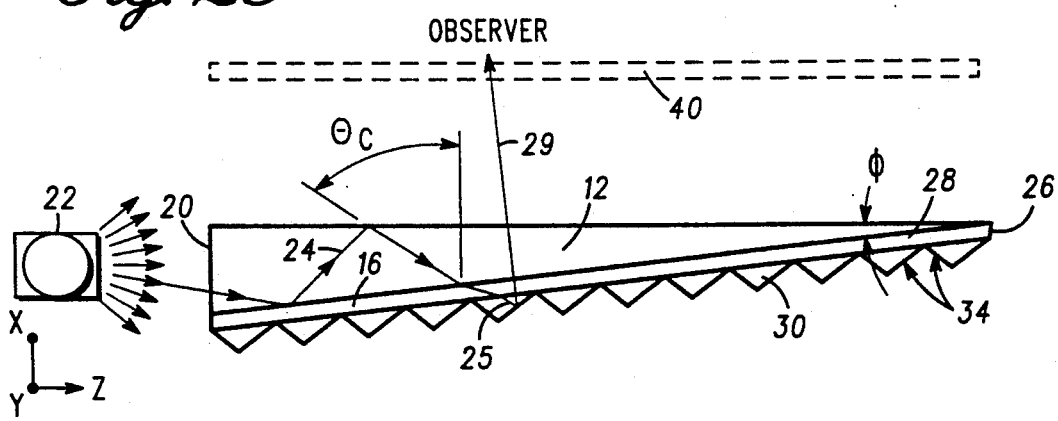
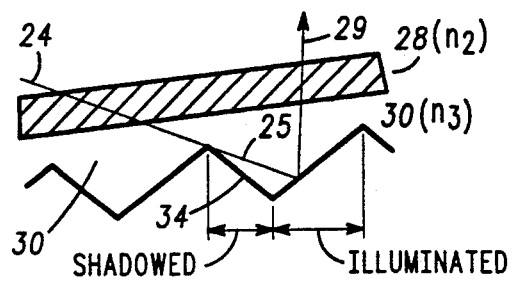

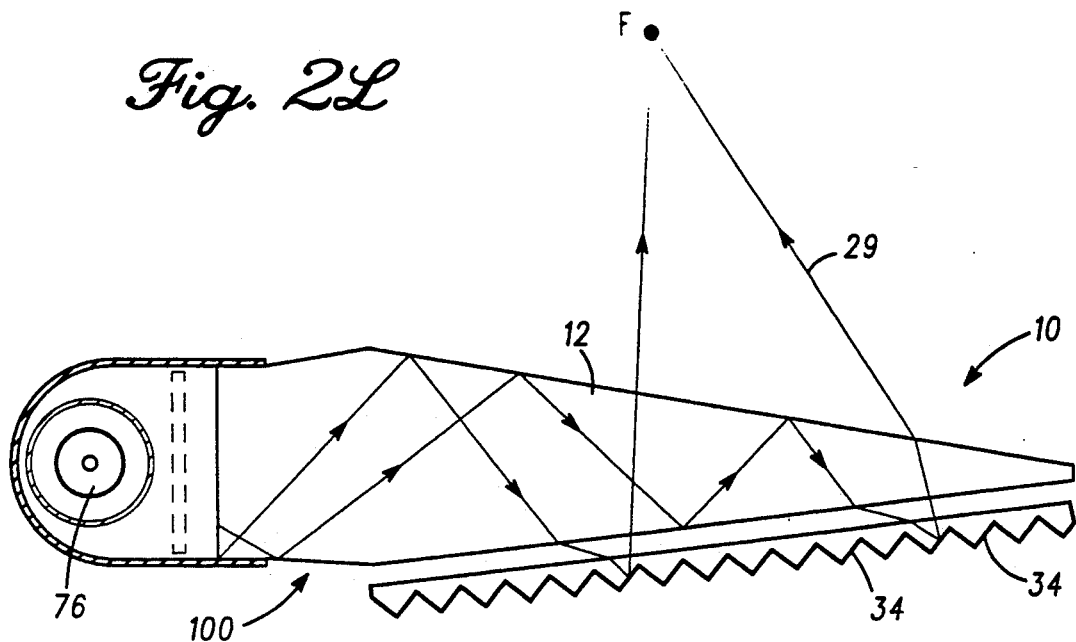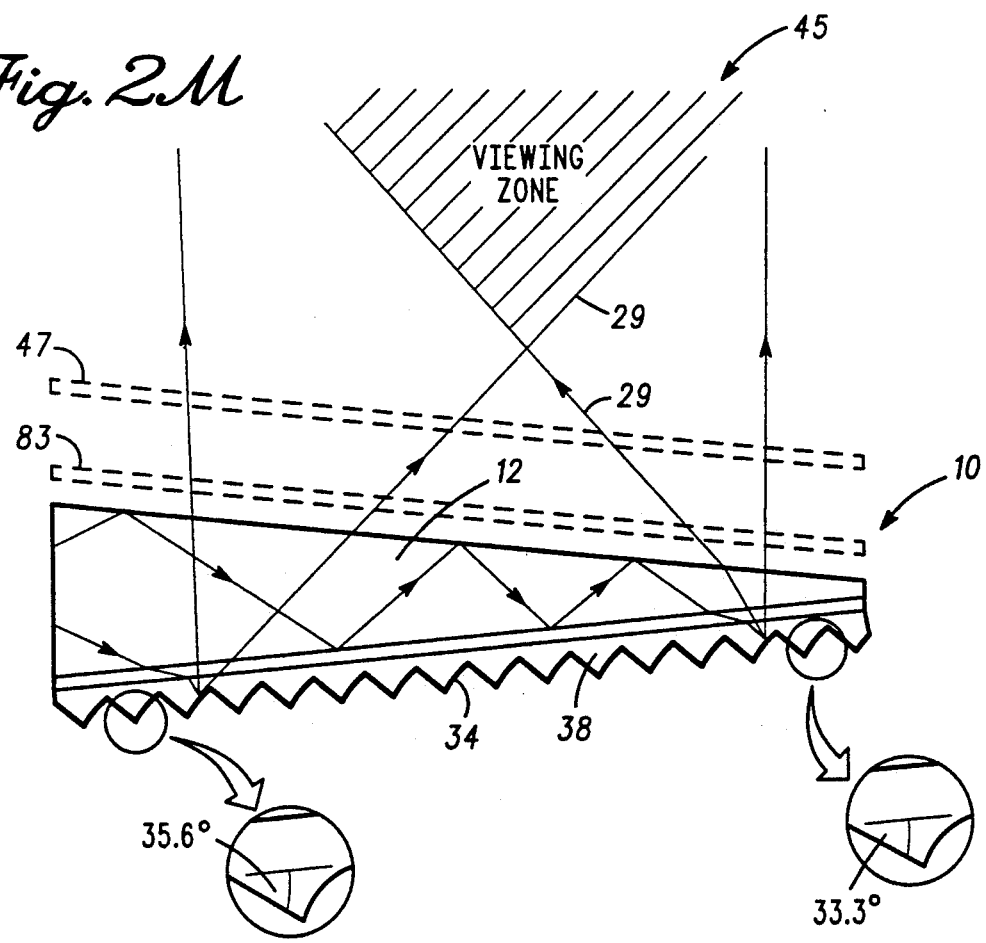

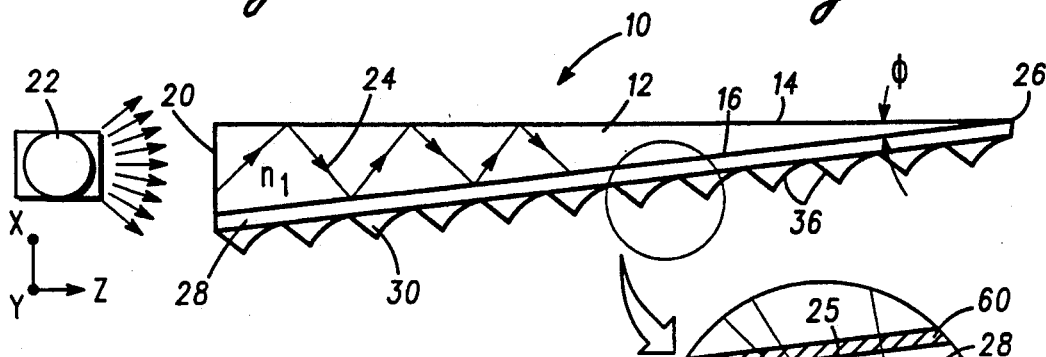
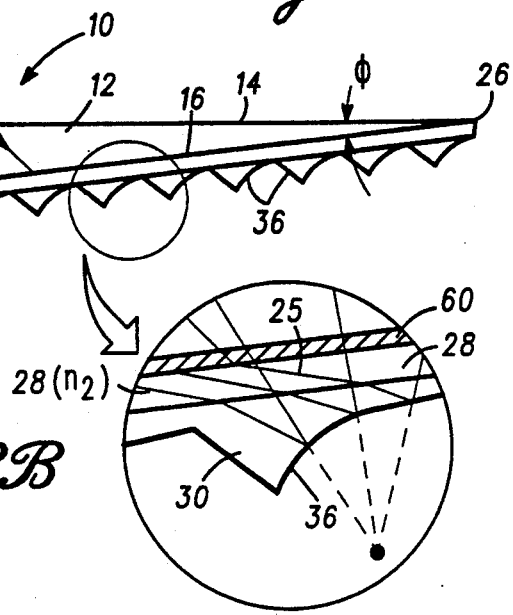
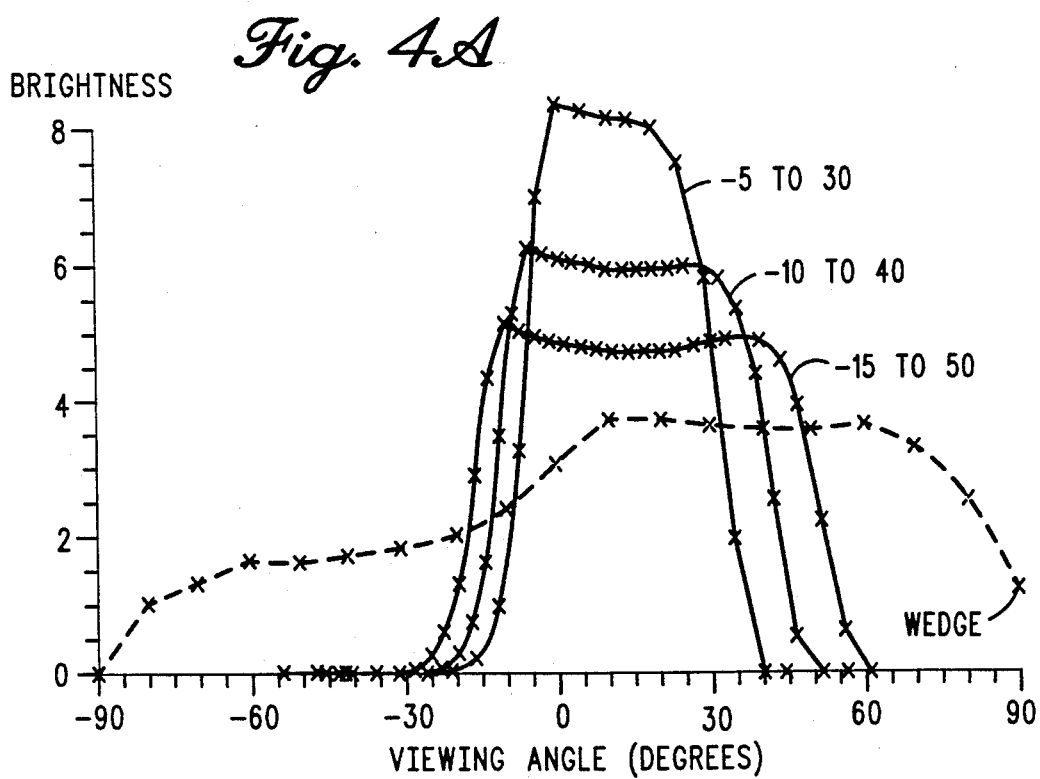

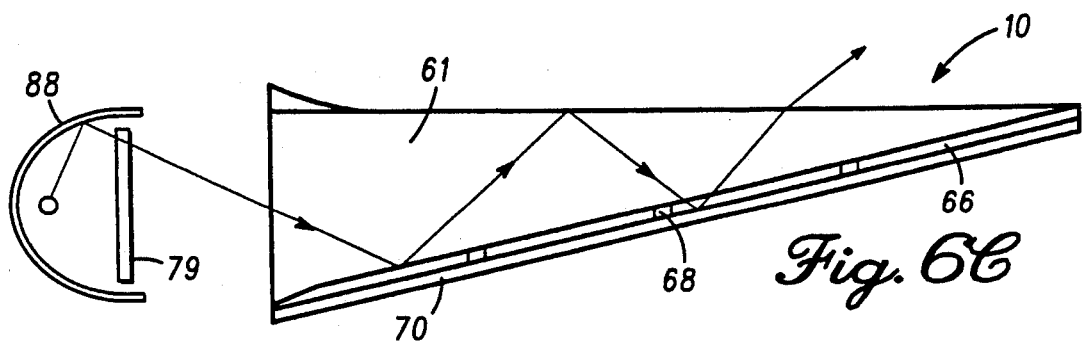
Fig. 6C
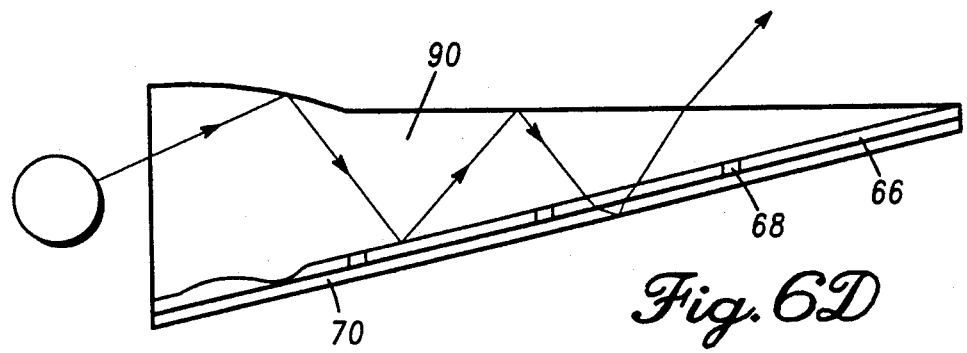
Fig. 6D
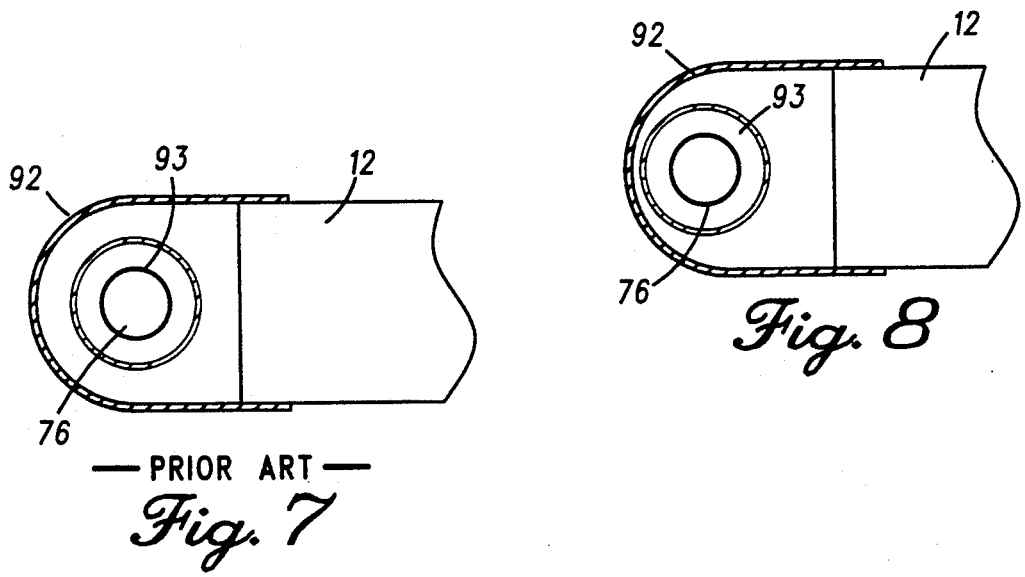
— PRIOR ART —
Fig. 7
Fig. 8

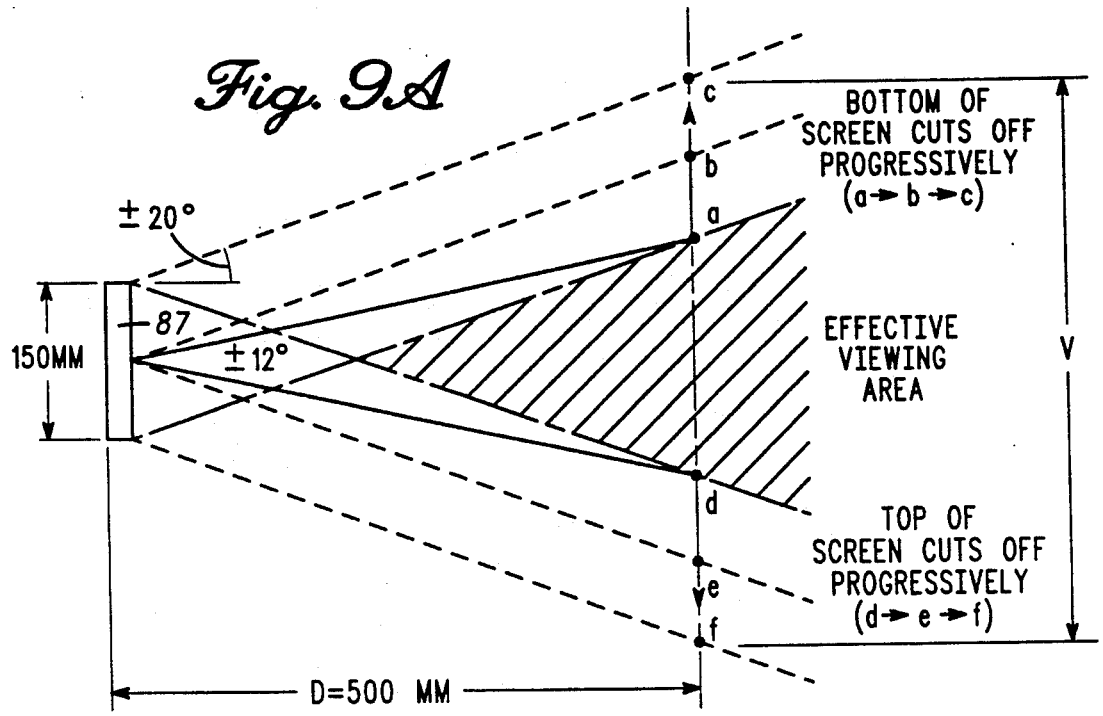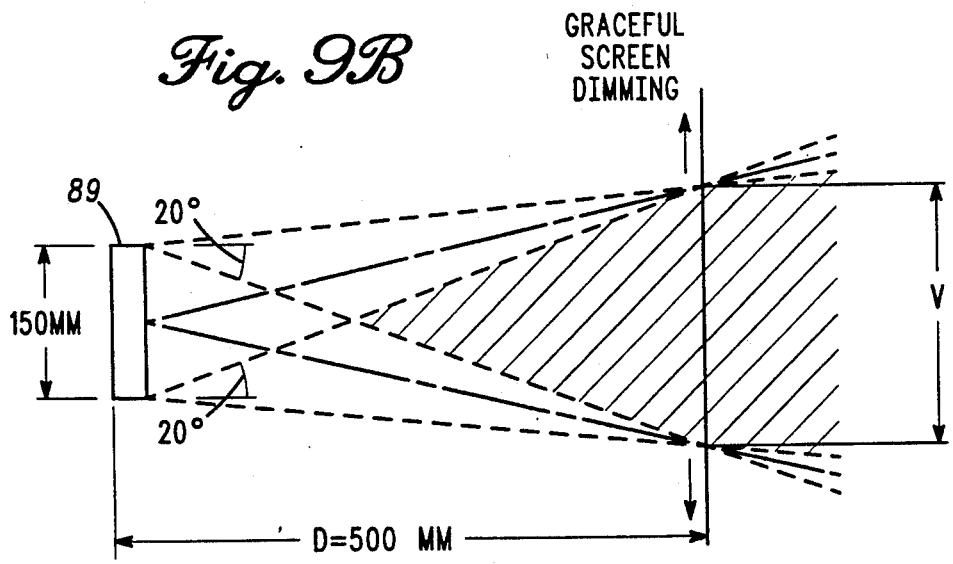

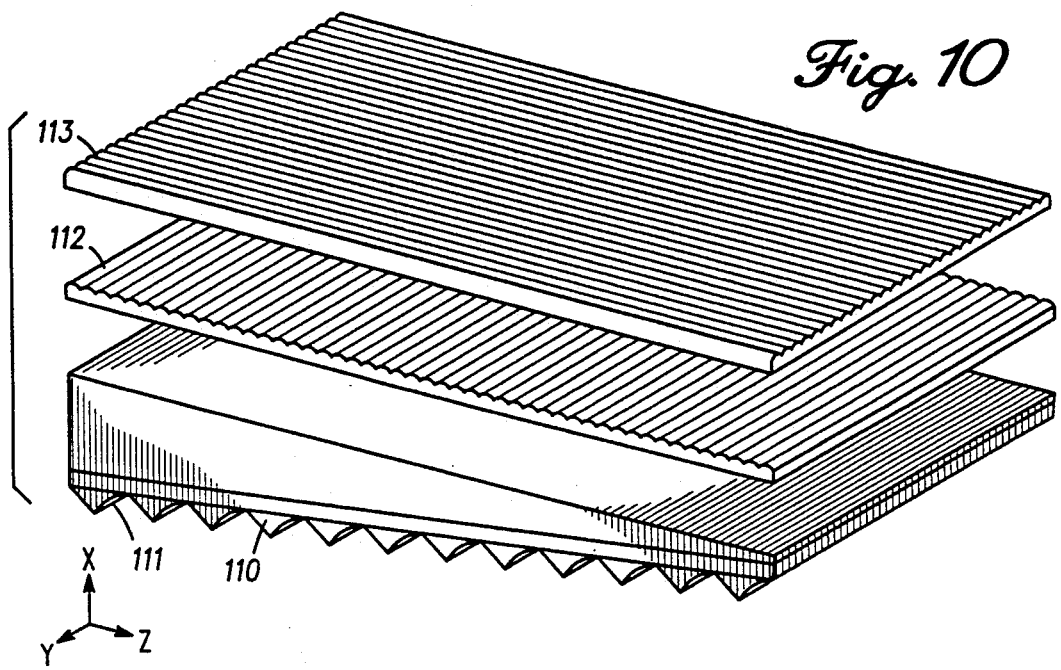
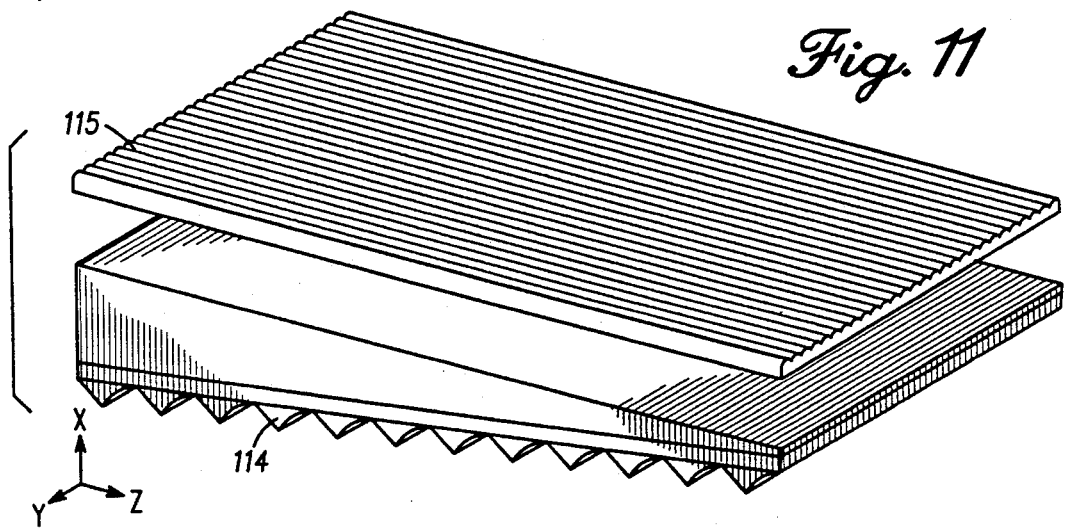
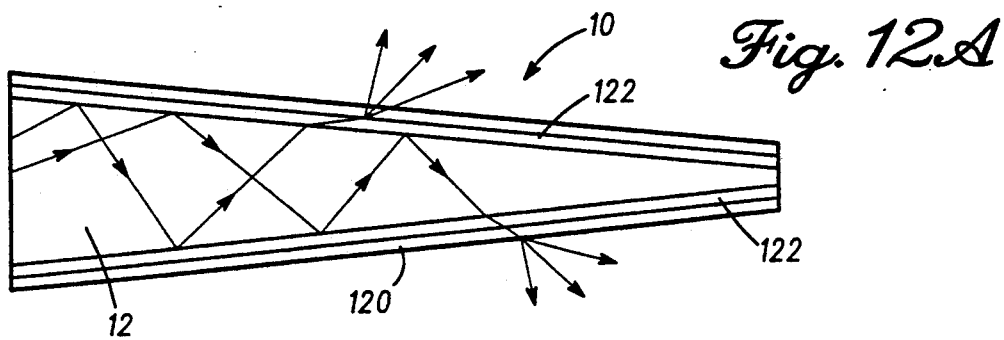

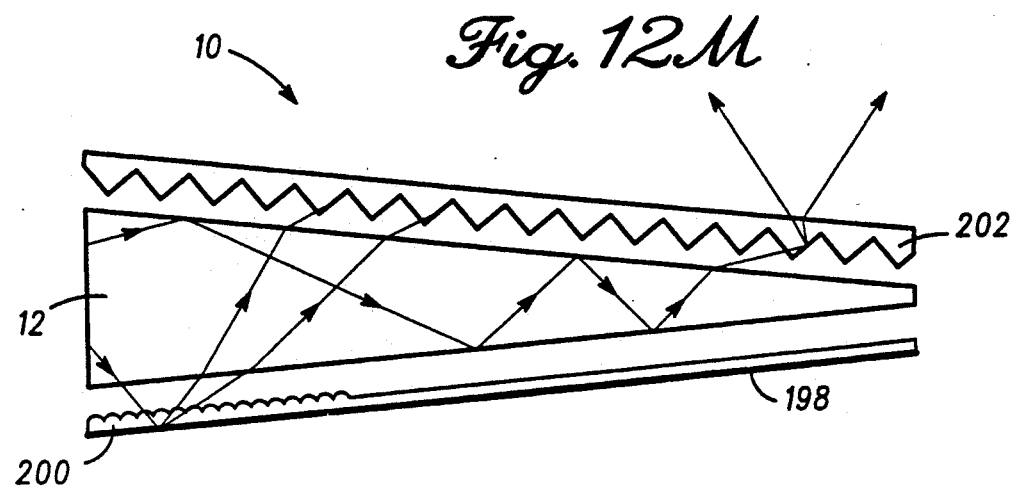
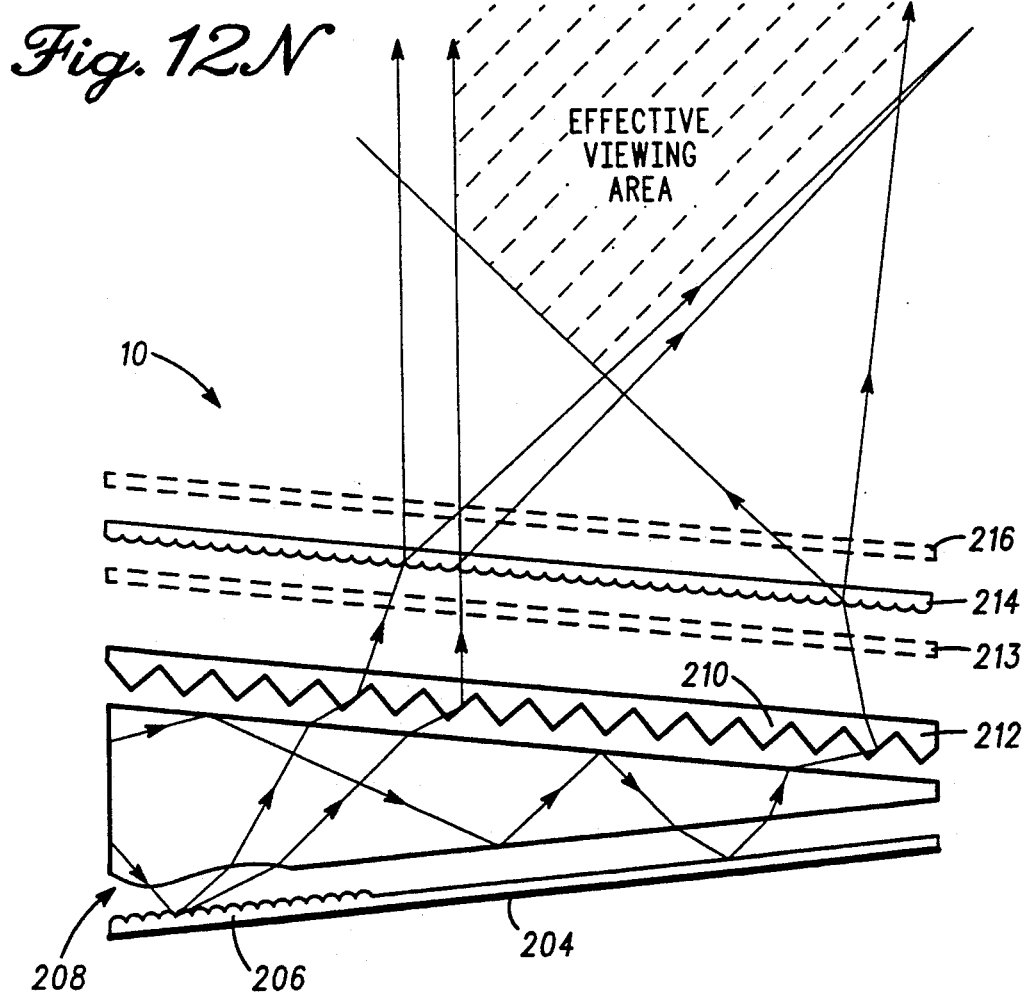

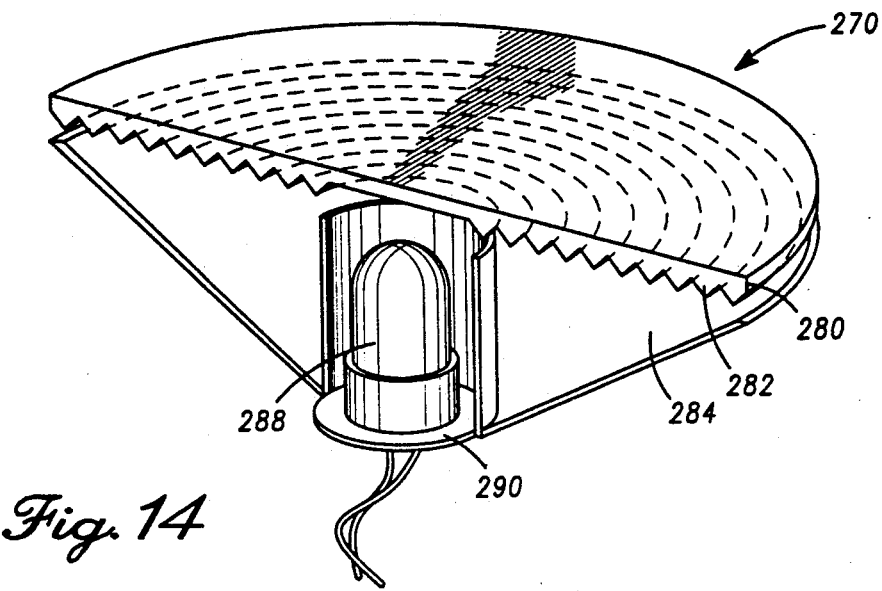
Fig. 14
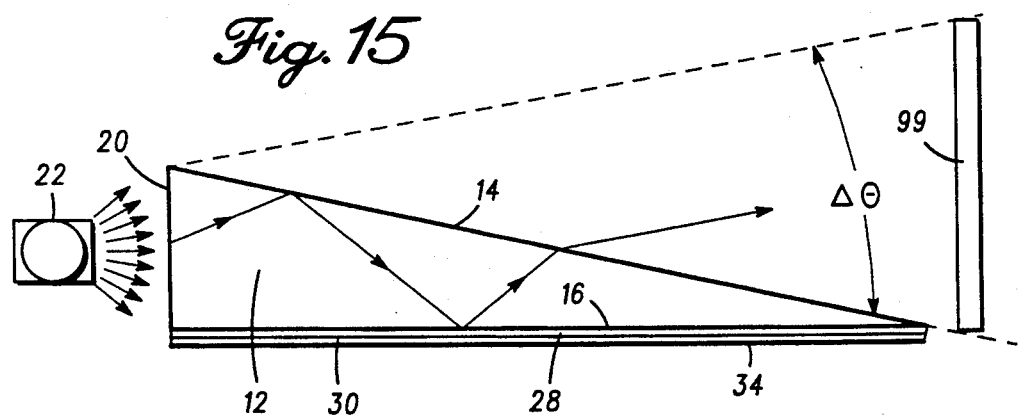
Fig. 15
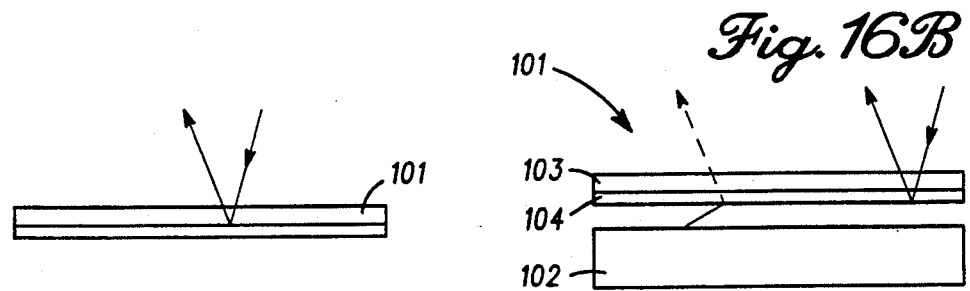
Fig. 16A
Fig. 16B

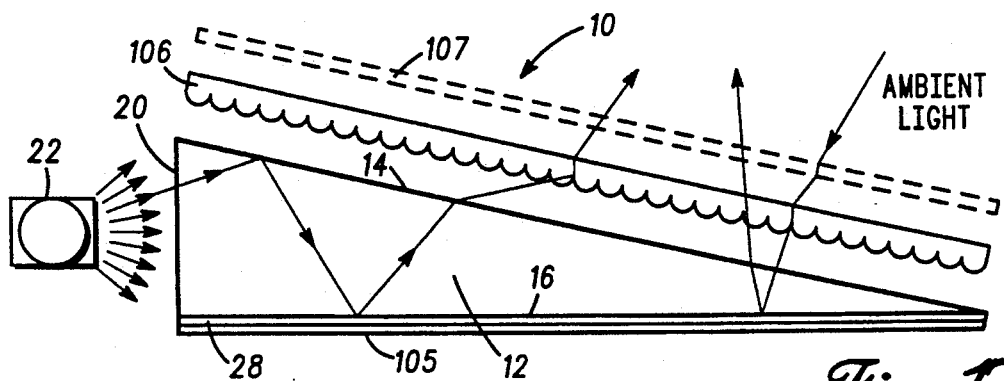
Fig. 17
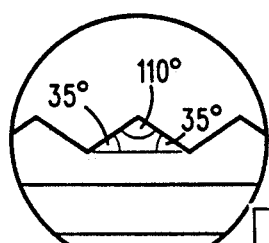
Fig. 18A
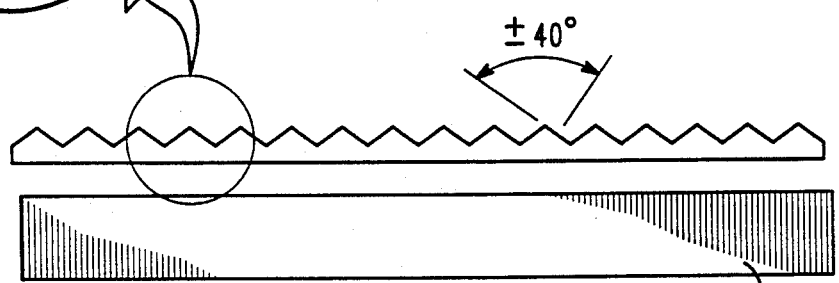
$\psi_1 = 35° - (0.133 \text{ DEG/MIN}) \cdot X$
$\psi_2 = 35° + (0.133 \text{ DEG/MIN}) \cdot X$
Fig. 18B
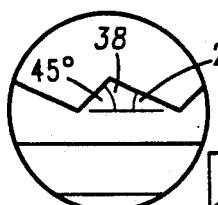
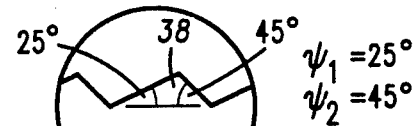
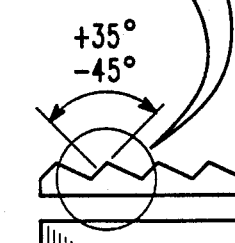
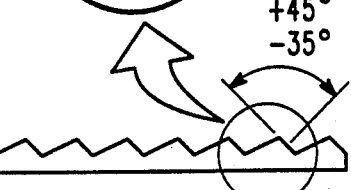
X=75    X=0    X=75

TAPERED MULTILAYER LUMINAIRE DEVICES

This is a continuation-in-part of copending application Ser. No. 07/855,838 filed on Mar. 23, 1992, U.S. Pat. No. 5,237,641.

The present invention is concerned generally with a luminaire device for providing selected illumination. More particularly, the invention is concerned with tapered luminaires, such as a wedge or disc shape, for backlighting and control of angular range of illumination and light concentration generally.

A variety of applications exist for luminaire devices, such as, for liquid crystal displays. For flat panel liquid crystal displays, it is important to provide adequate backlighting while maintaining a compact lighting source. It is known to use wedge shaped optical devices for general illumination purposes. Light is input to such devices at the larger end; and light is then internally reflected off the wedge surfaces until the critical angle of the reflecting interface is reached, after which light is output from the wedge device. Such devices, however, have only been used to generally deliver an uncollimated lighting output and often have undesirable spatial and angular output distributions. For example, some of these devices use white painted layers as diffuse reflectors to generate uncollimated output light.

It is therefore an object of the invention to provide an improved optical device and method of manufacture.

It is another object of the invention to provide a novel three dimensional luminaire.

It is a further object of the invention to provide an improved multilayer tapered luminaire for optical purposes, such as for controlled angular output backlighting.

It is still another object of the invention to provide a novel tapered luminaire device for controlled transmission or concentration of light.

It is an additional object of the invention to provide a novel optical device for providing collimated illumination from the device.

It is yet a further object of the invention to provide an improved luminaire having an intervening air gap layer.

It is still another object of the invention to provide a novel luminaire allowing controlled and focused output illumination, or controlled angular input for concentration.

It is yet a further object of the invention to provide an improved illumination system wherein a light source, such as a compound parabolic concentrator, a fluroescent tubular light source, or variable parametric functional source is coupled to a multilayer optical device for generating an output.

It is still a further object of the invention to provide a novel luminaire optical device having a variable index of refraction over the spatial parameters of a luminaire.

It is yet an additional object of the invention to provide an improved luminaire wedge device having non-linear thickness variation and variable wedge angle $\phi$ along selected spatial parameters enabling compensation for light output irregularities.

Other objects, features and advantages of the present invention will be readily apparent from the following description of the preferred embodiments thereof, taken in conjunction with the accompanying drawings described below.

BRIEF DESCRIPTION OF THE DRAWINGS

FIG. 1 shows a prior art wedge shaped device;

FIG. 2A illustrates a multilayer tapered luminaire device constructed in accordance with the invention; FIG. 2B is a magnified partial view of the junction of the wedge layer, the first layer and the second faceted layer; FIG. 2C is an exaggerated form of FIG. 2A showing a greatly enlarged second faceted layer; FIG. 2D is a partial view of the junction of the three layers illustrating the geometry for brightness determinations.

FIG. 2L shows a reflecting faceted layer coupled to a wedge device; FIG. 2M shows a reflecting faceted layer with curved facet angles and coupled to a wedge device.

FIG. 3 shows the angular output light due to the facet geometry.

FIG. 3A illustrates a multilayer wedge device with curved facets on the ambient side of the second layer and FIG. 3B shows a magnified partial view of the junction of the various layers of the device;

FIG. 6C illustrates another tapered luminaire in cross section with a variable parametric profile light source and a lenticular diffuser; and FIG. 6D shows another tapered luminaire in cross section with non-monotonic wedge layer thickness;

FIG. 7 illustrates a reflective element disposed concentrically about a light source;

FIG. 8 illustrates a reflective element disposed about a light source with maximum displacement between the reflector center of curvature and the center of the light source;

FIG. 9A illustrates use of a redirecting layer to provide a substantially similar angular distribution emanating from all portions of the device and FIG. 9B illustrates use of a redirecting layer to a vary angular distribution emanating from different portions of the device, and specifically to focus the various angular distributions to enhance their overlap at a selected target distance;

FIG. 10 illustrates one form of pair of lenticular arrays of a luminaire; and

FIG. 11 illustrates a lenticular diffuser array and curved facet layer of a luminaire;

FIG. 12A illustrates a wedge shaped luminaire having a pair of diffraction gratings or hologram layers; FIG. 12M illustrates a luminaire with an initial reflector section including an integral lenticular diffuser; FIG. 12N shows a luminaire with a roughened initial reflector section of a layer.

FIG. 14 shows a tapered disk luminaire including a faceted redirecting layer;

FIG. 15 illustrates a luminaire operating to provide a collimated light output distribution;

FIG. 16A shows a prior art ambient mode LCD and FIG. 16B illustrates a prior art transflective LCD unit;

FIG. 17 shows a luminaire operative in ambient and active modes with a faceted redirecting layer and a lenticular diffuser; and FIGS. 18A & 18B illustrate a luminaire with an array of micro-prisms for a faceted surface disposed over a diffuse backlight.

DETAILED DESCRIPTION OF PREFERRED EMBODIMENTS

Figure 2E:
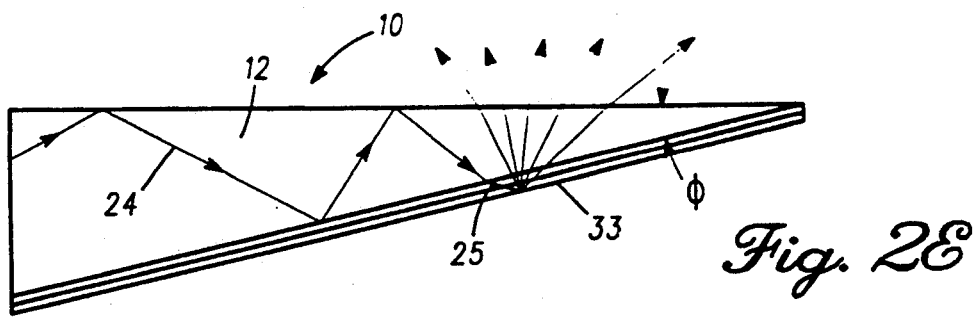
FIG. 2E is a multilayer wedge device with a light redirecting, internally transmitting layer on the bottom.

A multilayer luminaire device constructed in accordance with one form of the invention is illustrated in FIG. 2 and indicated generally at 10. A prior art wedge 11 is shown generally in FIG. 1. In this wedge 11 the light rays within the wedge 11 reflect from the surfaces until the angle of incidence is less than the critical angle ($\sin^{-1} 1/n$) where n is the index of refraction of the wedge 11. The light can exit equally from both top and bottom surfaces of the wedge 11, as well as exiting at grazing angles.

The multilayer luminaire device 10 (hereinafter "device 10") shown in FIG. 2A includes a wedge layer 12 which has a characteristic optical index of refraction of $n_1$. The term "wedge layer" shall be used herein to include all geometries having converging top and bottom surfaces with wedge shaped cross sectional areas. The x, y and z axes are indicated within FIGS. 2A and 2C with the "y" axis perpendicular to the paper. Typical useful materials for the wedge layer 12 include almost any transparent material, such as glass, polymethyl methacrylate, polystyrene, polycarbonate, polyvinyl chloride, methyl methacrylate/styrene copolymer (NAS) and sytrene/acrylonitrile. The wedge layer 12 in FIG. 2A further includes a top surface 14, a bottom surface 16, side surfaces 18, edge 26 and a back surface 20 of thickness $t_o$ spanning the top, bottom and side surfaces. A light source, such as a tubular fluorescent light 22, injects light 24 through the back surface 20 into the wedge layer 12. The light 24 is internally reflected from the various wedge layer surfaces and is directed along the wedge layer 12 toward the edge 26. Other possible light sources can be used and will be described hereinafter. Generally, conventional light sources provide substantially incoherent, uncollimated light; but coherent, collimated light can also be processed by the inventions herein.

For the case where the surfaces 14 and 16 are flat, a single angle of inclination $\phi$ for a linear wedge is defined by the top surface 14 and the bottom surface 16. In the case of nonlinear wedges, a continuum of angles $\phi$ are definable; and the nonlinear wedge can be designed to provide the desired control of light output or concentration. Such a nonlinear wedge will be described in more detail later.

In the embodiment of FIG. 2A a first layer 28 is coupled to the wedge layer 12 without any intervening air gap, and the first layer 28 has an optical index of refraction $n_2$ and is optically coupled to the bottom surface 16. The first layer 28 can range in thickness from a few light wavelengths to much greater thicknesses and accomplish the desired functionality. The resulting dielectric interface between the wedge layer 12 and the first layer 28 has a higher critical angle than at the interface between the wedge layer 12 and ambient. As will be apparent hereinafter, this feature can enable preferential angular output and collimation of the light 24 from the device 10.

Coupled to the first layer 28 is a second layer 30 (best seen in FIG. 2B) having an optical index of refraction $n_3$ which is greater than $n_2$, and in some embodiments preferably greater than $n_1$. This configuration then allows the light 24 to leave the first layer 28 and enter the second layer 30. In the embodiment of FIG. 2A there are substantially no intervening air gaps between the first layer 28 and the second layer 30. In the preferred form of the invention illustrated in FIG. 2A, $n_1$ is about 1.5, $n_2 < 1.5$ and $n_3 \leq n_1$. Most preferably, $n_1 = 1.5$, $n_2 < 1.5$ (such as about one) and $n_3 \leq n_1$.

In such a multilayer configuration for the device 10 shown in FIG. 2, the wedge layer 12 causes the angle of incidence for each cyclic time of reflection from the top surface 14 to decrease by the angle of inclination $2\phi$ (relative to the normal to the plane of the bottom surface 16). When the angle of incidence with the bottom surface 16 is less than the critical angle characteristic of the interface between the wedge layer 12 and the first layer 28, the light 24 is coupled into the first layer 28. Therefore, the first layer 28 and the associated optical interface properties form an angular filter allowing the light 24 to pass when the condition is satisfied: $\theta < \theta_c = \sin^{-1}(n_2/n_1)$. That is, the described critical angle is higher than for the interface between air and the wedge layer 12. Therefore, if the two critical angles differ by more than $6\phi$, nearly all of the light 24 will cross into the interface between the wedge layer 12 and the first layer 28 before it can exit the wedge layer 12 through the top surface 14. Consequently, if the two critical angles differ by less than $\phi$, a substantial fraction, but less than half, of the light can exit the top surface 14. If the two angles differ by more than $\phi$ and less than $6\phi$, then substantially more than half but less than all the light will cross into the wedge layer 12 and the first layer 28 before it can exit the wedge layer 12 through the top surface 14. The device 10 can thus be constructed such that the condition $\theta < \theta_c$ is satisfied first for the bottom surface 16. The escaping light 24 (light which has entered the layer 28) will then enter the second layer 30 as long as $n_3 > n_2$, for example. The light 24 then becomes a collimated light 25 in the second layer 30 provided by virtue of the first layer 28 being coupled to the wedge layer 12 and having the proper relationship between the indices of refraction.

In order to generate an output of the light 24 from the device 10, the second layer 30 includes means for scattering light, such as a paint layer 33 shown in FIG. 2E or a faceted surface 34 shown in both FIGS. 2B and 2C. The paint layer 33 can be used to preferentially project an image or other visual information. The paint layer 33 can comprise, for example, a controllable distribution of particles having characteristic indices of refraction.

Figure 2F:
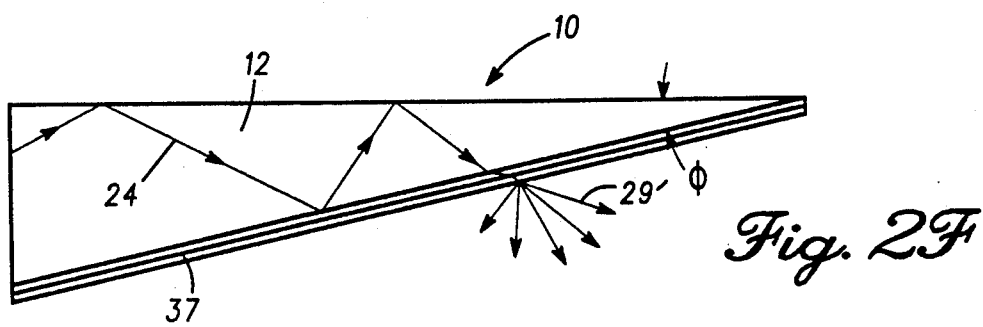
FIG. 2F shows a wedge device with a lower surface translucent layer.

By appropriate choice, light can also be redirected back through the wedge layer 12 and into ambient (see light 29 in FIGS. 2A and 2C) or output directly into ambient from the second layer 30 (see light 29' in FIG. 2F).

In other forms of the invention a further plurality of layers with associated "n" values can exist. In one preferred form of the invention the index of the lowest index layer can replace $n_2$ in equations for numerical aperture and output angle (to be provided hereinafter). Such further layers can, for example, by intervening between the wedge layer 12 and the first layer 28, intervening between the first layer 28 and the second layer 30 or be overlayers of the wedge layer 12 or the second layer 30.

Figure 2G:
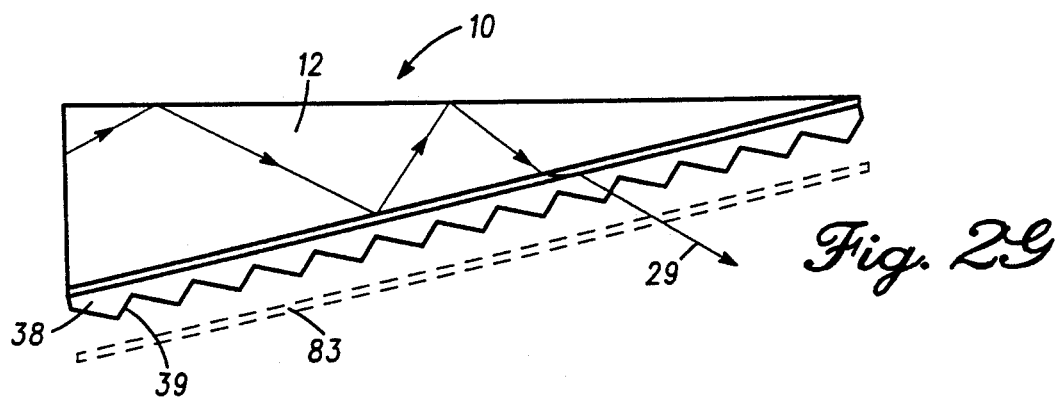
FIG. 2G shows a wedge layer with a lower surface refracting faceted layer.

In certain embodiments the preferred geometries result in output of light into ambient without being reflected back through the wedge layer 12. For example, in FIG. 2F the device 10 can include a translucent layer 37. In another form of this embodiment shown in FIG. 2G, a refracting layer 38 is shown. The refracting layer 38 can include flat facets 39 for providing a collimated output. Also shown in phantom in FIG. 2G is a transverse lenticular diffuser 83 which will be described in more detail hereinafter. The diffuser layer 83 can be used with any of the invention geometries, including above the wedge layer 12 as in FIG. 6A.

Figure 2H:
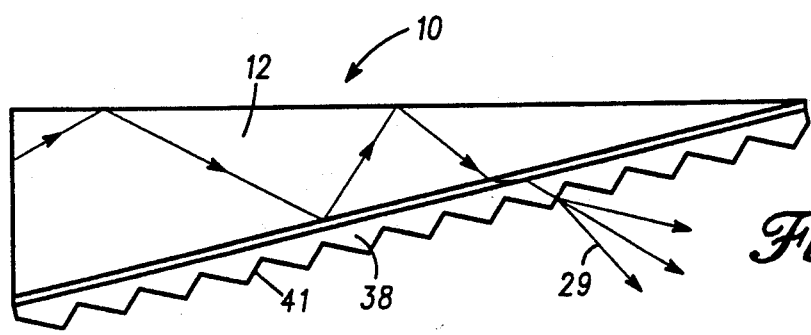
FIG. 2H shows a wedge layer with a lower surface refracting layer and curved facets thereon.
Figure 2I:
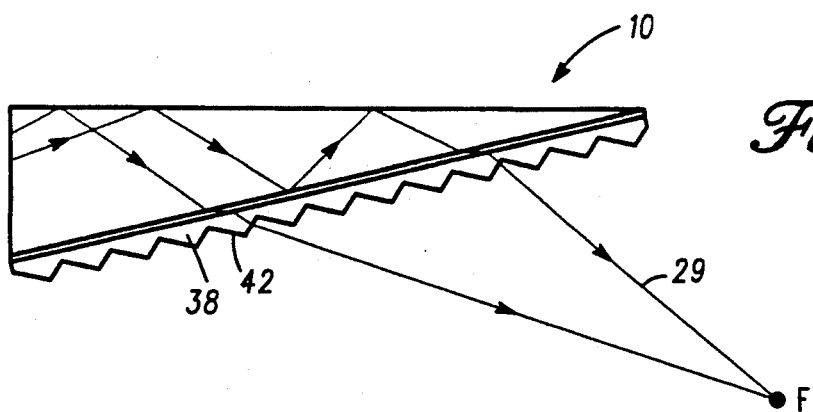
FIG. 2I shows a wedge layer with a refracting layer of facets having variable facet angles.
Figure 2J:
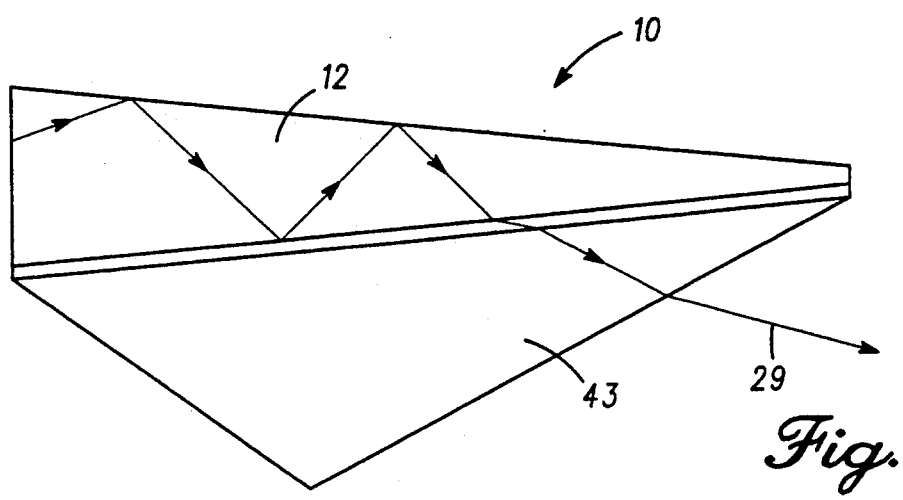
FIG. 2J shows a single refracting prism coupled to a wedge layer.
Figure 2K:
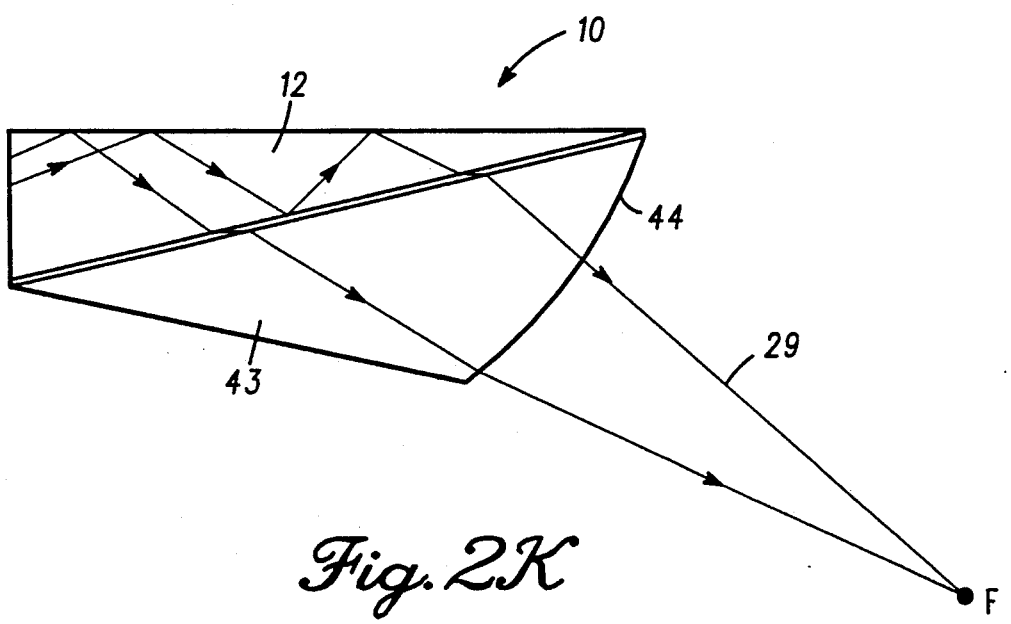
FIG. 2K shows a single refracting prism coupled to a wedge layer and with an integral lens.
Figure 2N:
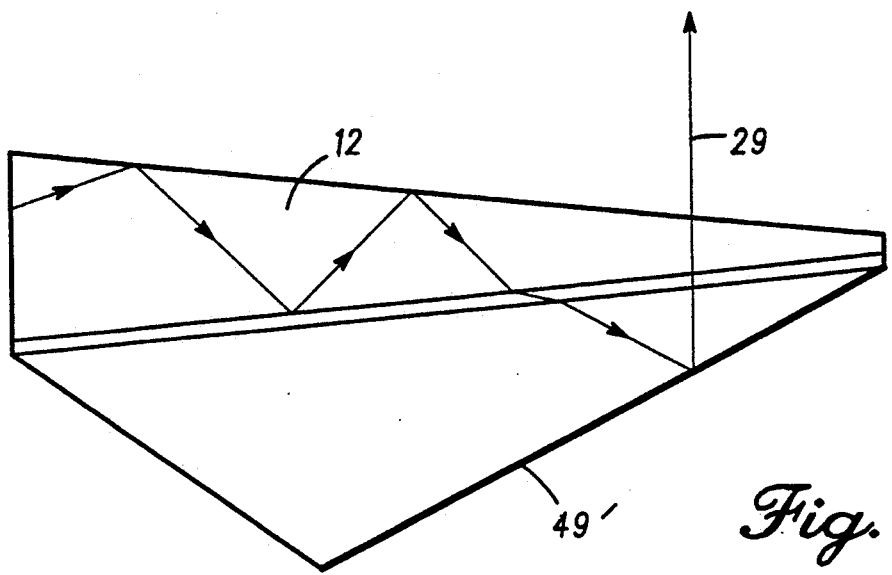
FIG. 2N shows a flat reflecting facet on a wedge layer and FIG. 2O shows a curved reflecting facet on a wedge layer.
Figure 2O:
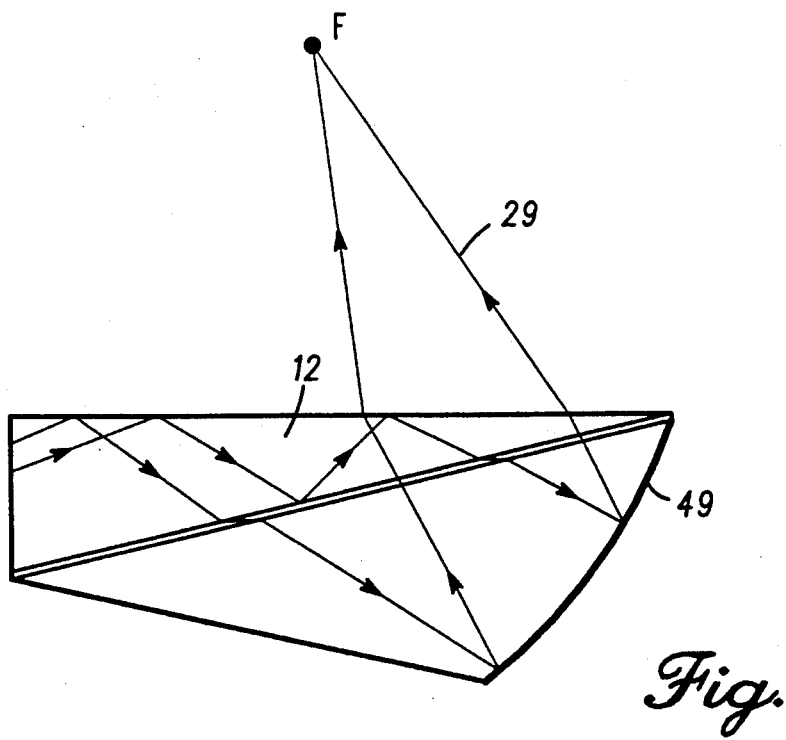

In yet another example shown in FIG. 2H, the refracting layer 38 can include curved facts 41 for providing a smoothly broadened output over a desired angular distribution. In a further example shown in FIG. 2I, the refracting layer 38 includes variable angle facets 42. These facets 42 have facet angles and/or curvature which are varied with position across the facet array to focus output light in a desired manner. Curved facets would enable producing a softly focused region within which the entire viewing screen appears to be illuminated. Examples of the application to compute screen illumination will be described hereinafter. In FIGS. 2J and 2K are shown, respectively, a single refracting prism element 43 and the prism element 43 with an integral lens 44 to focus the output light. FIGS. 2L and M show the faceted surface 34 with the facets angularly disposed to control the output distribution of light. In FIGS. 2K and 2L the light is output to a focal point "F", while in FIG. 2M the output is over an approximate viewing range 45. FIGS. 2N and 2O illustrate flat reflecting facets 48 and curved reflecting facet 49 for providing a collimated light output or focused light output, respectively.

As shown in FIGS. 2A and C the faceted surface 34 optically reflects and redirects light 29 through the second layer 30, the first layer 28 and then through the wedge layer 12 into ambient. Only a fraction of each facet is illuminated, causing the output to appear alternately light and dark when viewed on a sufficiently small scale. Since this pattern is typically undesirable, for the preferred embodiment shown in FIG. 2B the period of spacing between each of the faceted surfaces 34 is preferably large enough to avoid diffraction effects, but small enough that the individual facets are not detected by the intended observing means. The spacing is also chosen to avoid forming Moiré interference patterns with any features of the device to be illuminated, such as a liquid crystal display or CCD (charge coupled device) arrays. Some irregularity in the spacing can mitigate undesirable diffraction Moiré effects. For typical backlighting displays, a spacing period of roughly 0.001–0.003 inches can accomplish the desired purpose.

The faceted surface 34 in FIGS. 2B and 2C, for example, can be generally prepared to control the angular range over which the redirected light 29 is output from the device 10. The minimum distribution of output angle in the layer 30 has a width which is approximately equal to:

$$\Delta\theta = 2\phi[(n_1^2 - n_2^2)/(n_3^2 - n_2^2)]^{\frac{1}{2}}$$

Thus, since $\phi$ can be quite small, the device 10 can be quite an effective collimator. Therefore, for the linear faceted surface 34, the exiting redirected light 29 has a minimum angular width i air of approximately:

$$\Delta\theta_{air} = n_3\Delta\theta = 2\phi(n_1^2 - n_2^2)/[1 - (n_2/n_3)^2]^{\frac{1}{2}}.$$

As described hereinbefore, and as shown in FIGS. 2H, 2I, 2K, 2L, 2M, and FIG. 3 the facet geometry can be used to control angular output in excess of the minimum angle and also focus and control the direction of the output light.

Fresnel reflections from the various interfaces can also broaden the output angle beyond the values given above, but this effect can be reduced by applying an antireflection coating 31 on one or more of the internal interfaces, as shown in FIG. 2B.

The brightness ratio ("BR") for the illustrated embodiment can be determined by reference to FIG. 2D as well as by etendue match, and BR can be expressed as:

$$B.R. = \frac{\text{output brightness}}{\text{source brightness}}$$

or,

B.R. = illuminated area/total area $B.R. = [1 - (n_2/n_3)^2]^{\frac{1}{2}} = 0.4 - 0.65$ (for most transparent dielectric materials)

For example, the wedge layer 12 can be acrylic ($n_1 = 1.49$), the first layer 28 can be a fluoropolymer ($n_2 = 1.28 - 1.43$) or Sol-gel ($n_2 = 1.05 - 1.35$, fluoride salts ($n_2 = 1.38 - 1.43$) or silicone based polymer or adhesive ($n_2 = 1.4 - 1.45$); and the second layer 30 can be a faceted reflector such as polycarbonate ($n_3 = 1.59$), polystyrene ($n_3 = 1.59$) epoxy ($n_3 = 1.5 - 1.55$) or acrylic ($n_3 = 1.49$) which have been metallized at the air interface.

Figure 4B:
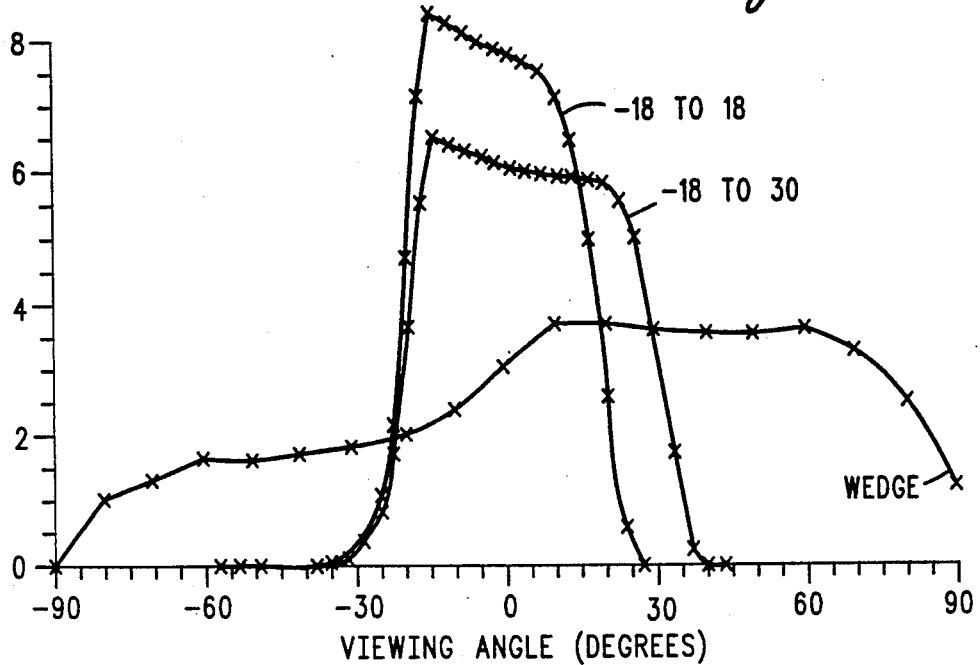
FIG. 4B shows calculated brightness distribution performance over angle for a more symmetric angle range.
Figure 4C:
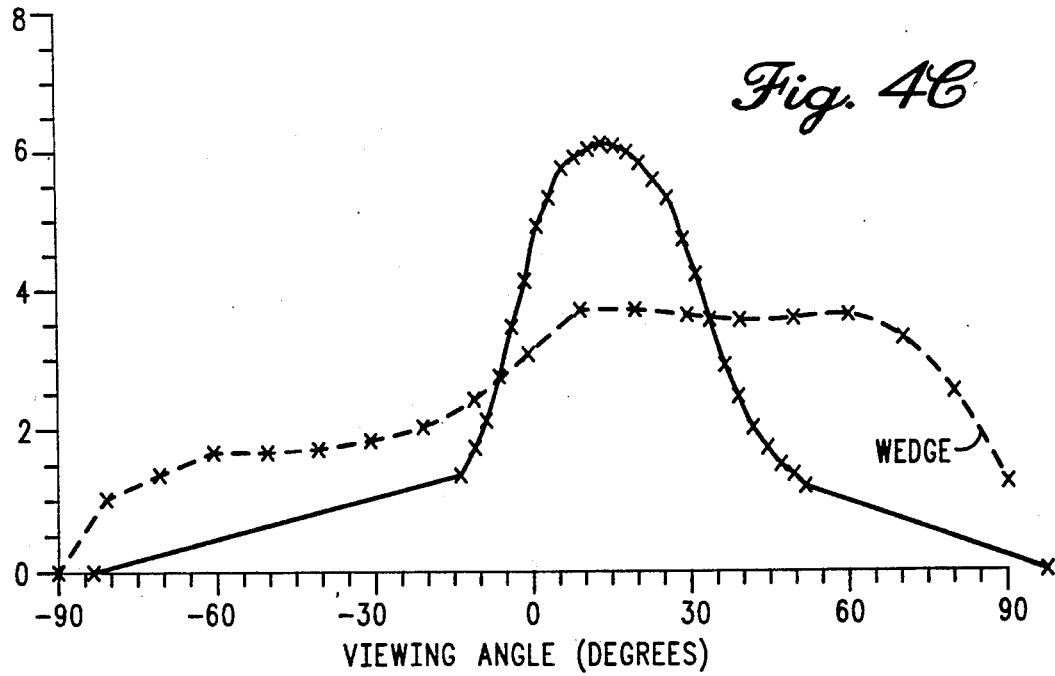
FIG. 4C illustrates calculated brightness performance over angle for the symmetry of FIG. 4B and adding an external diffuser element.
Figure 4D:
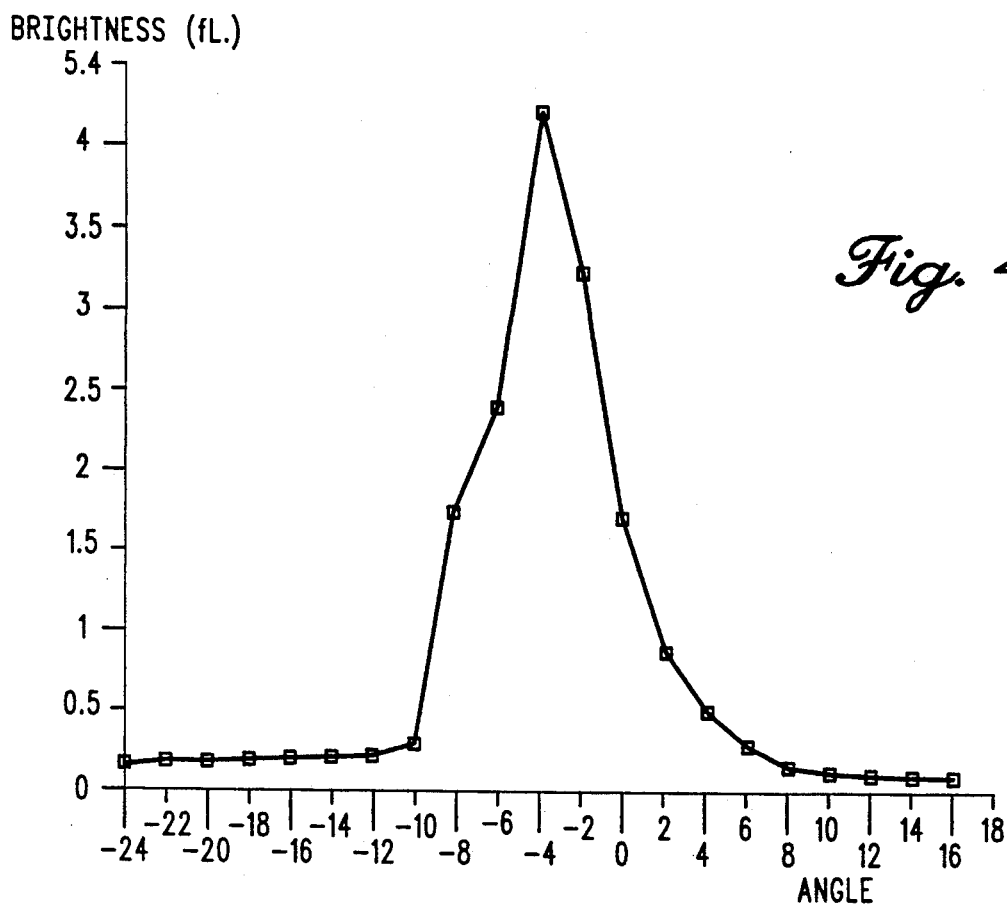
FIG. 4D illustrates an output using flat reflecting facets, no parallel diffuser; full-width at half-maximum brightness (FWHM)=7 degrees.

The flat, or linear, faceted surfaces 34 shown, for example, in FIGS. 2B and 2C can redirect the incident light 24 to control direction of light output and also substantially preserve the angular distribution of light $\Delta\theta$ which is coupled into the second layer 30 by the angle-filtering effect (see, for example, FIG. 4D). For example, in one preferred embodiment shown in FIG. 2L, the faceted surfaces 34 reflect light with the flat facet angles varied with position to focus the output light. In FIG. 2M the faceted surfaces 34 include curved facet angles which vary with position to produce a softly focused viewing zone 45 within which the entire screen appears to be illuminated (see also, for example FIGS. 4F and 4G). Also show in phantom in FIG. 2M is an exemplary liquid crystal display 47 usable in conjunction with the invention. As further shown in FIGS. 3A and B, curved facets 36 also redirect the incident light 24, but the facet curvature increases the resulting range of angular output for the redirected light 29 (see for comparison for flat facets FIGS. 2D). For example, it is known that a concave trough can produce a real image, and that a convex trough can produce a virtual image (see, for example, FIG. 3B). In each case the image is equivalent to a line source emitting light uniformly over the desired angular output range. Consequently, an array of such trough shaped facets 36 can redirect the incoming form of collimated light 25 from the first layer 28 (see FIG. 2C), and a plurality of such line source images then form the redirected light 29. By arranging the spacing of the curved facets 36 to less than human eye resolution, the resulting array of line sources will appear very uniform to an observer. As previously mentioned, the choice of about three hundred to five hundred lines/inch or 0.002 to 0.003 inches for the period of facet spacing provides such a result.

For a typical LCD display viewing distances of approximately twenty inches or greater are conventional.

Other useful facet shapes can include, for example, parabolic, elliptical, hyperbolic, circular, exponential, polynomial, polygonal, and combinations thereof. The user can thus construct virtually arbitrary distribution of averaged brightness of illumination using different facet designs. For example, polygon shaped facets can be used to produce output angular distributions having multiple peaks.

Figure 4E:
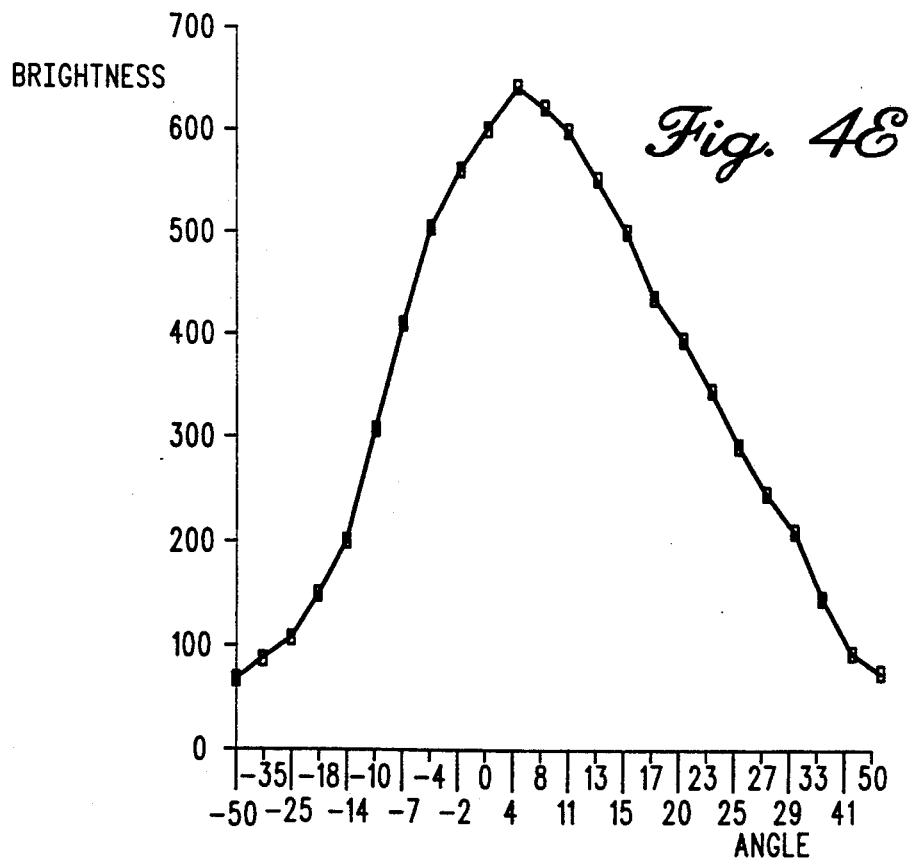
FIG. 4E illustrates an example of nearly symmetrical output distribution; measured using flat facets with parallel lenticular diffuser; FWHM=34 degrees.
Figure 4F:
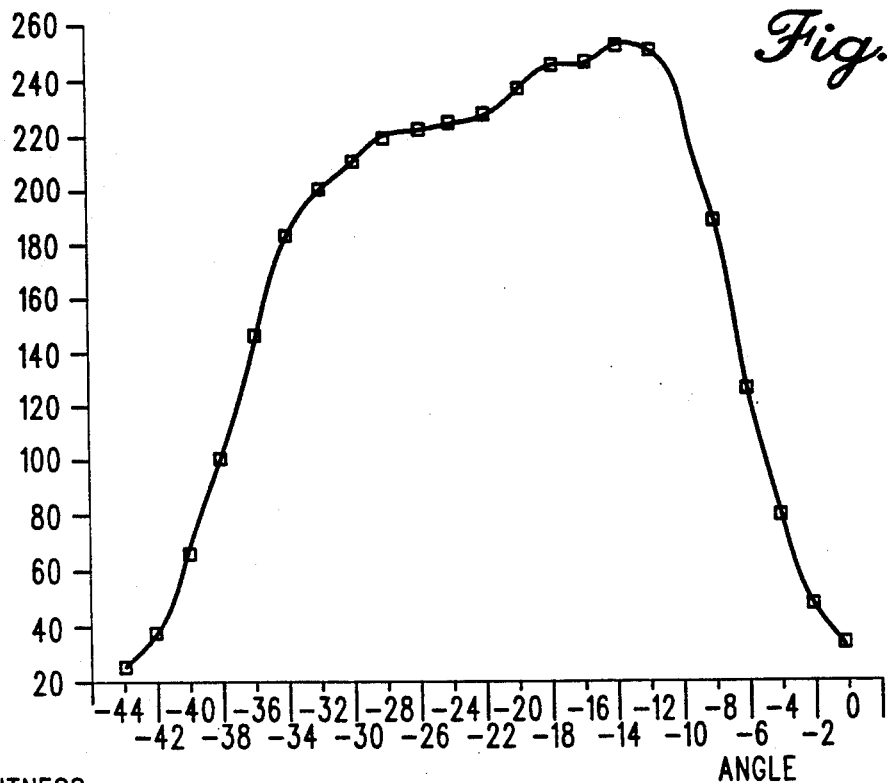
FIG. 4F illustrates an example of asymmetrical output distribution, measured using curved facets; FWHM=32 degrees.
Figure 4G:
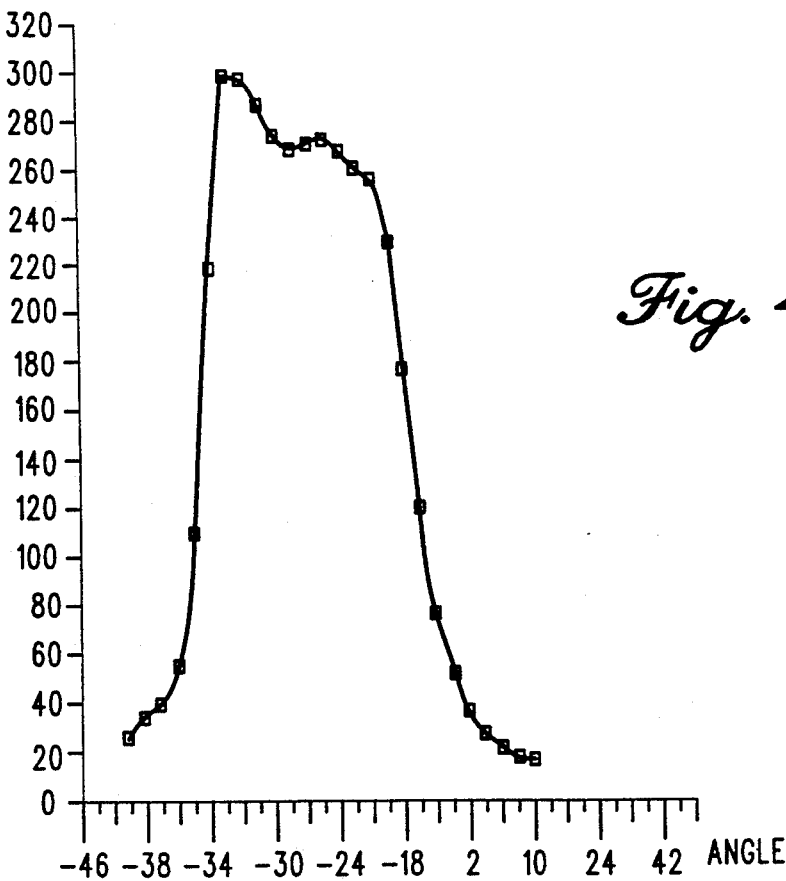
FIG. 4G illustrates an example asymmetrical output distribution, measured using curved facets; FWHM=26 degrees.
Figure 4H:
FIG. 4H illustrates an example of a bimodal output distribution, measured using one faceted reflecting layer and one faceted refractive layer.
Figure 4J:
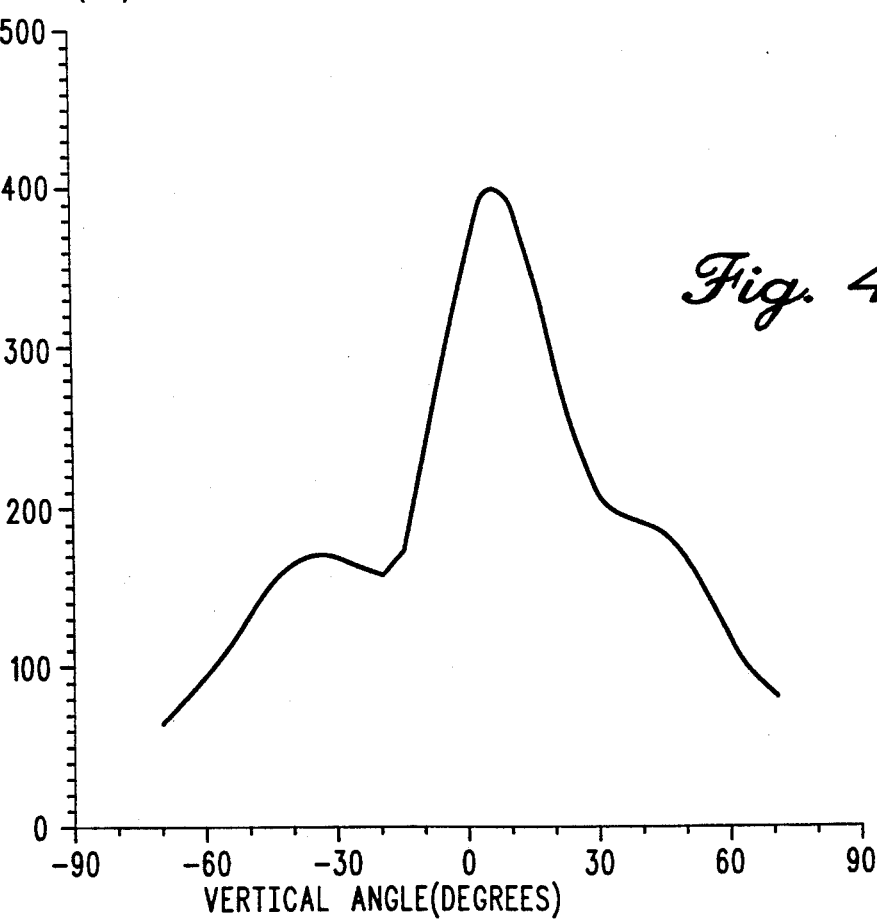
FIG. 4A shows calculated brightness performance over angle for an asymmetric range of angles of illumination.
FIG. 4I illustrates an example of an output distribution with large "tails", measured using a diffuse reflective bottom redirecting layer and a refracting/internally-reflecting top redirecting layer.
Figure 5A:
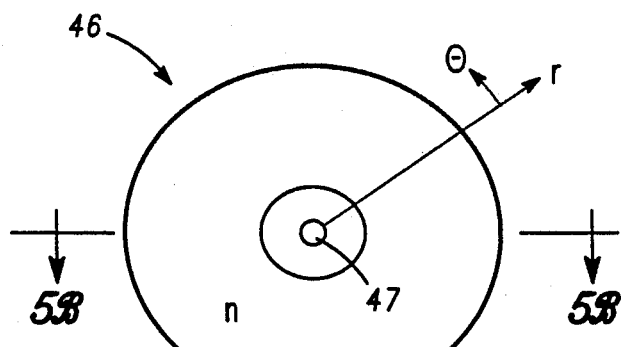
FIG. 5A shows a top view of a disc shaped light guide and FIG. 5B illustrates a cross section taken along 5B—5B in FIG. 5A.
Figure 5B:
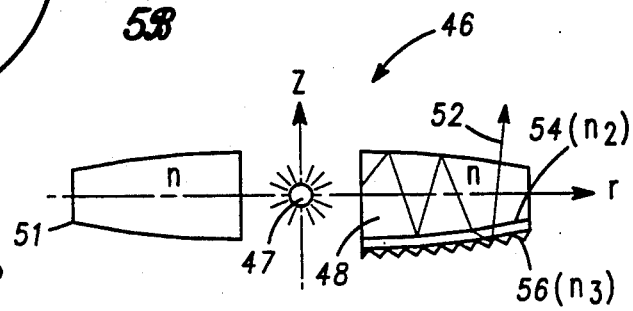

Examples of brightness distribution over various ranges of angular output using a curved-faceted reflector are illustrated in FIGS. 4A–4C, 4F and 4G. FIG. 4C and 4E shows the brightness distribution in the case of a reflector having linear facets, and further including a diffuser element 40 (shown in phantom in FIG. 2C). The predicted performance output is shown for the various angular ranges (see FIGS. 4A–4C) and compared with the measured angular output of light for a commercially available source, such as a "Wedge Light" unit, a trademark of Display Engineering. The preferred angular range can readily be modified to accommodate any particular viewing and collimation requirements up to the minimum angle $\Delta\theta$ (air) described hereinbefore by the equation in terms $\phi$, $n_1$, $n_2$ and $n_3$. This modification can be accomplished by progressively changing the curvature of the curved facets 36 in the manner shown in FIG. 2M and discussed hereinbefore. In addition to the illustrated control of the vertical viewing angular range, modification of the horizontal viewing range can also be accomplished by appropriate changes of the shape of the curved facets 36. The above described angular distributions shown in FIGS. 4A–4I are representative when the device 10 is processing the light 24 within the numerical aperature $NA = (n_1^2 - n_2^2)^{\frac{1}{2}}$. When light is outside this range, additional techniques can be applied to help control the angular output range.

FIGS. 9A and 9B further illustrate the use of redirecting means to provide a tightly overlapping focused illumination output and a less overlapping focused illumination output, respectively. These concepts can be applied practically by considering that a typical portable computer screen 87 has a vertical extent "V" of about 150 mm, while a typical viewing distance, "D", is 500 mm. A viewer at distance "D", positioned normal to the vertical center of the computer screen 87 will view different areas of the screen 87 at angles ranging from $-8.5°$ measured at the top of the screen 87 to $+8.5°$ measured at the bottom of the screen 87. This variation in viewing angle can, however, cause undesirable effects in use of a system having such screen illumination. Such a limited illumination angle for the screen 87 implies a limited range of positions from which a viewer can see a fully illuminated screen 87 (see FIG. 9A). Defining the viewer position in terms of the angle and distance from the center of the screen 87, then the effective angular range is substantially reduced below the nominal illumination angle. For example, if the nominal illumination range is $\pm 20°$ measured at each individual facet, then the effective viewing range is reduced to $\pm 12°$ in the typical flat panel illuminator shown in FIG. 9A. The resulting illumination between $12°-20°$, either side of center for the screen 87, will appear to be nonuniform to the viewer.

The invention herein can be used to overcome the above described nonuniformities by controlling the orientation of the faceted surface 34. As illustrated, for example, in FIG. 2M both surfaces of the facets are rotated progressively such that the flat facet surface is varied from 35.6° to 33.3° relative to, or parallel to, the edges of the planes defining the various layers of the device 10. This systematic variation from the top to the bottom of screen 89 (see FIG. 9B) results in the redirected output illustrated. The faceted surface 34 can further be combined with the diffuser 83 and the like to produce a variable, but controllable light illumination output distribution. A flat faceted surface 168 can further be combined with a diffuser 170. Therefore, as shown in FIG. 9B the ability to rotate the angular distributions of light at different points on the screen 89 enable compensation for the variation in viewing angle with position. Systematic variations in the faceted surface 34 can further include variations in one or more facet angles, the spacing of the facets 38, or the depth and width of the individual facets 38. In other embodiments, the same principles can be applied to focus the output of any faceted redirecting layer. Examples are shown in FIGS. 2I and 2L.

In another example of overcoming nonuniformities of illumination, an array of micro-prisms for the faceted surface 34 can be laid over a conventional diffuse backlight 101 (see FIG. 18A). This faceted surface 34 operates by a combination of refraction and total internal reflection to permit only a limited angular range to be output through the layer into ambient. This angular range depends on the facet angles. For the case of acrylic film (n=1.49), highest brightness is typically with a prism included angle of 90-100 degrees, resulting in a viewing angle of approximately ±35 degrees. Backlights using such a geometry show a sharp "curtaining" effect which is disconcerting to many viewers. This effect can be ameliorated by rotating the facets 38 from top to bottom of the screen to produce a focusing effect (see FIG. 18B). Simple ray-tracing shows that, for included angles in the range of 100°-110°, a facet rotated by an angle $\theta$ will produce an angular distribution rotated by approximately $\theta/2$. In the embodiment shown in FIG. 18 the progressive variation of facet face angle can vary as position $\chi$ along the faceted surface 34 wherein, for example:

$$\Psi_1 = 35° - (0.133°/mm)\cdot\chi$$

$$\Psi_2 = 35° + (0.133°/mm)\cdot\chi$$

This progressive facet angle change will produce an angular distribution which varies by approximately ten degrees across the screen 89, and satisfies the generic constraints outlined above.

Whatever the desired facet shapes, the faceted surface 34 (see, FIG. 2D) is preferably formed by a conventional process such as molding or other known milling processes. Details of manufacture will be described hereinafter:

Nonlinear Wedges.

In another form of the invention the wedge layer 12, which is the primary lightguide, can be other than the linear shape assumed hereinbefore. These shapes allow achievement of a wide variety of selected light distributions. Other shapes can be more generally described in terms of the thickness of the wedge layer 12 as a function of the wedge axis "z" shown in FIGS. 2B and C (the coordinate axis which runs from the light input edge to the small or sharp edge 26). For the linear shaped wedge, $$A(z) = A_0 - C \cdot z \quad (1)$$

$A_0$ = maximum wedge thickness (see FIG. 2A)
$C$ = constant = $\tan \phi$

A large range of desired spatial and angular distributions can be achieved for the light output power (power coupled to the second layer 30). This light output power is thus the light available for output to the ambient by the appropriately faceted surfaces 34 or 36, or even by the diffuse reflector 33 (see FIG. 2E) or other means.

For example, if L and M are direction cosines along the x and y axes, respectively, then $L_o$ and $M_o$ are the values of L and M at the thick edge (z=0). This initial distribution is Lambertian within some well-defined angular range, with little or no light outside that range. This distribution is especially important because ideal non-imaging optical elements have limited Lambertian output distributions. The key relationship is the adiabatic invariant, $A(z)\cos(\theta_c)$ which is approximately equal to $A_0 L_0$ and which implicitly gives the position (z) of escape. To illustrate this concept, suppose we desire uniform irradiance so that $dP/dz$=constant. Suppose further that the initial phase space uniformly fills an ellipse shown below and described by the following expression.

$$L_o^2/\sigma^2 + M_0^2/\tau^2 = 1 \quad (2)$$

wherein $\tau$ is the dimension of ellipse along M axis, and $\sigma$ is the dimension of ellipse along L axis.

Then, $dP/dL = \text{const.} \cdot [1 - L^2/\sigma^2]^{\frac{1}{2}}$ but $dA/dz = [A_o/L_c]dL_o/dZ$ where $L_c = \cos\theta_c$. Therefore, $[1 - (L_cA)^2/(A_o\sigma)^2]^{\frac{1}{2}} dA$ = constant times dz. Suppose $\sigma = L_c$ in the preferred embodiment. This result can be interpreted by the substitution $A/A_0 = \sin u$, so that $A = A_0 \sin u$ and $u + \frac{1}{2} \sin(2u) = (\pi/2)(1 - z/D)$ where D is the length of the wedge layer 12.

If the desired power per unit length is $dP/dz$, more generally, then the desired shape of the wedge layer 12 is determined by the differential equation:

$$dA(z)/dz = \frac{-dP/dz(A_o/[1 - (n_2/n_1)^2]^{\frac{1}{2}})}{dP/dL_o} \quad (3)$$

Note that in all these cases the output distribution has only approximately the desired form because it is modified by Fresnel reflections. Note also that even when the wedge device 10 is curved, if the curvature is not too large, it may be still be useful to define an average angle $\phi$ which qualitatively characterizes the system.

In another aspect of the invention the geometry of the above examples has an x,y interface between two refractive media with indices $n_1$ and $n_2$. The components nM,nN are conserved across the interface so that $n_1 M_1 = n_2 M_2$, $n_1 N_1 = n_2 M_2$. The angle of incidence projected in the x,z plane is given by $\sin \theta_{eff} = N/(L^2 - N^2)^{\frac{1}{2}}$. Then using the above relations, $\sin \theta_{2eff}/\sin \theta_{1eff} = (n_1/n_2)[1 - M_1^2]^{\frac{1}{2}}/[1 - (n_1/n_2)^2 M_1^2]^{\frac{1}{2}} = (n_1/n_2)_{eff}$.

For example, for $n_1 = 1.49$, $n_2 = 1.35$, $M_1 = 0.5$, the effective index ratio is $1.035(n_1/n_2)$, which is only slightly larger than the actual index ratio.

Variation of Index of Refraction Over Spatial Parameters.

In the general case of tapered light guides, the wedge layer 12 is generally along the z axis with the narrow dimension along the x axis (see, for example, FIG. 2A). If we introduce optical direction cosines (nL,nM,nM) where L,M,N are geometric direction cosines along x, y, z, then n is the refractive index which may vary with spatial position. For guided rays in the wedge layer 12, the motion in x is almost periodic, and the quantity $\phi nLdx$ for one period is almost constant as the ray propagates along z. This property is called adiabatic invariance and provides a useful framework for analyzing the lightguide properties.

In a first example the wedge device 10 shown in FIG. 2A has a uniform index in the wedge layer 12 and is linearly tapered in z with width $A(z)=A_0-C\cdot z$. Then, along the zigzag ray path, $L(z)A(z)$ is approximately equal to a constant by adiabatic invariance. If a ray starts at $z=0$ with $L=L_0$, then $(A_0-C\cdot z)L(z)$ is approximately equal to $L_0A_0$. The ray will leak out of the wedge layer 12 when $L=\cos\theta_c$ where $\theta_c$ is the critical angle $=[1-(n_2/n_1)^2]^{\frac{1}{2}}$. Thus, the condition for leaving the wedge layer 12 is $A_0-C\cdot z=L_0A_0/\cos\theta_c$. This will occur at $z=(A_0/C)(1-L_0/\cos\theta_c)$. Consequently, the density of rays emerging in z is proportional to the density of rays in the initial direction cosine $L_o$. For example, the density will be uniform if the initial distribution in $L_0$ is uniform.

In a second example, the index profile is no longer uniform but falls off both in x and in z. If the fall-off in z is much slower than in x, the light ray path is still almost periodic, and the above adiabatic invariance still applies. Then, as the light ray 24 propagates in z, the path in x,nL space is almost periodic. Therefore the maximum value of $L(z)$ increases and at some z may reach the critical value for escape. The z value for escape depends on the details of the index (n) profile. When this is specified, the analysis proceeds as in example one above. Thus, for a parabolic index profile, the index profile has the form $n^2(x)=n^2_0[1-2\Delta(x/\rho)^2]$ for $-\rho<x\rho$, $=n_1^2=n^2_0]1-2\Delta]$ for $|x|>\rho$. Then, the critical angle at $x=0$ is still given by $\sin^2\theta_c=2\Delta=1-(n_1/n_0)^2$. Then, if we have $n_0$ a slowly decreasing function of z, the slope $\theta$ at $x=0$ will slowly increase by the adiabatic invariance of $\phi nLdx$, while $\theta_c$ decreases so that light rays will escape. The details of the light ray distributions will depend on how the index (n) varies with z.

Nonwedge Tapered Geometries

In the most general case the light can be input into any shape layer (e.g., parallelepiped, cylinder or non-uniform wedge), and the principles described herein apply in the same manner. In addition, the index of refraction can be varied as desired in (x,y,z) to achieve the appropriate end result when coupled to means to output light to ambient.

For example, consider a disc-shaped light guide 46 which is tapered in the radial direction r shown in FIG. 5. The direction cosines in cylindrical polar coordinates are $k_r$, $k_\theta$, $k_z$. Light 48 propagating in this guide 46 satisfies the relationship:

$$\phi nk_z dz \sim \text{constant (adiabatic invariance)} \quad (4)$$

$$nrk_\theta = \text{constant. (angular momentum conservation)} \quad (5)$$

The adiabatic invariance condition is identical with that for the wedge device 10, and the previous discussions pertinent to the wedge device 10 also thus apply to the light guide 46. The angular momentum conservation condition requires that as the light streams outward from source 47 with increasing radius, the $k_{74}$ value decreases. Therefore, the light becomes collimated in the increasing radial direction. This makes the properties fundamentally like the wedge device 10, and the light 48 can be made to emerge as light 52 at a selected angle to face 51, collimated along the z direction.

For purposes of illustration we take the guide material to have a constant index of refraction n. For such geometries the light rays 48 along the two-dimensional cross sectional plane taken along 5B—5B behave just as in the case of the wedge device 10 counterpart described hereinbefore. Similarly, various additional layers 54 and 56 and other means can be used to achieve the desired light handling features. For example, for the disc light guide 46 a preferred facet array 56 is a series of circles, concentric with the disk 46. Thus, if the facets 56 are linear in cross section, the light rays 52 will emerge in a direction collimated within a full angle of $2\phi$ times a function of the indices of refraction as in the device 10 described hereinbefore.

Tapered Luminaires with Two Low-index Layers

Figure 6A:
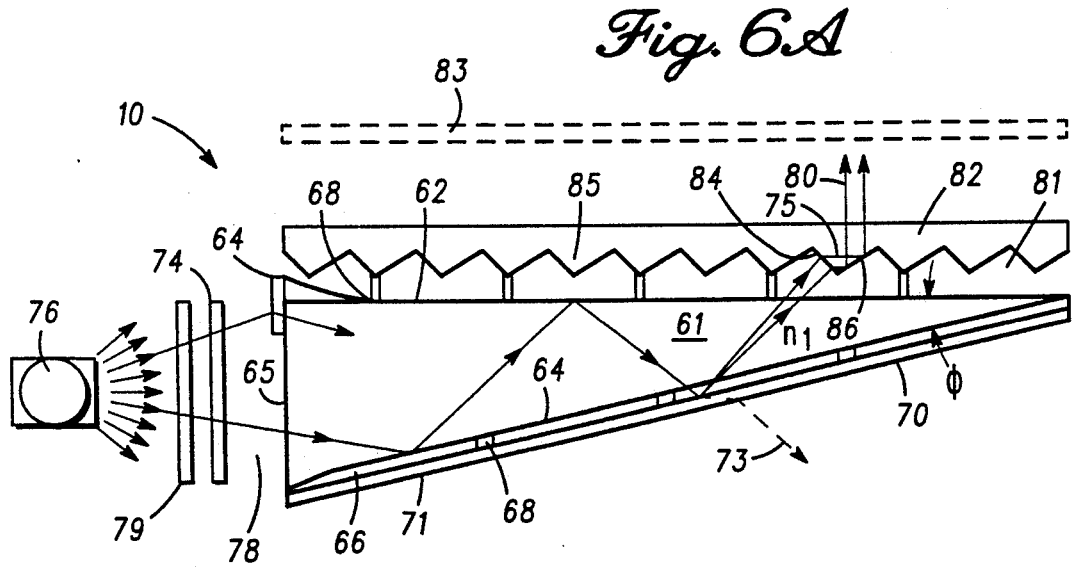
FIG. 6A shows a cross sectional view of a multilayer tapered luminaire device with an air gap layer included.

In another form of the invention shown in FIG. 6A, the device 10 includes a first layer 61 having an optical index of refraction $n_1$ and a top layer surface 62 and a bottom layer surface 64 converging to establish at least one angle of inclination $\phi$. The first layer 61 also includes a back surface 65 spanning the top layer surface 62 and the bottom layer surface 64.

Adjacent the first layer 61 is layer means, such as a bottom transparent layer means, first intermediate layer 66 of index $n_2$ disposed adjacent to, or underlying, the bottom layer surface 64. In addition, the layer means can embody a top transparent layer means, second intermediate layer 81 of index $n_2$ disposed adjacent to the top layer surface 62. At least one of the layers 66 and 81 can be an air gap, or other gas or transparent dielectric gap.

An air gap can be established by conventional means, such as external supports, such as suspending the layers under tension (not shown) or by positioning spacers 68 between the first layer 61 and the adjacent light redirecting layer 70. Likewise, the spacers 68 can be positioned between the first layer 61 and the second light redirecting layer 82. Alternatively, solid materials can be used for the transparent dielectric to constitute layers 66 and 81 and can improve structural integrity, robustness and ease of assembly. Such solid materials can include, for example, sol-gels ($n_2=1.05-1.35$), fluoropolymers ($n_2=1.28-1.43$), fluoride salts ($n_2=1.38-1.43$), or silicone-based polymers and adhesives ($n_2=1.40-1.45$). Such solid materials for the transparent dielectric need no separate means to support or maintain it, but can result in lower N.A. acceptance since the index is higher than for an air gap.

The layers 66 and 81 allow transmission of light received from the first layer 61. In this embodiment, part of the light will achieve $\theta_c$ first relative to the top layer surface 62, and light will enter the layer 81 for further processing by the light redirecting layer 82. The remaining light will thereby achieve $\theta_c$ first relative to the bottom layer surface 64, thus entering the layer 66 for further processing by the light redirecting layer 70.

In one preferred form of the invention both the layers 66 and 81 are present and can have similar, but significantly different indices $n_{2a}$ and $n_{2b}$, respectively. The indices are considered similar when they establish critical angles at the interfaces 62 and 64 which are similar in magnitude to the wedge angle $\phi$, for example:

$$|\text{arc sin}(n_{2a}/n_1) - \text{arc sin}(n_{2b}/n_1)| < 6\phi \qquad (6)$$

In this case significant, but unequal, fractions of light will enter each of the layers 66 and 81 for further processing by redirecting layers 70 and 82, respectively. The larger fraction will enter the layer having the higher of the two indices $n_{2a}$ and $n_{2b}$. The redirecting layer 70 processes only the fraction which enters the layer 66. Therefore, the influence of the redirecting layer 70 on the output angular distribution of light can be changed by varying the relationship between the indices $n_{2a}$ and $n_{2b}$.

In another preferred form of the invention the layers 66 and 81 can be the same transparent material of index $n_2 < n_1$. In general, lower values of $n_2$ will enhance the efficiency of the device 10 by increasing the numerical aperture at the light input surface 65. Therefore, collection efficiency can be maximized when the layers 66 and 81 are gaps filled with air or other gases (with $n_2 = 1-1.01$).

Figure 12B:
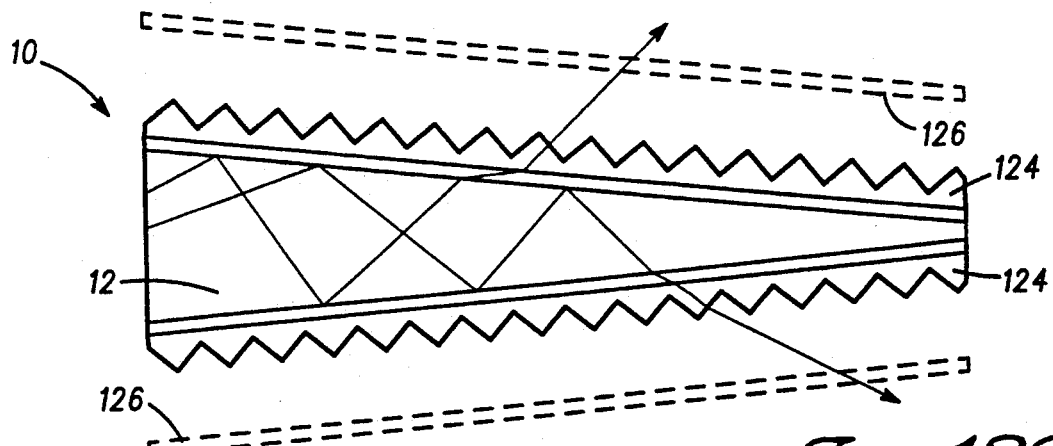
FIG. 12B shows a wedge shaped luminaire with a pair of refracting facet layers and diffusers.
Figure 12C:
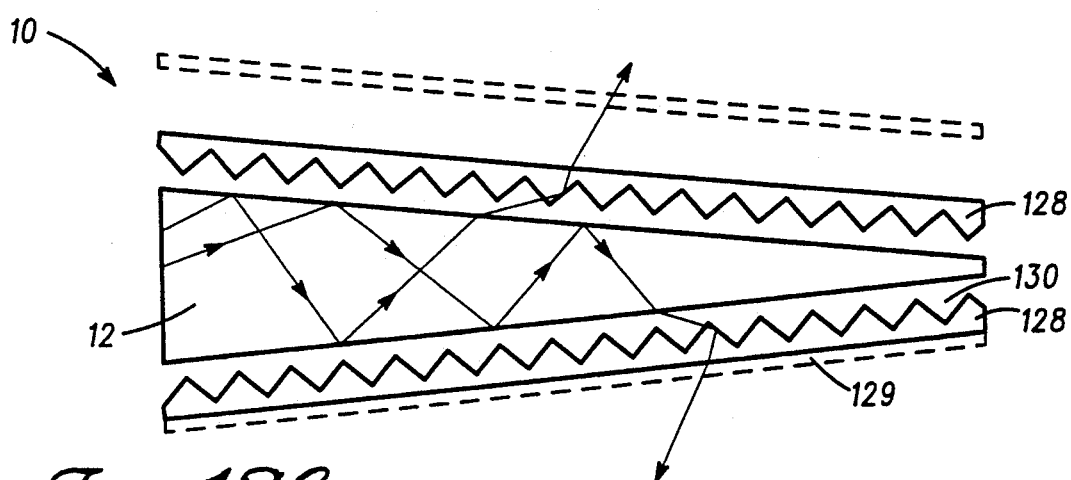
FIG. 12C illustrates a wedge shaped luminaire with a pair of faceted layers.
Figure 12D:
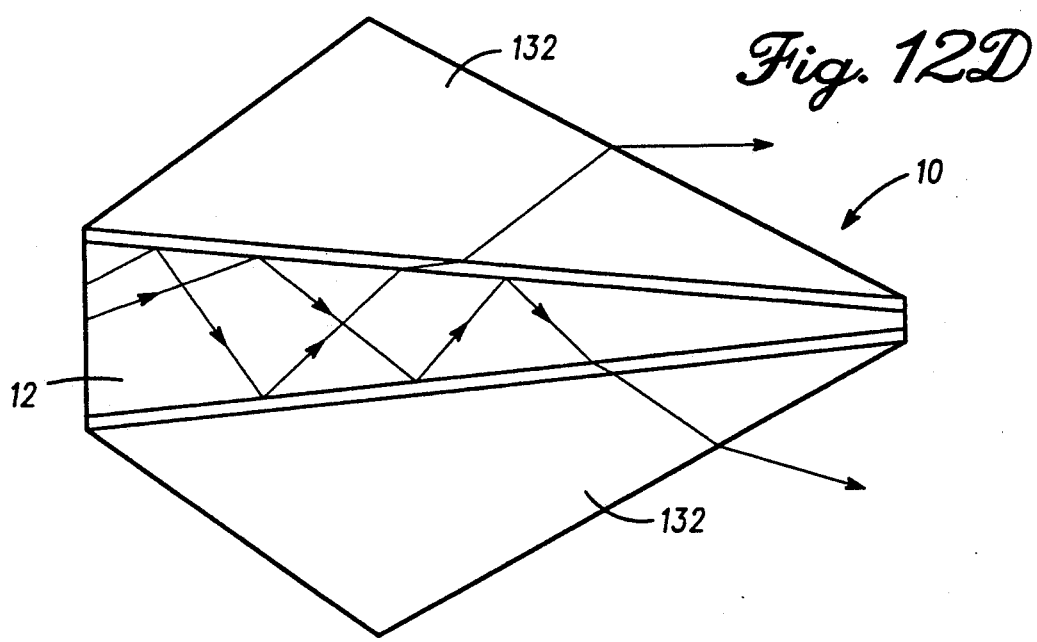
FIG. 12D shows a wedge shaped luminaire with two refracting single facet layers.

The thickness of the layers 66 and 81 can be selectively varied to control the output power spatial distribution of the device 10 or to enhance its visual uniformity. For example, increasing the thickness of the layer 81 by 0.002"-0.030" sharply reduces non-uniformities which tend to appear at the thicker end of the device 10. The thickness of layers 66 and 81 can also be smoothly varied with position to influence a desired spatial distribution of the light being output (see FIG. 12L).

In one preferred form of the invention shown in FIG. 6A, the light redirecting layer 70 includes a reflective layer 71 which reflects the light back through the layer 66 and the first layer 61. The light is then output into the first layer 61 through the top layer surface 62, and ultimately through the light redirecting layer 82 for further processing. The reflective layer 71 can, for example, be any combination of a planar specular reflector, a partially or completely diffuse reflector, or a faceted reflector.

Use of a planar specular reflector leads to the narrowest angular distribution within the layer 81. Therefore, the reflector can simplify design of the light redirecting layer 82 when the desired output angular distribution is unimodal. Diffuse or faceted reflectors can also be used for the layer 71 in order to achieve a large range of angular distributions (see FIGS. 4H and I) or to increase uniformity (see FIG. 4N). Diffuse reflectors are preferred if the desired angular distribution has large "tails" (see, in particular, FIG. 4I). Faceted reflectors can produce a bimodal angular distribution within the layer 81 (see FIG. 4H). Therefore, such faceted reflectors are preferred if the desired output angular distribution is bimodal. For example, a bimodal "batwing" distribution is preferred from luminaires for room illumination because it reduces glare.

In general each facet of the layer 71 can be shaped to control the angular distribution of the light reflected back through the layer 66 and the first layer 61 for further processing by the redirecting layer 82. The angular distribution within the device 10 will in turn influence the angular distribution of the light output into ambient from the redirecting layer 82. For example, curved facets can be used to smoothly broaden the angular distribution, as well as providing a diffusing effect to improve uniformity. The reflective layer 71 can also influence the output power spatial distribution as well as the angular distribution. The reflectivity, specularity, or geometry of the reflective layer 71 can be varied with position to achieve a desired output distribution. For example, small variations in the slope (see FIG. 12L) of each element of the reflective layer 71 as a function of position significantly change the light output distribution.

The light redirecting layer 82 has an index $n_3 > n_2$, and is substantially transparent or translucent. The light in the low-index layer 81 enters the layer 82 and is redirected into ambient. The transmissive redirecting layer 82 also redirects the light which has been processed by reflection from the redirecting layer 71 then transmitted back through the low-index layer 66 and the first layer 61. The transparency or geometry of the layer 82 can be varied with position to further influence the output spatial distribution of the device 10. In one preferred form of the invention the redirecting layer 82 includes a faceted surface at the interface with the low-index layer 81, as shown in FIG. 6A. Light entering the layer 82 is refracted by one side 84 of each facet 85 as it enters, and then is totally internally reflected by second side 86 of each of the facets 85. In one form of the invention the redirecting layer 82 can be a "Transparent Right-Angle Film" (hereinafter, TRAF), which is a trademark of 3M Corp., and this product is commercially available from 3M Corp. This TRAF operates by refraction and total internal reflection to turn incident light through approximately a ninety degree angle, as would be desired in a typical LCD backlighting application. The acceptance angle of the prior art TRAF is about twenty-one degrees, which is large enough to redirect a large fraction of light 75 which enters the low-index layer 81. In a more preferred form of the invention, the facet angles are chosen to redirect more of the light 75 which enters the low-index layer 81 by the described mechanism of refraction plus total internal reflection. Either one or both of the facet surfaces 84 and 86 can be shaped to control the output angular distribution. For example, the use of curved facets smoothly broadens the distribution, as well as providing a light diffusing effect which can improve uniformity.

Figure 12E:
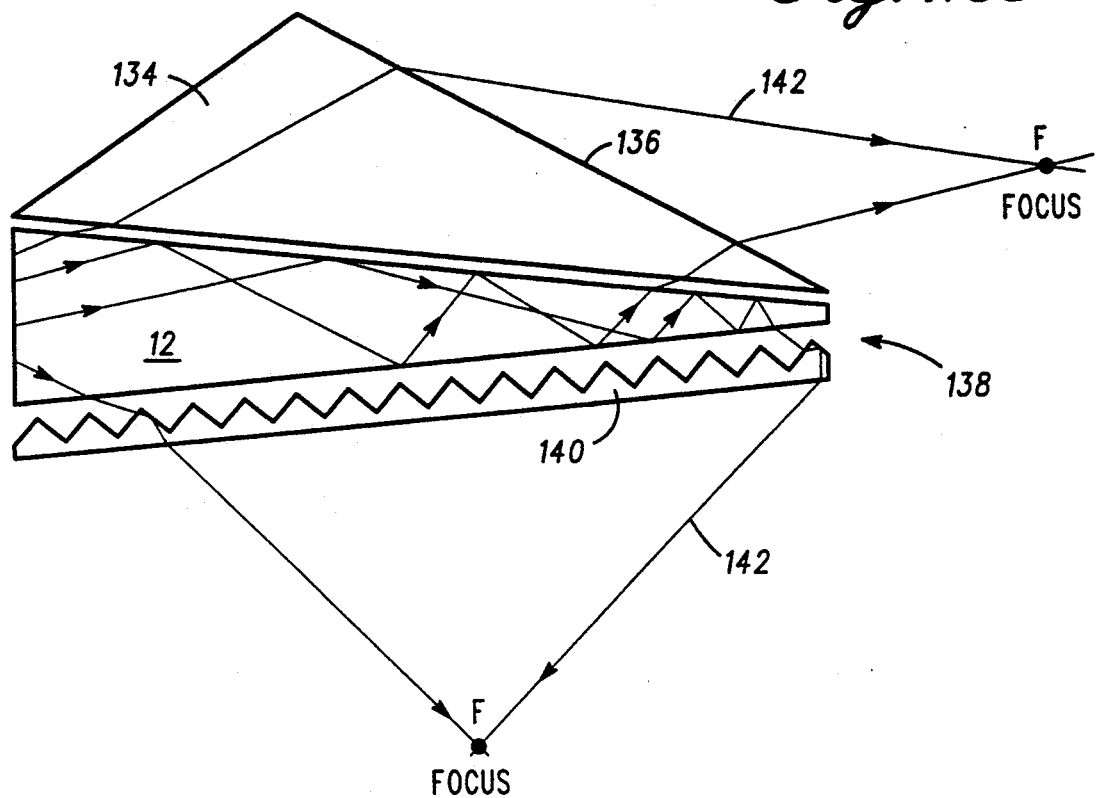
FIG. 12E illustrates a wedge shaped luminaire with a refracting single facet layer and a bottom surface redirecting layer.
Figure 12F:
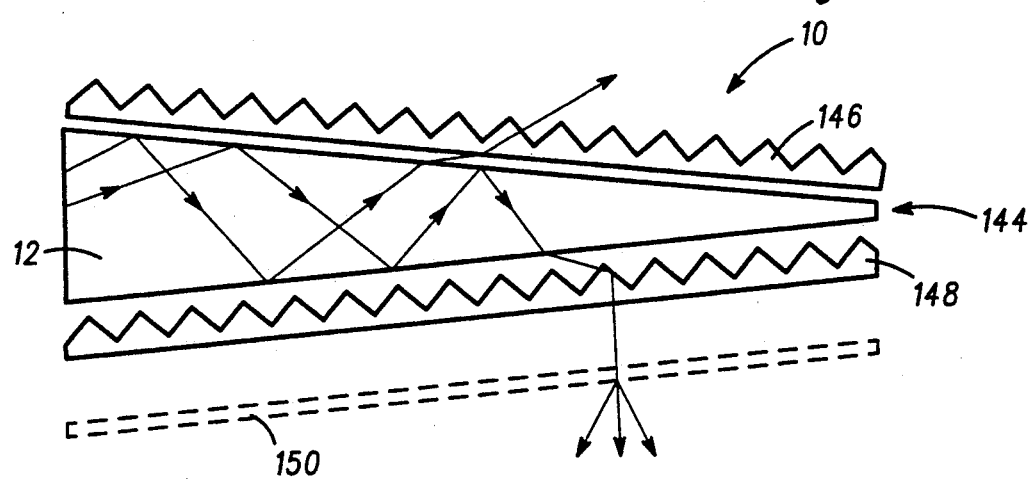
FIG. 12F shows a luminaire with a top surface redirecting layer of a refracting faceted layer and a bottom surface refracting and internally reflecting layer.
Figure 12G:
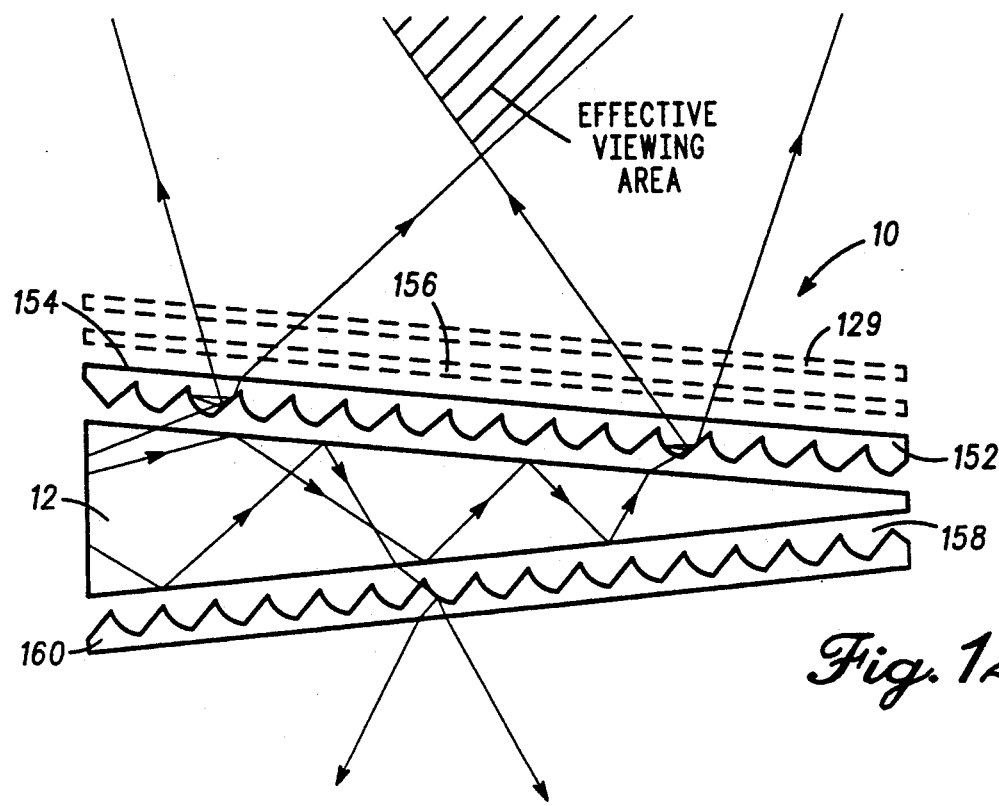
FIG. 12G illustrates a luminaire with a top surface refracting/internally reflecting faceted layer and a bottom surface refracting/internally reflecting faceted layer.

In another preferred embodiment, the facet angle surfaces of the redirecting layer 82 can be varied progressively to compensate for the variation in viewing angle with position, when viewed from typical viewing distances. The details of such a compensation effect were described earlier in reference to the design of the reflecting facet layer in the embodiment shown in FIG. 2M. Similar principles can be applied to the design of any faceted redirecting layer, including refracting layers and refracting/internally-reflecting layers. Examples of embodiments which make use of such progressively varied faceted layers are shown in FIGS. 12E (layer 140), 12G (layer 152), 12H (layer 166), 12K (layer 186), 12N (layer 210), 12O (layer 228), and 12P (layer 246).

In another form of invention the layers 66 and 81 can have similar but slightly different indices $n_2$ and $n_2'$, respectively. The operating principles of the device 10 will be substantially similar as long as the critical angles associated with interfaces between the first layer 61 and the two layers 66 and 81 do not differ by more than the first layer convergence angle:

$$|\text{acrsin}(n_2'/n_1) - \text{arcsin}(n_2/n_1)| < \phi \qquad (7)$$

Therefore, in this case approximately equal fractions of the light will enter layers 66 and 81, for further processing by the redirecting layers 70 and 82, respectively.

All forms of the invention can further include an output diffuser layer 40, shown in phantom in FIG. 2C or transmissive or translucent diffuser layer 83 shown in FIG. 6A. In general this diffuser layer 40 can be a surface diffuser, a volume diffuser, or at least one array of microlenses having at least a section of a cylinder (known as a "lenticular array"). These layers 40 and 83 can increase light uniformity or broaden the angular distribution into ambient. Lenticular arrays are advantageous because they have low back-scattering in comparison to surface or volume diffusers, and because they have sharper output angle cut-offs when illuminated by collimated light. Lenticular arrays also preferentially diffuse only those features which would otherwise run in the general direction of the axis of each cylindrical microlens.

In one preferred embodiment shown in FIG. 10, the light redirecting layer 110 makes use of flat facets 111 such that the output light is highly collimated. The desired output angular distribution is further controlled by including a lenticular diffuser 112 having an appropriate focal ratio, with its cylindrical microlenses running approximately parallel to the y-axis. The lenticular diffuser 112 also diffuses non-uniformities which would otherwise appear to be running in the general direction of the y-axis. In this embodiment a second lenticular diffuser 113 can be included to diffuse non-uniformities which would otherwise appear running in the general direction of the z-axis. This second lenticular diffuser's microlenses run approximately parallel to the z-axis (see FIG. 12H and 12N). Note that the order of positioning of the diffusers 112 and 113 can be interchanged without loss of optical advantage. Similarly, the lenticular diffuser 112 and 113 can be inverted and can have concave contours rather than convex contours shown in FIG. 10. While such changes can affect the details of the performance, the diffuser layers 112 and 113 can still provide the general advantages described.

In another preferred embodiment shown in FIG. 11, the functions of the flat-faceted light redirecting layer 110 and the parallel lenticular diffuser 112 in FIG. 10 can both be performed by a light redirecting layer 114 having curved facets (see also, for example, FIGS. 2H, 2M and 3A illustrating curved facets). These curved-facet layers redirect the light, control the angular output by having an appropriate facet curvature, and act as a diffuser for non-uniformities running in the general direction of the y-axis. By combining these functions in a single-layer the number of components is reduced, which improves thickness, cost, and manufacturability. In this embodiment, a single lenticular diffuser 115 can be included to diffuse the remaining non-uniformities which would otherwise appear running in the general direction of the z-axis. This type of lenticular diffuser microlens runs approximately parallel to the z-axis. Note that the lenticular diffuser 115 can be inverted and can have concave contours rather than the convex contours shown in FIG. 10. Again, such changes can affect performance details, but the layers 114 and 115 perform as intended.

In all embodiments using multiple micro-structured layers, the facet or lenslet spacings of these layers described hereinbefore can be chosen to have non-rational ratios, in order to avoid undesirable Moiré patterns. Similarly, each layer's feature spacing can be designed to have non-rational ratios with the apparatus to be illuminated, such as a liquid crystal display or charge-coupled detector (CCD) array. Each of the lenticular diffuser layers 113, 112 and 115 can be tilted up to about 20° from the configuration shown in the figures in order to reduce Moiré interaction between layers or with a liquid crystal display.

Similar lenticular diffusers can be used with non-wedge geometries having wedge shaped cross-sections, with similar advantages if the diffuser cross sections are approximately as shown in FIGS. 10 and 11. One example is the tapered disk illustrated in FIG. 5. In this case the lenticular diffuser analogous to layer 112 in FIG. 10 would have microlenses whose axes run in concentric circles about the disk's axis of rotations. A diffuser analogous to the layer 113 in FIG. 10 and 115 in FIG. 11 would have microlenses whose axes emanate radially from the disk's central axis.

Light Sources and Couplers

In a more preferred form of the invention shown in FIGS. 2A and B, a faceted layer 30 has been included for optically redirecting the light. The facets 34 can be integral to the layer 30 or a separate facet layer. Details of operation of such a faceted layer have been discussed hereinbefore. As shown further in FIG. 6A an input faceted layer 74 can also be disposed between a light source 76 and the first layer 61. The faceted layer 74 can be a prismatic facet array which provides a collimating effect for input light 78 which provides brighter or more uniform output light 80 into ambient.

Linear prisms parallel to the y-axis can improve uniformity by adjusting the input angular distribution to match more closely the input numerical aperture. Linear prisms parallel to the x-axis can limit the output transverse angular distribution, and also improve output brightness when used with a fluorescent lamp light source. In other forms of the invention, diffusion of input light is desirable wherein a diffuser 79 is used to diffuse the light distribution to spread out the light to improve light uniformity. The diffuser 79 is preferably a lenticular array, with cylindrical lenslets parallel to the y-axis. The diffuser 79 can also be a standard surface or volume diffuser, and can be a discrete film or coupled integrally to the wedge layer 61. Multiple prismatic or diffuser films can be used in combination. Such a film form of the diffuser 79 and the faceted film 74 can be interchanged in position to vary their effects.

Figure 12H:
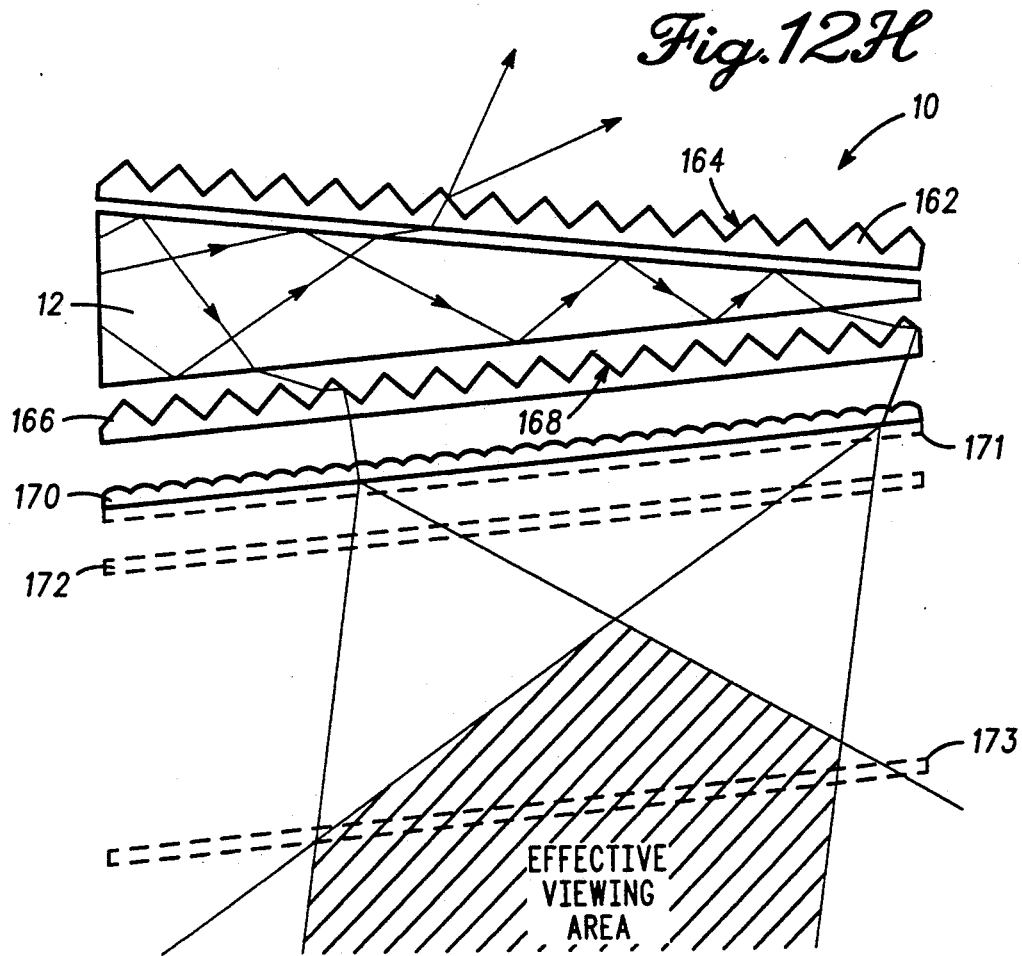
FIG. 12H shows a luminaire with a top surface refracting faceted layer and a bottom surface refracting/internally reflecting faceted layer.
Figure 12I:
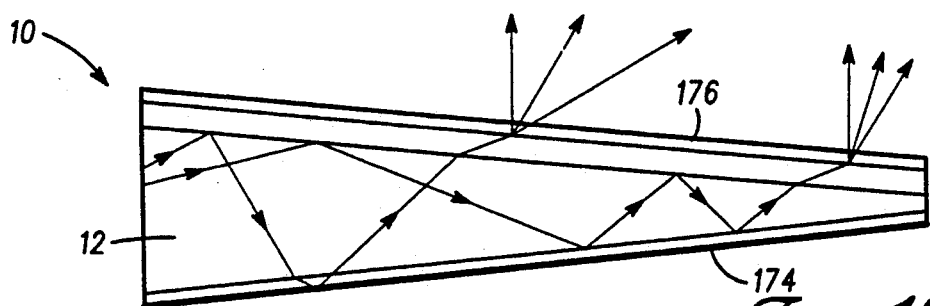
FIG. 12I illustrates a luminaire with a bottom surface specular reflector and a top layer transmission diffraction grating or transmission hologram.
Figure 12J:
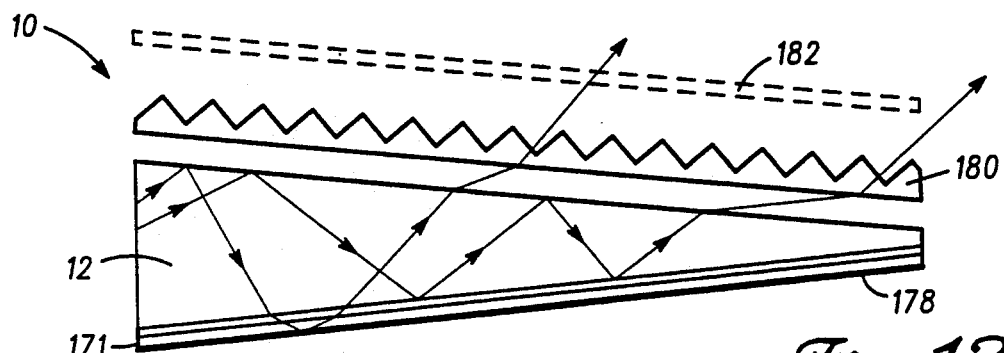
FIG. 12J shows a luminaire with a bottom surface specular reflector and a top surface refracting faceted layer and diffuser.
Figure 12K:
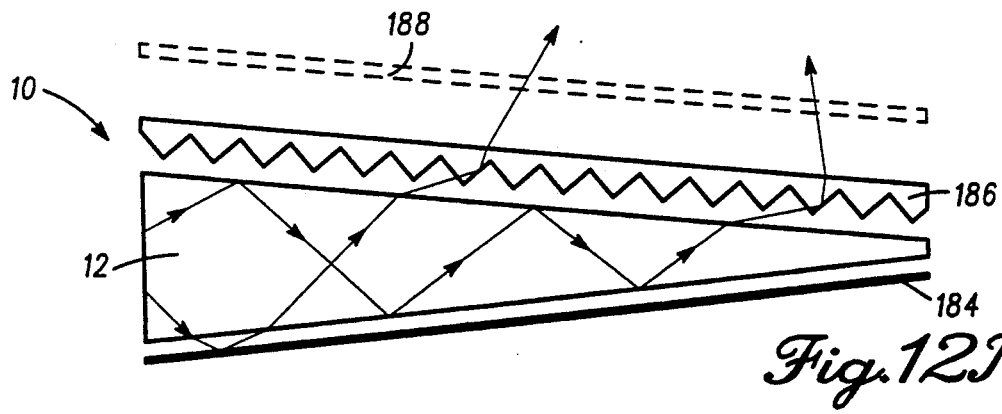
FIG. 12K illustrates a luminaire with a bottom layer specular reflector and a top layer refracting/internally reflecting faceted layer.
Figure 12L:
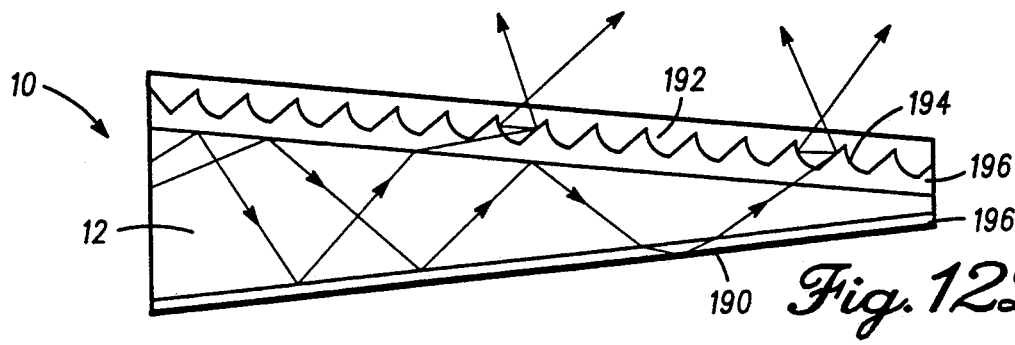
FIG. 12L shows a luminaire with a bottom specular reflector and a top layer refracting/internally reflecting faceted layer.
Figure 12O:
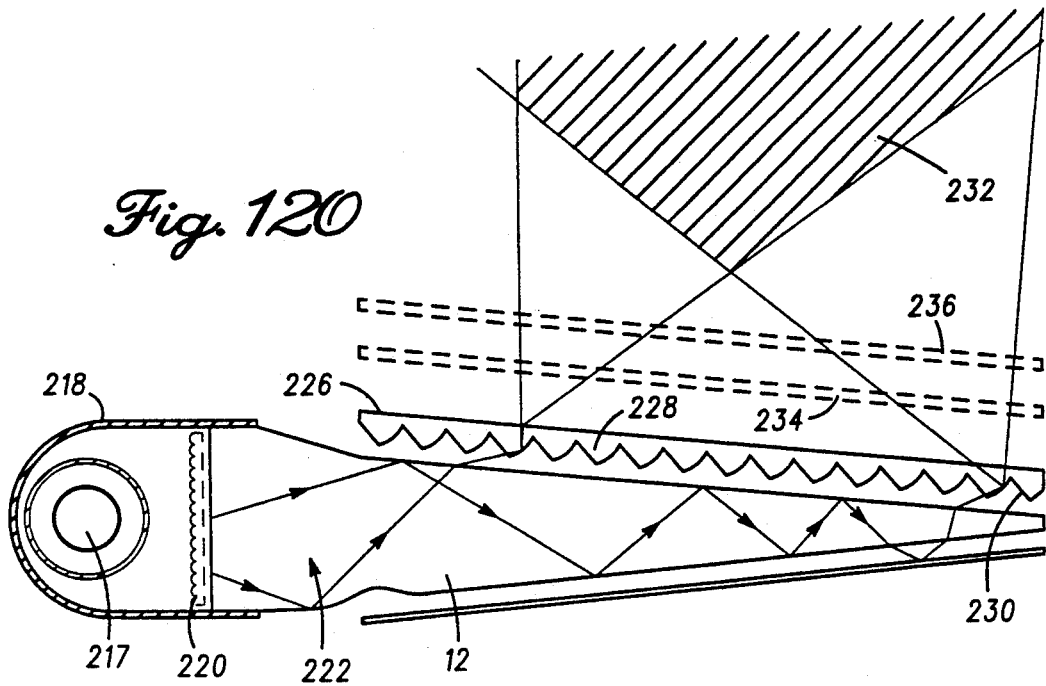
FIG. 12O illustrates a luminaire with an eccentric light coupler and converging to the wedge shaped section.
Figure 12P:
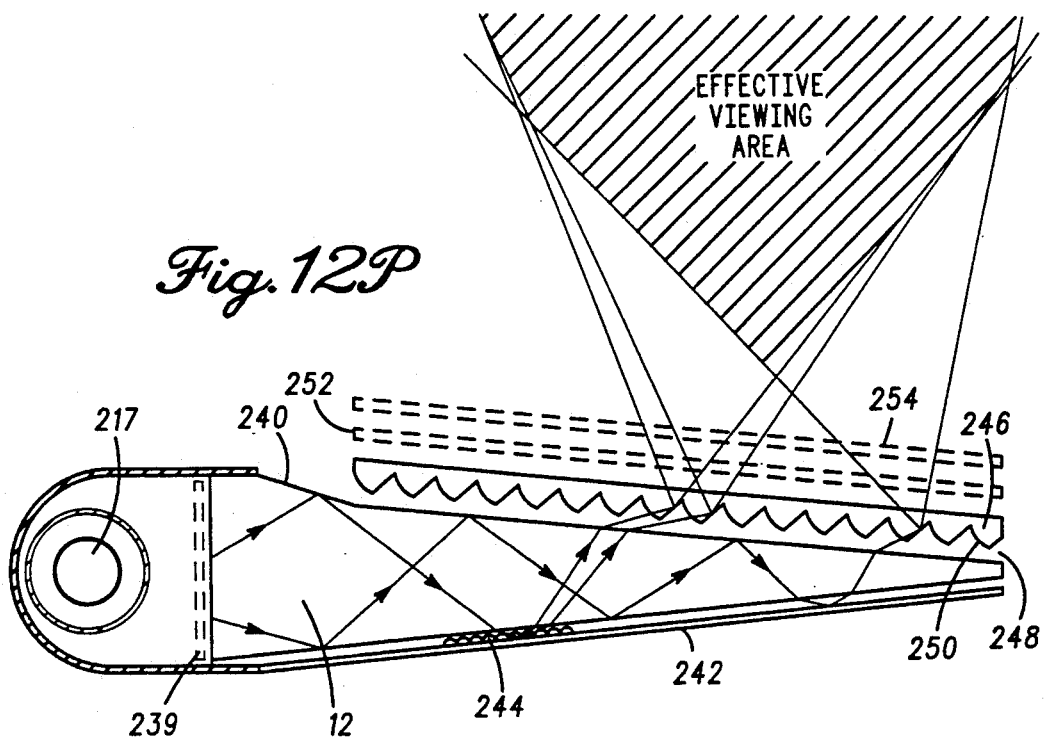
FIG. 12P shows a luminaire with an eccentric light coupler and a diffuser and roughened or lenticular reflector.
Figure 12Q:
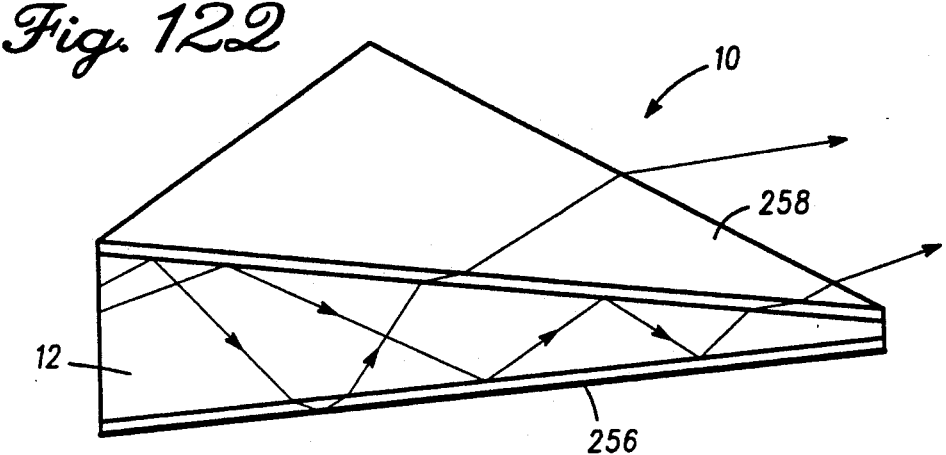
FIG. 12Q illustrates a luminaire with a bottom specular or diffusely reflecting layer and a top refracting layer and FIG. 12R shows a luminaire for generating a "bat wing" light output.

In another preferred form of the invention, a portion of a dielectric total internally reflecting CPC portion 100 (compound parabolic concentrator) can be interposed between the light source 76 and the first layer 61 (see FIGS. 2L, 12O and 12P). The CPC portion 100 adjusts the input light to match more closely the input numerical aperature. The CPC portion 100 is preferably formed integrally with the first layer 61.

Reflector elements 92 and 94 shown in FIGS. 7 and 8, respectively, can be shaped and positioned to maximize the throughput of light from the light source 76 to the light-pipe aperature. This is equivalent to minimizing the reflection of light back to the light source 76, which partially absorbs any returned light. The light source 76 is typically cylindrical and is surrounded by a transparent glass envelope 93, each having circular cross-sections as shown in FIGS. 7 and 8. Typical examples of such light sources include fluorescent tubes and long-filament incandescent lamps. The outer diameter of the light source 76 can be less than or equal to the inner diameter of the glass envelope 93. FIG. 7 shows a prior art U-shaped reflector 92 formed by wrapping a specular reflectorized polymer film around the light source 76 and making contact with the wedge layer 12 at each end of the film. The reflector element 92 typically is formed into a shape which is approximately an arc of a circle on the side of the light source 76 opposite the wedge layer 12, with approximately straight sections connecting each end-point of the arc with the wedge layer 12. This manner of coupling the reflector element 92 to the wedge layer 12 is most easily accomplished when the reflector element cross-section lacks sharp corners. In general the light source 76 is not permitted to touch either the wedge layer 12 or the reflectorized film, in order to minimize thermal and electrical coupling which can reduce lamp efficiency.

In one form of the present invention shown in FIG. 8, the reflector element 94 is advantageously designed and the light source 76 is advantageously placed to minimize the fraction of light returned to the light source 76, and thereby increases efficiency. In one preferred embodiment, at least a section of the reflector element 94 is shaped such that a line drawn normal to the surface of the reflector element 94 at each point is tangent to the circular cross-section of the light source 76. The resulting reflector shape is known as an involute of the light source 76.

While an involute provides maximum efficiency, other shapes can generally be more easily manufactured. Polymer films can be readily bent into smooth curves which include almost semicircular arcs, as described above. It can be shown that when the cross-section of the light source 76 and semicircular section of the reflector element 92 are concentric as shown in FIG. 7, then the semicircular section of the reflector element 92 will return all incident rays to the light source 76, leading to poor efficiency. Such inefficiency is a general property of self-absorbing circular sources and concentric semicircular reflectors. This general property can be derived from simple ray-tracing or the principal of skew invariance. Even if the reflector element 92 is not perfectly circular, each portion of the reflector element 92 will tend to return light to the light source 76 if the cross-section of the light source 76 is centered near the center of curvature of that reflector section.

In another preferred embodiment, the cross-section of the reflector element 94 in FIG. 8 includes one or more almost semicircular arcs, and efficiency is increased by displacing the center of the light source 76 away from the center of curvature of the reflector element 94. Ray-tracing and experiments have shown that such preferred embodiments can be determined using the following design rules:

1. The cross-section of the reflector element 94 has a maximum extent in the x-dimension equal to the maximum thickness of the wedge layer 12 (or light pipe);
2. The cross-section of the reflector element 94 has no sharp corners;
3. The radius of curvature of the reflector element 94 is as large as possible; and
4. The light source 76 is as far as possible from the wedge layer 12, but is far enough from the reflector element 94 to avoid contact with worst-case manufacturing variations.

FIG. 8 shows an example of a coupler which satisfies these above described design rules for the light source 76 with inner diameter=2 mm, outer diameter×3 mm, thickness of the wedge layer 12 (or light pipe)=5 mm, and manufacturing tolerances which permit a 0.25 mm spacing between the reflector element 94 and the outer diameter of the glass envelope 93. In this example of a preferred embodiment the radius of curvature of the reflector element 94 is 2.5 mm, and the center of the light source 76 is displaced by 0.75 mm away from the aperture of the wedge layer 12. A coupler constructed according to this design was found to be 10-15% brighter than the comparable concentric coupler shown in FIG. 7.

Figure 6B:
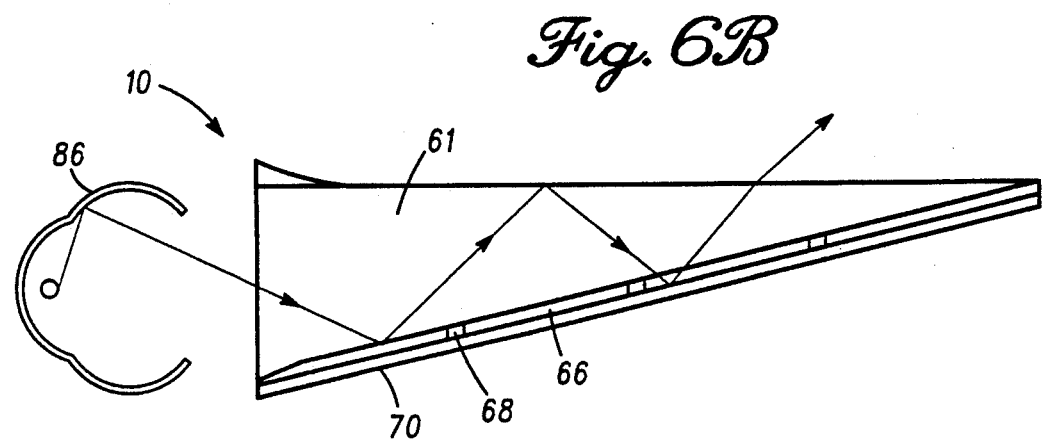
FIG. 6B shows another tapered luminaire in cross section with a compound parabolic light source/concentrator.

The involute and the U-shaped reflector elements 92 and 94 previously described are designed to output light to the aperture of the wedge layer 12 with angles approaching ±90 degrees relative to the aperture surface normal. In another preferred embodiment, the reflector element 94 is shaped to output light with an angular distribution which is closer to the N.A. of the device 10. As shown in FIGS. 6B and 6C, such shapes as the reflector element 94 can include other geometries, such as, a compound parabolic source reflector 86 and a nonimaging illumination source reflector 88. An example of the source reflector 88 is described in copending Ser. No. 07/732,982 assigned to the assignee of record of the instant application, and this application is incorporated by reference herein now allowed on Sep. 17, 1993.

In another embodiment of the invention shown in FIGS. 6D, 12L, 12N, and 12O, the wedge layer 90 has a non-monotonic varying wedge cross sectional thickness over various selected portions of the wedge shaped cross section. It has been determined that one can exert control over the light distribution being output by control of this cross section. Further, it has been determined that optical boundary effects, as well as intrinsic light source effects, can combine to give an output light distribution with unwanted anomalies. One can therefore also compensate for these anomalies, by providing a wedge cross section with nonlinear changes in the actual dimensions of the wedge layer 90, for example, near the thicker end which typically receives the input light. By control of these dimensions one can thus have another degree of freedom to exert control over the light distribution, as well as provide virtually a design to compensate for any boundary effect or light source artifact. Furthermore, one can vary the index of refraction within the wedge layer 90 in the manner described hereinbefore to modify the distribution of light and also compensate for light input anomalies to provide a desired light distribution output.

Manufacture of Luminaire Devices

In one form of the invention, manufacture of the device 10 can be accomplished by careful use of selected adhesives and lamination procedures. For example, the wedge layer 12 having index $n_1$ can be adhesively bonded to the first layer 28 having index $n_2$. An adhesive layer 60 (see FIG. 3B) can be applied in liquid form to the top surface of the first layer 28, and the layer 28 is adhesively coupled to the bottom surface 16 of the wedge layer 12. In general, the order of coupling the various layers can be in any given order.

In applying the layer 12 to the layer 28 and other such layers, the process of manufacture preferably accommodates the formation of internal layer interfaces which are substantially smooth interfacial surfaces. If not properly prepared such internal layers can detrimentally affect performance because each interface between layers of different indices can act as a reflecting surface with its own characteristic critical angle. If the interfacial surfaces are substantially smooth, then the detrimental effect of uneven surfaces is negligible. Therefore in effectuating the lamination of the various layers of the device 10, the methodology should utilize adhesives and/or joining techniques which provide the above described smooth interfacial layers. Examples of lamination processes include without limitation joining without additional adhesive layers, coatings applied to one layer and then joined to a second layer with an adhesive and applying a film layer with two adhesive layers (one on each layer surface to be joined to the other).

In a preferred embodiment lamination of layers is done without any additional internal layer whose potential interfacial roughness will distort the light distribution. An example of such a geometry for the device 10 can be a liquid layer between the wedge layer 12 and the second layer 30. This method works best if the first layer 29 (such as the liquid layer) acts as an adhesive. One can choose to cure the adhesive either before, partially or completely, or after joining together the various layers of the device 10. The optical interface is thus defined by the bottom surface of the wedge layer 12 and the top surface of the second layer 30.

In another embodiment wherein a coating is used with an adhesive layer, the first layer 28 can be the coating applied to the second layer 30. Then, the coated film can be laminated to the wedge layer 12 in a second step by applying an adhesive between the coated film and the wedge layer 12. It is preferable to apply the low index coating to the second layer 30 rather than directly to the wedge layer 12 since the second layer 30 is typically supplied in the form of continuous film rolls. In practice it is more cost effective to coat such continuous rolls than to coat discrete pieces. With this methodology it is more convenient to control thickness of the applied low index layer.

In another embodiment, the second layer 30 is manufactured in such a way that it adheres to the first layer 28 directly without use of additional adhesives. For example, the second layer 30 can be manufactured by applying a layer of polymer material to the first layer 28, and then casting this material to have the desired second layer geometry. In another example, the first layer 28 can serve as a carrier film during the embossing of the second layer 30. By use of appropriate temperatures during the embossing process, the second layer 30 can be heat-fused to the first layer 28. Such heat-fusing can be accomplished using a conventional FEP first-layer film by embossing at almost five hundred degrees F. or higher.

In a further embodiment using a film and two adhesives, the first layer 28 can be an extruded or cast film which is then laminated to the wedge layer 12, or between the wedge layer 12 and the second layer 30 using adhesive between the two types of interfaces. In order to minimize the detrimental light scattering described hereinbefore, the adhesive layer should be flat and smooth. The film can be obtained as a low index material in commercially available, inexpensive forms. Such additional adhesive layers can increase the strength by virtue of the multi-layer construction having adhesive between each of the layers.

In the use of adhesive generally, the performance of the device 10 is optimized when the index of the adhesive between the wedge layer and the first layer is as close as possible to the index of the first layer 28. When the critical angle at the wedge/adhesive interface is as low as possible, then the light undergoes a minimal number of reflections off the lower quality film interface before exiting the device 10. In addition, the index change at the surface of the first layer film is minimized which decreases the effects of film surface roughness.

Manufacture of faceted surfaces can be accomplished by micro-machining a mold using a master tool. Machining can be carried out by ruling with an appropriately shaped diamond too. The master tool can be replicated by known techniques, such as electroforming or casing. Each replication step inverts the shape of the desired surface. The resulting mold or replicates thereof can then be used to emboss the desired shape in the second layer 30. A directly ruled surface can also be used, but the above described embossing method is preferred. Known "milling" processes can include chemical etching techniques, ion beam etching and laser beam milling.

In yet another method of mechanical manufacture, the faceted surface 34 (see FIGS. 2B and 2M, for example) is manufactured by a welding process, such as embossing or casting, using a hard tool which has on one surface the inverse of the profile of the desired faceted surface 34. Therefore, the manufacturing problem reduces to the matter of machining an appropriate tool. Usually the machined tool is used as a template to form the tools actually used in the casting or embossing process. Tools are typically replicated by electroforming. Since electroforming inverts the surface profile, and electroforms may be made from other electroforms, any number of such inversions can be accomplished and the directly machined "master" can have the shape of the faceted surfaces 3A or its inverse.

The tooling for the faceted surface 34 can be manufactured by single-point diamond machining, wherein the distance between cutting tool and the work 18 is varied to trace out the desired profile. The diamond cutting tool must be very sharp, but in principle nearly arbitrary profiles can be created. A given design can also require specific adaptations to accommodate the non-zero radius of the cutting tool. If curved facet surfaces are required, then circular arcs are preferred to facilitate fabrication. The cutting tool is moved through the cutting substrate and cuts a groove having the approximate shape of the tool. It is desirable to machine the entire piece using a single diamond tool. When this method is used for making a "focusing" type of the faceted surface 34, the variable groove profile therefore should be designed such that the various groove profiles can be machined by the same tool. The required shape variations can still be accomplished by varying the angle of the tool, as well as the groove spacing and depth.

Design of the faceted surface 34 preferably satisfies a few general constraints:
1. Approximately linear variation in the center of the illumination angular distribution as a function of position. A variation of 11 degrees ($\pm 5.5°$) from top to bottom of typical computer screens is effective;
2. The width of the variable angular distribution of light output should be approximately proportional to the local illuminance in order to achieve approximately uniform brightness to an observer. Examples given below show the spatial distribution is approximately uniform, so the angular cones have approximately uniform width; and
3. Spacing between grooves of the facets 38 should be large enough or irregular enough to avoid diffraction effects, but also be chosen to avoid Moieë patterns when used with an LCD panel. In practice these requirements limit the allowed spatial variations.

In the manufacture of the device 10, for example, the viewing angle depends on the tilt and curvature of each of the facets 38. Focusing is accomplished by rotating the facet structure as a function of position. Using the example of a 150 mm screen viewed from 500 mm away, the illumination cone can be varied by 17 degrees (i.e., ±8.5 degrees) from top to bottom. For typical materials, acrylic and FEP, this requires the facet structure to rotate by approximately 5.7 degrees from top to bottom of the screen 89 (see FIG. 9B).

Design constraints can result when limitations (1)–(3) are combined with the need to machine variable curved grooves with a single tool. For example, maintaining a constant angular width (Constrain #1) at a constant cutting depth requires a compensating variation in groove spacing or groove depth. Specifically, a linear change in groove spacing can reduce the brightness variation to a negligible level when the form tool which cuts the groove is shaped so that portions of each curved reflector facets (see FIG. 2M) are shadowed by the top edge of the adjacent facets. This spacing variation can be small enough to satisfy Constraint #3.

Further methods of manufacture can include vapor deposition, sputtering or ion beam deposition of the first layer 28 since this layer can be quite thin as described hereinbefore. Likewise, the second layer 30 can be controllably applied to form the faceted layer 30 shown in FIG. 2B( such as by masking and layer deposition).

Wedge Light Pipe as a Simple Collimator Device

In the most general embodiment the wedge layer 12 can function in the context of the combination as a simple collimating optical element. The substantially transparent wedge layer 12 has an optical index of refraction $n_1$ and the top surface 14 and the bottom surface 16 converge to establish at least one angle of inclination $\phi$ (see FIG. 15). The wedge layer 12 also includes the back surface 20 spanning the top surface 14 and the bottom surface 16. Adjacent to the wedge layer 12 is the transparent first layer 28 having index of refraction $n_2$ including an air gap. Adjacent to the first layer 28 is a specular reflective layer, such as the faceted surface 34 of the second layer 30.

Substantially uncollimated light is introduced through the back surface 20 by the source 22. The light propagates within the wedge layer 12, with each ray decreasing its incident angle with respect to the top and bottom surfaces 14 and 6 until the incident angle is less than the critical angle $\theta_c$. Once the angle is less than $\theta_c$, the ray emerges into ambient. Rays which emerge through the bottom surface 16 are reflected back into the wedge layer 2 and then output into ambient. By virtue of the angle-filtering effect previously described, the output light is collimated with a cone of angular width:

$$\Delta\theta \approx 2\phi^{\frac{1}{2}}(n^2-1)^{\frac{1}{4}} \text{ (Fresnel reflections will somewhat increase } \Delta\theta.\} \tag{8}$$

An area 99 to be illuminated lies beyond the end of the wedge layer 12 and substantially within the above-defined cone of width $\Delta\theta$.

In another preferred embodiment a light-redirecting means can be positioned beyond the end of the wedge layer 12 and substantially within the above-defined cone of width $\Delta\theta$. The light-redirecting means can be a lens, planar specular reflector, or curved reflector. The light-redirecting means reflects or refracts the light to the area to be illuminated. Further details and uses of such redirecting means, such as lenicular diffusers, will be described hereinafter.

In the embodiments of FIG. 6 having two air gaps or transparent dielectric layers, the light redirecting layers are independent, and thus one can construct devices having layers of different types. For example, the use of two transmissive redirecting layers is preferred when light is to be emitted from both sides of the device 10 or whenever maximum collimation is desired. Examples of the redirecting layer 82 in general for all inventions for two redirecting layers can include the examples in FIG. 12: (a) diffraction gratings 120 or a hologram 122 in FIG. 12A, (b) two refracting facet layers 124 with diffusers 126 in FIG. 12B, (c) two faceted layers 128 with facets 130 designed to refract and internally reflect light output from the wedge layer 12; such facets 130 are capable of turning the light output through a larger angle than is possible by refraction alone; (d) two refracting single facet layers 32 (prisms); (e) a top surface redirecting layer for the wedge layer 12 having a refracting single facet layer 134 with a curved output surface 136 for focusing. A bottom surface 138 includes a redirecting layer for refracting and internally reflecting light using a faceted layer 140; facet angles are varied with position to focus output light 142 at F; (f) a top surface redirecting layer 144 comprised of a refracting faceted layer 146 and a bottom redirecting layer comprised of a refracting/internally reflecting light 148 with narrow angle output for the light, and a diffuser layer 150 can be added to smoothly broaden he light output angular distribution; (g) a top surface redirecting layer of refracting/internally reflecting faceted layer 52 with refracting surfaces 54 convexly curved to broaden the output angular distribution; the facet angles can be varied with position and thereby selectively direct the light output angular cones to create a preferred viewing region at a finite distance; this arrangement can further include a transverse lenicular diffuser 156 to diffuse nonuniformities not removed by the curved facet layer 152; the bottom redirecting layer comprises a refracting/internally reflecting faceted layer 158 with a reflecting surface 160 being concavely curved to broaden the light output angular distribution in a controlled manner; (h) a top redirecting layer, including a refracting faceted layer 162 with curved facets 164 to broaden the output angular distribution in a controlled manner and to improve uniformity; a bottom redirecting layer, including a refracting/internally-reflecting faceted layer 166 with flat facets 168 for narrow-angle output, with facet geometry varied with position to focus output light at a finite distance; a parallel lenicular diffuser 170 can be used to smoothly broaden the output angular distribution in a controlled manner and to improve uniformity; the transparent image shown in phantom can be printed on or adhesively based to a lenicular diffuser; a transverse lenicular diffuser 172 is used to diffuse non-uniformities not removed by the parallel lenicular diffuser 170. The combination of a focused flat-faceted layer 166 and the diffuser 170 cooperate to create a preferred viewing zone at the finite distance, similar to using focused curved facets. Also shown is an LCD component 173 (in phantom) usable with this and any other form of the device 10 for illumination purposes.

In other architectures, one transmissive and one reflective redirecting layer can be combined. These are combinations of reflective redirecting layers with the various types of transmissive redirecting layers discussed above. Reflective redirecting layers can be specular, partially diffuse, diffuse, faceted or any combination thereof. These architectures are preferred when light emission is desired from one side only, or in some cases when minimum cost is paramount. Examples of such architectures are: (i) a bottom surface specular reflector 174 combined with a top layer transmission diffraction grating or transmission hologram 176; (j) a bottom surface specular reflector 178 combined with a top surface refracting faceted layer 180, with a diffuser 82 (shown in phantom in FIG. 12J and an intervening image-forming layer 171; (k) a bottom layer specular reflector 184 with a top layer refracting/internally-reflecting faceted layer 186, with facet geometry being varied with position to focus output light at a finite distance; a diffuser 188 is shown in phantom; (l) a bottom layer specular reflector 190 with a top layer refracting/internally-reflecting faceted layer 192, and curved facets 194 are used to smoothly broaden the angular output of light in a controlled manner and to improve uniformity. The thickness of the wedge layer 12 and of both top and bottom surface low-index layers 196 (e.g., air gaps) are varied to influence the light output spatial distribution; (m) a bottom reflector 198 is partially specular, partially diffuse to improve uniformity; FIG. 12M shows the initial reflector section made controllably diffuse by addition of an integral lenticular diffuser 200; the diffuser 200 is designed to selectively reduce nonuniformities which would otherwise appear in the output near the thicker end, and running in the general direction of the y-axis; also included is a top redirecting layer 202 which is refracting/internally-reflecting and has a reflecting surface which is curved; and (n) a bottom reflector layer 204 which is partially specular, partially diffuse to improve uniformity; FIG. 12N shows the initial reflector section 206 which is slightly roughened to reduce specularity, and thereby selectively reduces nonuniformities which would otherwise appear in the output near ticker end 208; a top redirecting layer 210 is used which is refracting/internally-reflecting with a flat-faceted layer 212, and the facet geometry is varied to redirect light from each facet to a common focus at finite distance; a transverse lenticular diffuser 213 is shown in phantom; a parallel lenticular diffuser 214 is used to smoothly broaden the output angular distribution in a controlled manner, converting the focal zone of the flat-faceted layer 212 to a wider preferred viewing zone; the lenticular diffuser 213 also improves uniformity; and LCD display 216 or other transparent image is show in phantom; (o) in a preferred embodiment an eccentric coupler 218 uses a uniformity-enhancing lenticular diffuser 220 shown in phantom in FIG. 12O. A converging tapered section 222 or CPC (integral to the wedge layer) transforms the output angular distribution to match more closely the input N.A. of the wedge layer 12. The wedge layer 12 thickness is smoothly varied to influence output spatial distribution and improve uniformity; a bottom redirecting layer 224 is a specular or partially diffuse reflector; a top redirecting layer 226 is a refracting/internally-reflecting faceted layer 228 with reflecting surfaces 230 convexly curved to smoothly broaden output angle in a controllable manner; facet geometry is varied with position to selectively direct the angular cone of light from each face to create a preferred viewing zone 232 at a finite distance; a transverse lenticular diffuser 234 is shown in phantom; an LCD display 236 or other transparent image is also shown in phantom; the more converging N.A.-matching section is advantageous in combination with the faceted redirecting layers, because the redirecting and low-index layers do not need to overly the more converging section; therefore, the input aperture (and thus efficiency) of the device 10 is increased with minimum increase in total thickness of the device; (p) another preferred embodiment for LCD backlighting uses an eccentric coupler with a uniformity-enhancing diffuser shown in phantom in FIG. 12P; a converging half-tapered section 240 or half-CPC (integral to the wedge layer 12) transforms a coupler output angular distribution to match more closely the input N.A. of the wedge layer 12. A diffuser 239 (in phantom) can also be interposed between light source 217 and the wedge layer 12. The sufficiently truncated half-CPC 240 is just a simple tapered section. A bottom reflector 242 which is partially specular, partially diffuse is used to improve uniformity; FIG. 12P further shows an initial reflector section 244 which is slightly roughened to reduce specularity, or alternatively shaped into a series of parallel reflective grooves, which thereby selectively reduces nonuniformities which would otherwise appear in the output near the thicker end; a top redirecting layer 246 is a refracting/internally-reflecting faceted layer 248, with refracting surfaces 250 convexly curved to smoothly broaden output angle in a controllable manner; facet geometry is varied with position to selectively direct angular cones of light from each facet to create a preferred viewing zone at a finite distance; a transverse lenticular diffuser 252 is shown in phantom. Also included is an LCD display 254 or other transparent image shown in phantom.

Figure 12R:
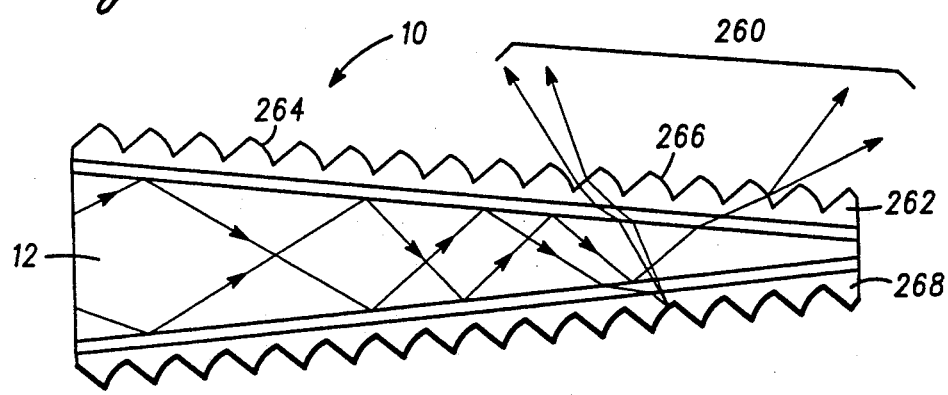

The more converging N.A.-matching section (such as half tapered section 240) is advantageous in combination with the faceted redirecting layers, because the redirecting and low-index layers do not need to overly the more converging section; therefore, the light-accepting aperture of the device 10 is increased without increasing the total thickness. The advantage is also conferred by the fully-tapered section 222 shown in FIG. 12O; but in comparison the half-tapered section 240 in FIG. 12P provides greater thickness reduction on one side, at the expense of being longer in the direction of taper for equivalent N.A.-matching effect. It can be desirable to concentrate the thickness reduction to one side as shown, because the top surface low-index layer can be made thicker to improve uniformity. This configuration can be more easily manufactured because the bottom reflector layer can be integral to the coupler reflector cavity, without need to bend a reflective film around a corner; (q) a bottom specular or diffusely reflecting layer 256 can be combined with single-facet refracting top layer 258 in yet another embodiment (see FIG. 12Q); and (r) in cases for interior lighting usage, a bimodal "batwing" angular light distribution 260 is preferred; in FIG. 12R is shown a top refracting layer 262 with facets 264 and has a curved front surface 266 to smoothly broaden angular output and improve uniformity, with output light directed primarily into a forward quadrant; a bottom reflecting layer 268 reflects light primarily through a back surface of a top redirecting layer, with output directed substantially into a backwards quadrant.

Figure 13:
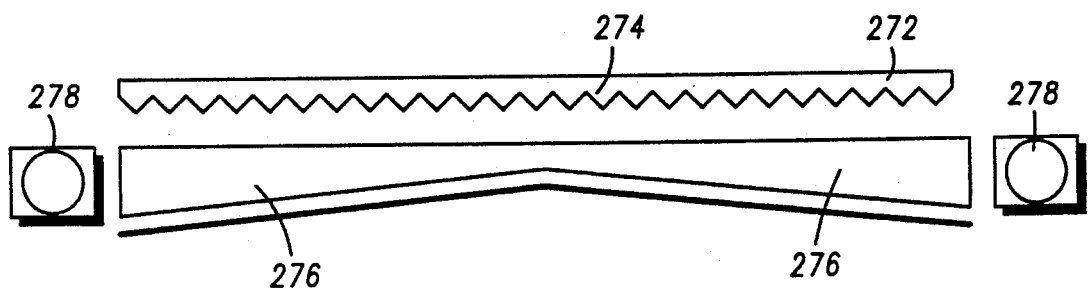
FIG. 13 illustrates a combination of two wedge shaped sections formed integrally and using two light sources.
Figure 2E:
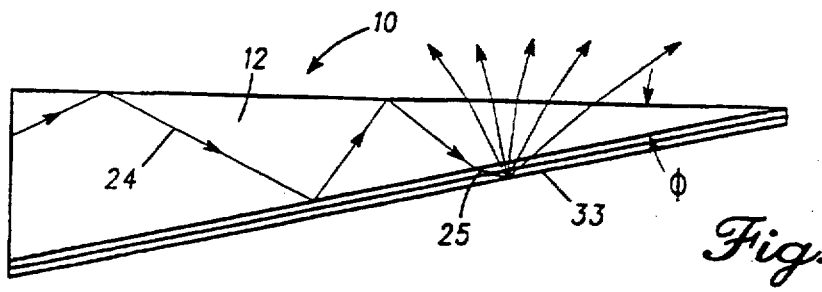
Figure 2F:
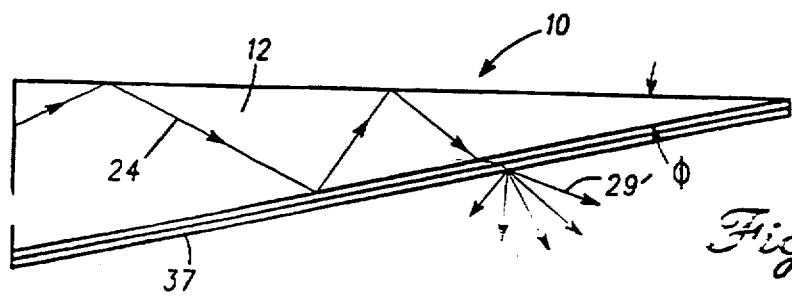
Figure 2G:
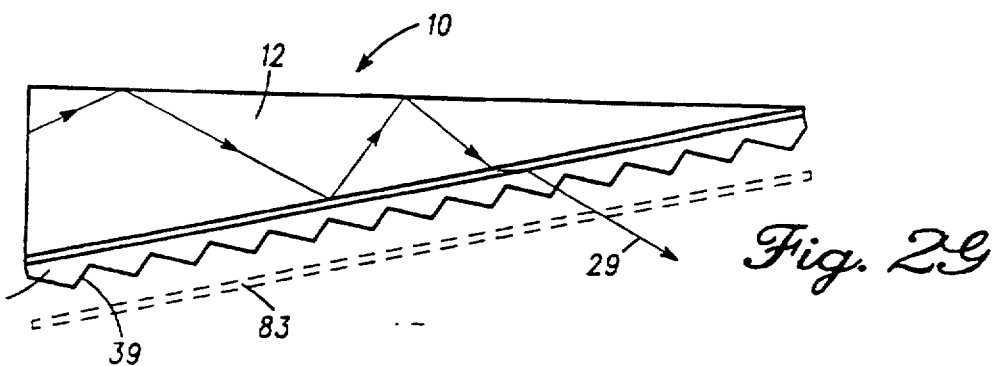
Figure 2H:
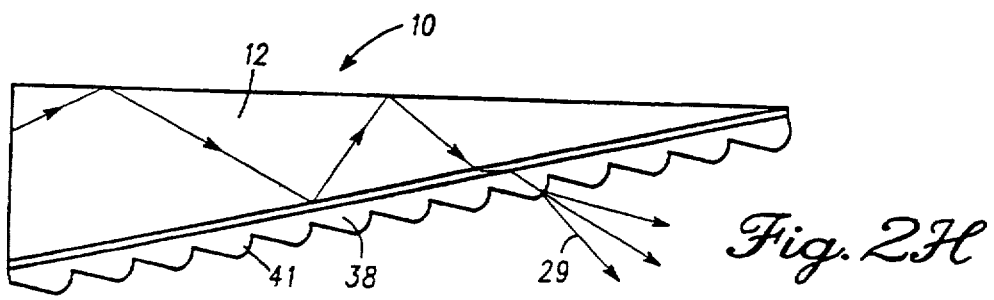
Figure 5A:
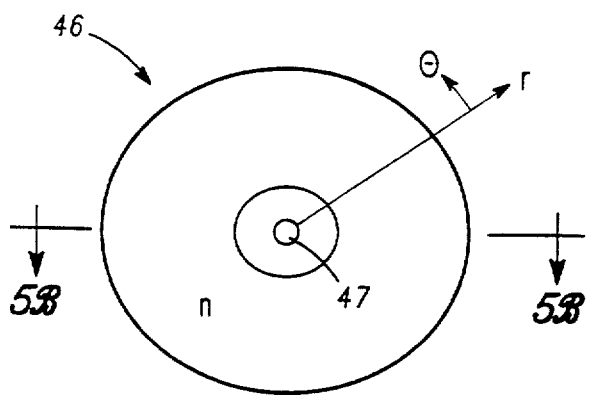
Figure 5B:
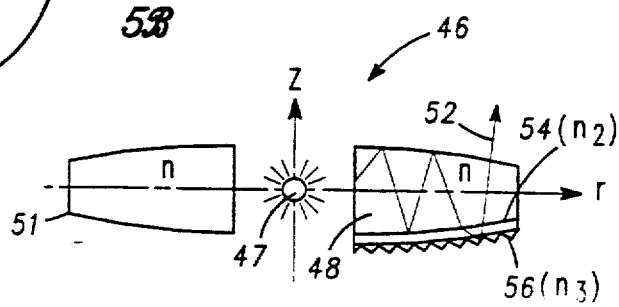
Figure 6A:
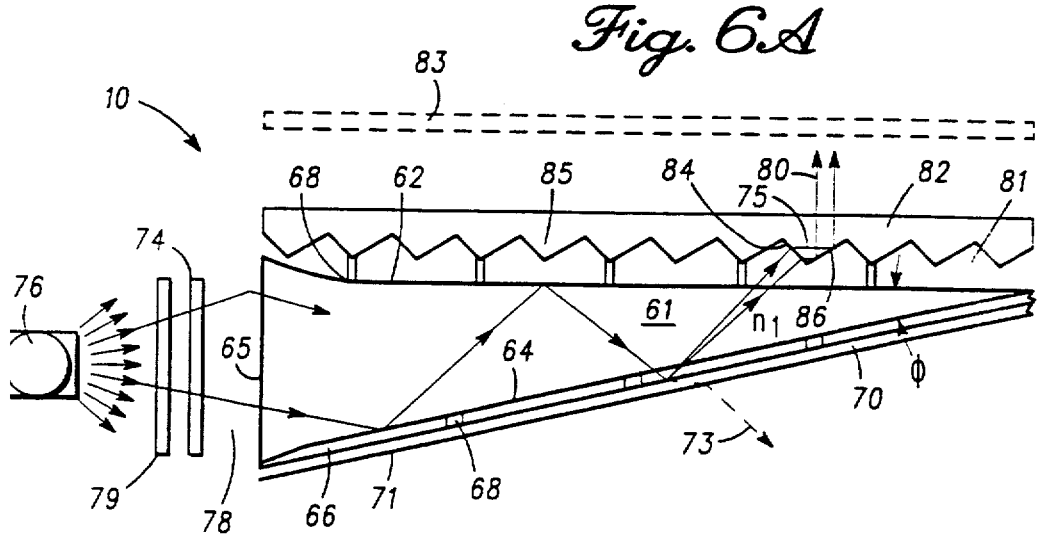
Figure 6B:
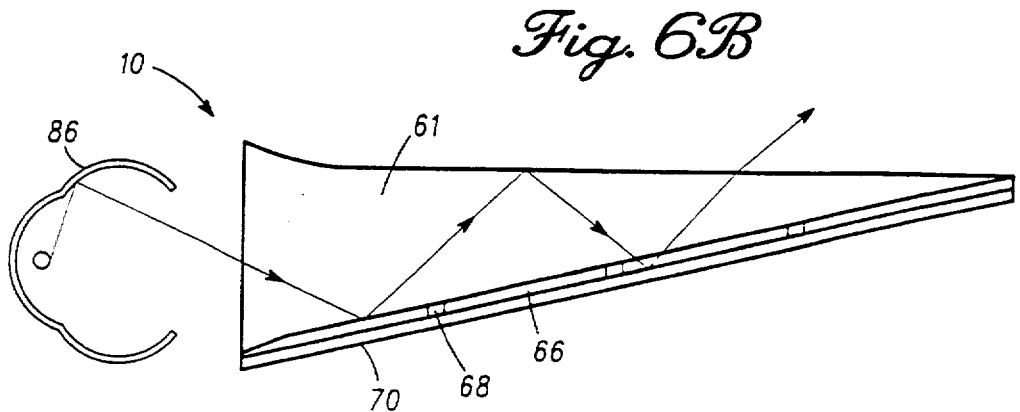
Figure 12G:
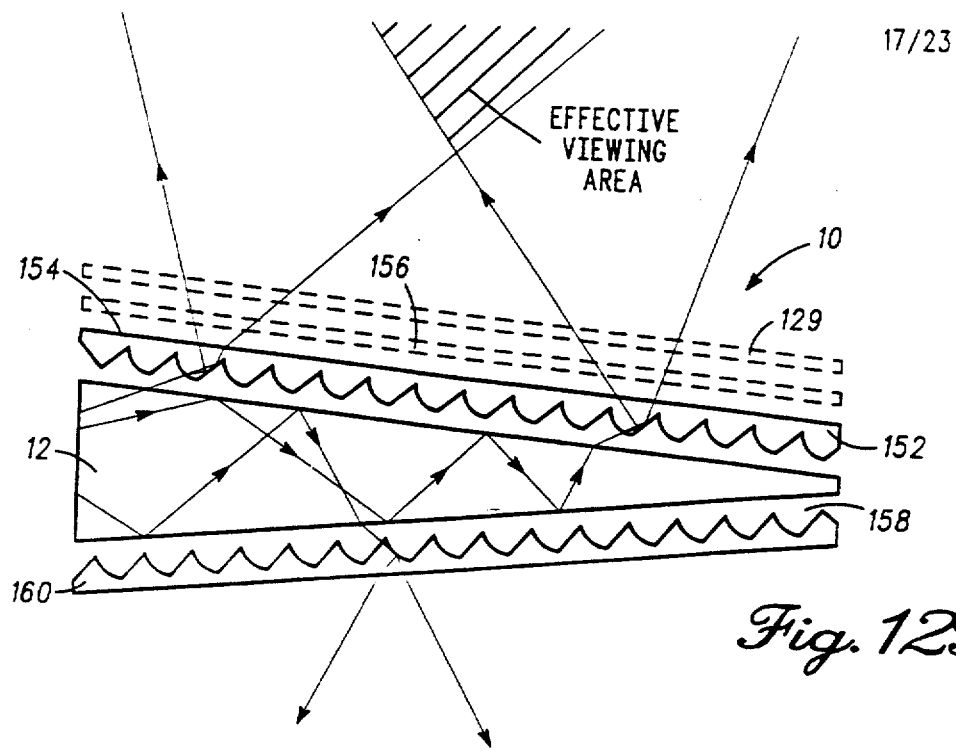
Figure 12H:
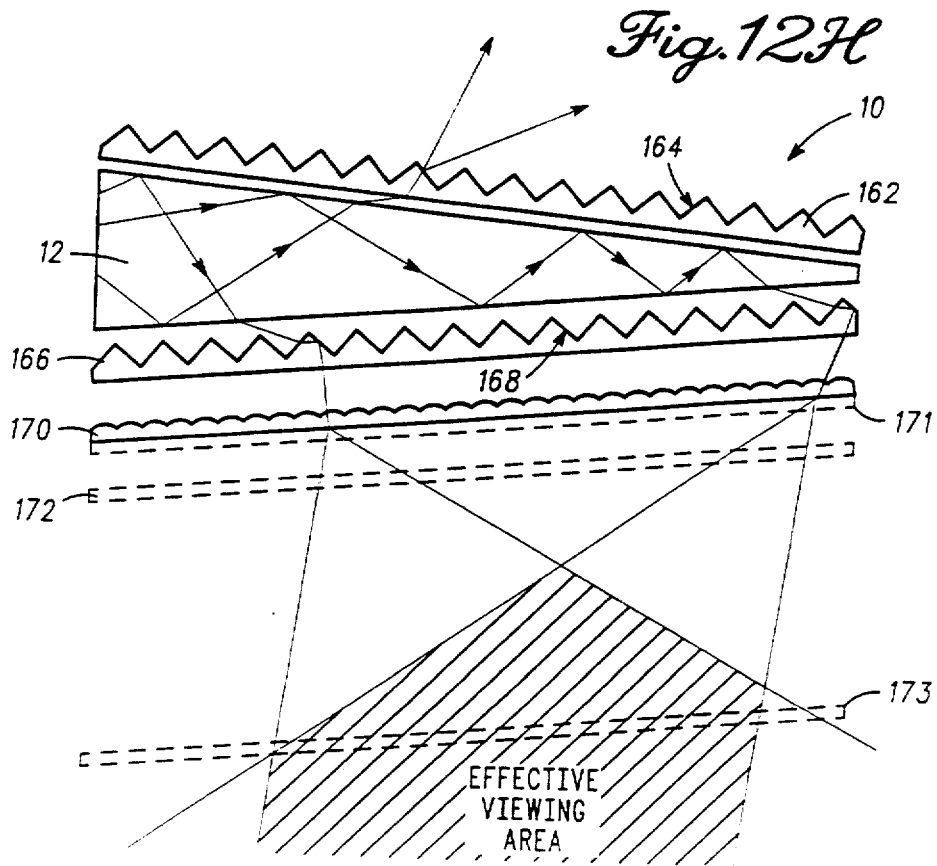
Figure 12I:
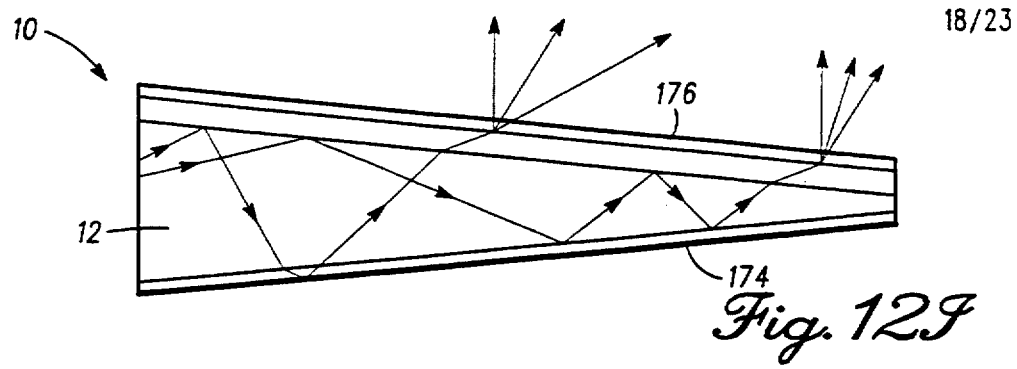
Figure 12J:
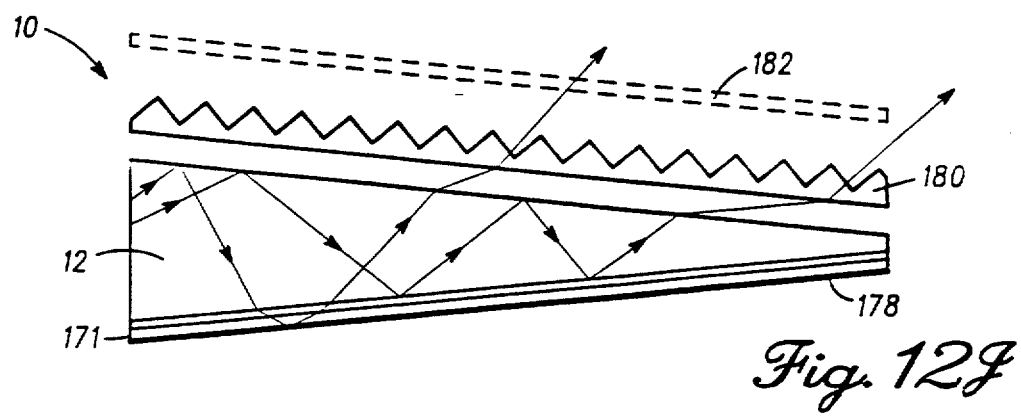
Figure 12K:
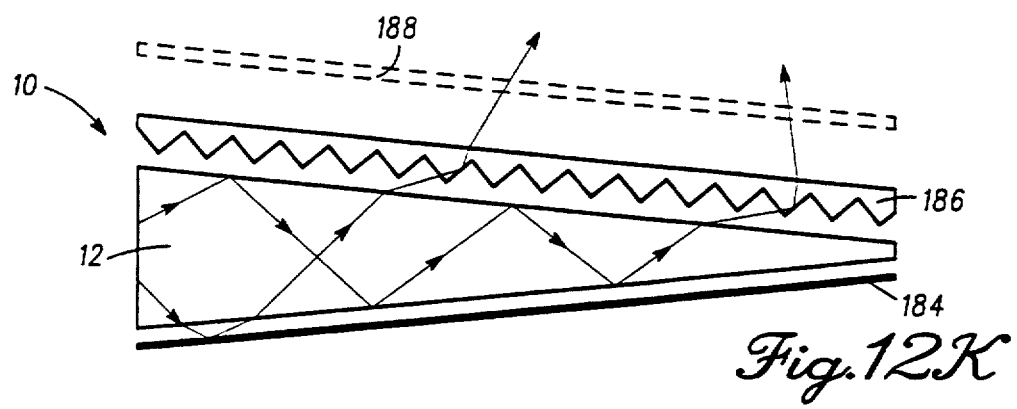
Figure 12L:
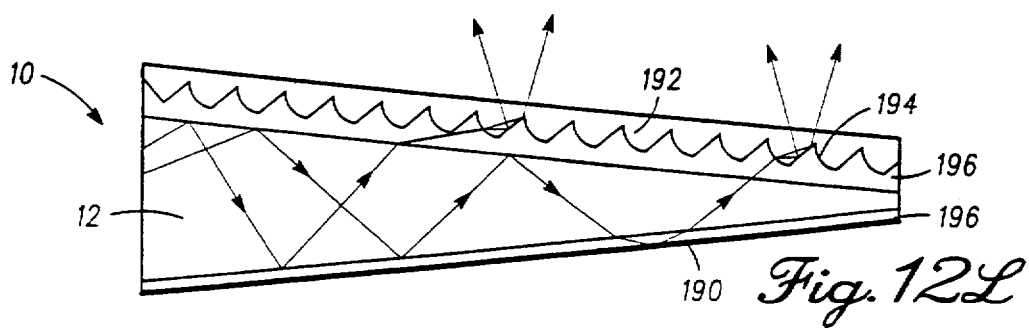
Figure 12O:
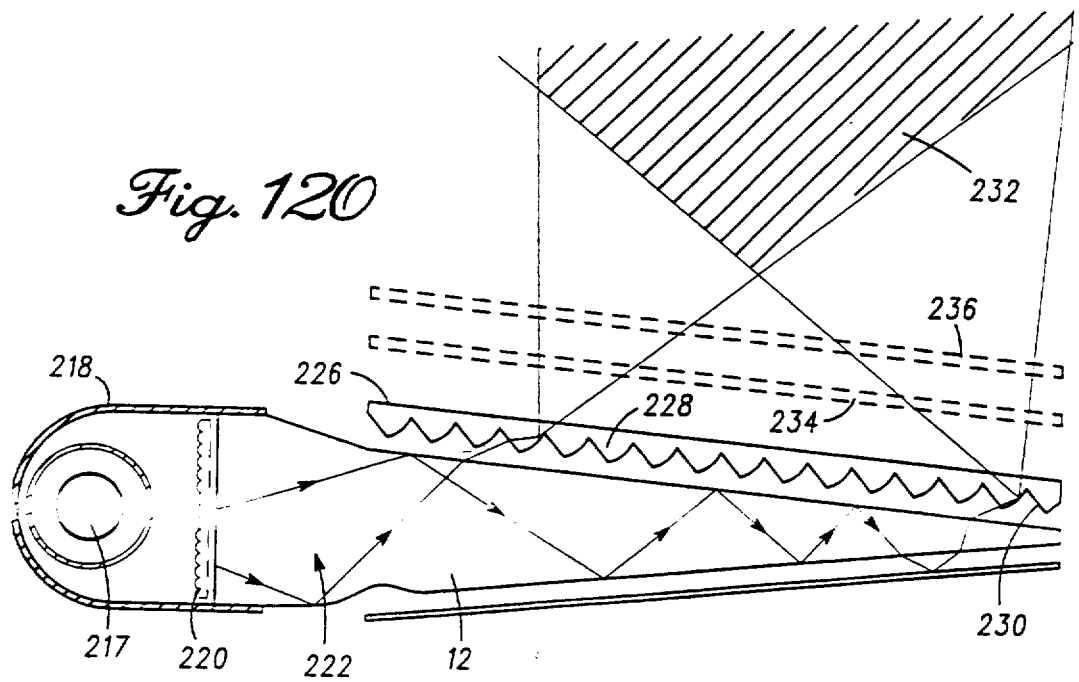
Figure 12P:
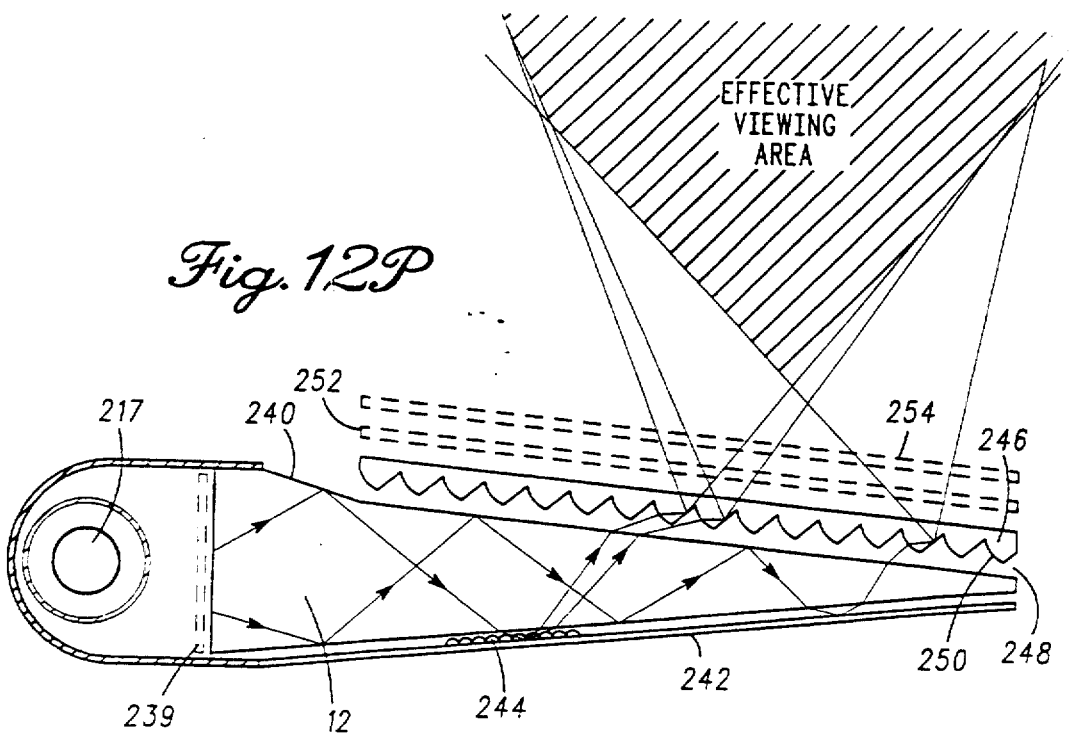

As understood in the art the various elements shown in the figures can be utilized with combinations of elements in tapered luminaire devices. Examples of two such combination geometries are shown in FIGS. 13 and 14, each figure also including features specific to the geometry shown. As illustrated in FIG. 13, two wedges 276 can be combined and formed integrally. This combination can provide higher brightness than a single wedge having the same extent because it permits two light sources to supply light to the same total area. While brightness is increased for this device, efficiency is similar because two sources also require twice as much power as one source. A redirecting film 272 with facets 274 can be a single, symmetric design which accepts light from both directions as shown. Alternatively, the redirecting film 272 can have a different design for each wing of the butterfly.

In FIG. 14 is shown a three dimensional rendition of a tapered disk 270, such as shown in FIG. 5, and is sectioned to show the appearance of the various layers. A faceted redirecting layer 280 comprises concentric circular facets 282 overlying a tapered light-pipe portion 284. Directly over a light source 288, overlying the gap at the axis of the light-pipe portion 284, the redirecting layer 280 takes the form of a lens (a Fresnel lens 280 is shown, for example). Directly below the light source 288 is reflector 290 positioned to prevent light from escaping and to redirect the light into the light-pipe portion 284 or through the lens. At least one opening is provided in the reflector to permit passage of elements, such as wires or light-pipes.

Use of Imaging or Colored Layers

All embodiments of the invention can incorporate one or more layers which have variable transmission to form an image, or which impart color to at least a portion of the angular output. The image-forming layer can include a static image, such as a conventional transparent display, or a selectively controlled image, such as a liquid crystal display. The image-forming or color-imparting layer can overlay one of the redirecting layers, or alternatively it can comprise an intermediate layer between one of the low-index layers and the associated redirecting layer, or an internal component of a redirecting layer. For example, overlying image-forming layers 129 are shown in phantom in FIGS. 12C and 12G. Examples of an internal image-forming layer 171 are shown in FIGS. 12H and 12J.

In one preferred embodiment, the image-forming layer (such as 129 and 170) is a polymer-dispersed liquid crystal (PDLC) layer. By proper arrangement of the layers, the image or color may be projected from the device within selected portions of the output angular distribution. The image or selected color can be substantially absent in the remaining portions of the output angular distribution.

Bi-modal Reflective Wedge for LCD Panel Illumination

In some applications it is desired to illuminate a single LCD panel selectively with either ambient light or by active back-lighting. In these applications ambient illumination is selected in well-lit environments in order to minimize power consumption by the display. When available environmental illumination is too low to provide adequate display quality, then active backlighting is selected. This selective bi-modal operating mode requires a back-illumination unit which can efficiently backlight the LCD in active mode, and efficiently reflect ambient light in the alternative ambient mode.

The most widespread prior art bi-modal liquid crystal display is the "transflective display" 101, such as is shown in FIG. 16B. This approach uses a conventional backlight 102 and a transmissive LCD panel 103, with an intervening layer 104 which is partially reflective and partially transmissive. In order to achieve adequate ambient mode performance, it is typically necessary for the intervening layer 104 to be 80-90% reflective. The resulting low transmissivity makes the transflective display 101 inefficient in the active mode of operation.

Another embodiment of the invention is shown in FIG. 17. This embodiment outperforms prior art transflective displays in the active mode, and demonstrates comparable performance in the ambient mode. In this embodiment the wedge layer 12 (index=$n_1$) having the bottom surface 16 is coupled to a transparent layer 28 of index $n_2 < n_1$, which can be an air gap. The $n_2$ layer is coupled to a partially diffuse reflector layer 105. This reflector layer 105 is, for example, preferably similar to the reflectors used in conventional LCD panels used in ambient mode only, as shown in FIG. 16A. Overlaying the wedge layer top surface 14 is a faceted redirecting layer 106, such as a lenticular diffuser with microlenses approximately parallel to the y-axis. A liquid crystal display panel 107 overlays the faceted redirecting layer 106. The back surface 20 of the wedge layer 12 is coupled to the light source 22.

The lenticular redirecting layer 106 and the wedge-layer 12 are substantially transparent to the incident and reflective light, so that in ambient mode the device 10 operates in a manner similar to conventional ambient-mode-only displays. When an active mode is selected, the light source 22 is activated, and the multiple layers act to spread the light substantially uniformly over the device 10 by virtue of the relationship between the indices of refraction and convergence angles of the layers, as described before. The resulting uniform illumination is emitted through the top surface 14 of the wedge layer 12. In a preferred embodiment, the reflector layer 105 is nearly specular in order to maximize ambient-mode performance. In this preferred embodiment the light emitted from the top surface is emitted largely at grazing angles, unsuitable for transmission by the LCD display panel 107. The redirecting layer 106 redirects a fraction of this light by a combination of refraction and total internal reflection, as described hereinbefore. The redirecting layer 106 is preferably designed such that at least 10-20% of the light is redirected into angles less than 30 degrees from the LCD normal, because typically the LCD transmission is highest in this angular range. It is sufficient to direct only a fraction of the back-illumination into suitable angles, because the prior art transflective display is quite inefficient in the active mode of operation.

While preferred embodiments of the invention have been shown and described, it will be clear to those skilled in the art that various changes and modifications can be made without departing from the invention in its broader aspects as set forth in the claims provided hereinafter.

What is claimed is:

1. An optical device for collecting light from a source and for selectively outputting light, comprising:
    a first layer capable of receiving light from said source and having an optical index of refraction $n_1$ and top and bottom layer surfaces converging to define at least one angle of inclination $\phi$, said first layer including a back surface spanning said top and bottom layer surfaces and the light exiting said first layer when the light being reflected therein decreases its angle of reflection relative to a normal to at least one of said top and bottom layer surfaces and achieves an angle of reflection less than the critical angle $\theta_c$ relative to the normal;

layer means including an air gap underlying said bottom layer surface of said first layer and having an effective optical index of refraction $n_2$ for allowing transmission of light received form said first layer; and light redirecting means at least one of overlying and underlying said layer means, said redirecting means allowing transmission of light across the thickness of said redirecting means for selectively redirecting light output from said layer means.

2. The optical device as defined in claim 1 wherein said light redirecting means underlying said layer means and said bottom layer surface reflects the light transmitted thereacross, the light being reflected back through said light redirecting means, through said layer means and through said first layer and output through said top layer surface overlying said light redirecting means.

3. The optical device as defined in claim 1 wherein said optical device provides a collimated light output having a cone of angular width $\Delta\Theta$ approximately equal to $[2\phi^{\frac{1}{2}}(n^2-1)^{\frac{1}{4}}]2\phi^{\frac{1}{2}}(n_1^2-1)^{\frac{1}{4}}$.

4. The optical device as defined in claim 1 further including a layer having a faceted portion for optically redirecting light, said faceted portion positioned at lease one of (a) between said source of light and said first layer, (b) overlying said first layer and (c) underlying said light redirecting means.

5. The optical device as defined in claim 1 further including at least one of (a) a diffuser layer disposed between said source of light and said first layer, (b) a diffuser layer overlying said first layer, (c) a diffuser layer underlying said light redirecting means, and (d) means for at least filling the numerical aperture of said first layer.

6. The optical device as defined in claim 1 wherein said light redirecting means has an index of refraction $n_3$ and the indices of refraction have one of the following combinations: $n_3 > n_2$; $n_2 > n_1 \leq 3$; $n_1 \sim 1.5$, $n_2 < 1.5$, $n_3 \geq n_1$; $n_1$ is about 1.4–1.7, $n_2 < 1.4$ and $n_3 > 1.45$; $2$ is about 1.

7. The optical device as defined in claim 1 wherein said light redirecting means causes light input to said first layer to preferentially be output from said bottom layer surface and through said light redirecting means into ambient.

8. The optical device as defined in claim 1 wherein said light redirecting means is disposed about said layer means forming an overlying and underlying layer symmetrically positioned about a line through said first layer and dividing the first layer into two portions of $\phi/2$.

9. The optical device as defined in claim 1 wherein said top and bottom surfaces converge at said angle of inclination $\Phi$ and the light being output from said top and bottom surfaces is substantially symmetrically angularly distributed from said optical device.

10. The optical device as defined in claim 9 wherein said top and bottom surface converge at said at least one angle of inclination $\Phi/2$ and further including a reflecting layer disposed adjacent the air gap thereby causing light to be output through only one of said top and bottom surfaces.

11. The optical device as defined in claim 10 further including a coupled second one of said first layer, said air gap, said light redirecting means and said reflecting layer.

12. An optical device for collecting light from a source and for selectively outputting light to a viewer, comprising:

a first layer having a wedge shaped cross sectional area and having an optical index of refraction $n_1$, and a top and bottom surface converging to define at least one angle of inclination $\phi$, said first layer further including a back surface spanning said top and bottom surfaces, and the light exiting said first layer when the light being reflected therein decreases its angle of reflection relative to the normal to at least one of said top and bottom layer surfaces and achieves an angle of reflection less than the critical angle $\theta_c$ relative to the normal;

an air gap layer underlying said bottom surface of said first layer and light thereby entering said air gap layer from said bottom wedge surface when the light in said first layer achieves the angle of reflection less than the critical angle of incidence characteristic of the interface between said first layer and said air gap; and light redirecting means underlying said air gap, said light redirecting means for transmitting light traversing said air gap over a controlled angular output distribution for viewing by the user over a range of angles of substantially spatially uniform intensity.

13. The optical device as defined in claim 12 wherein said light redirecting means includes a layer overlying said air gap and also includes a reflection layer for reflecting the light through said first layer and said air gap for output.

14. The optical device as defined in claim 12 further including a light diffuser element at least one of (a) overlying said top layer surface (b) between said source of light and said first layer, and (c) underlying said light redirecting means.

15. The optical device as defined in claim 12 wherein said light redirecting means includes a faceted layer portion for optically redirecting light over a controlled angular distribution.

16. The optical device as defined in claim 15 wherein at least one of said first layer includes an associated faceted layer separated by said air gap and said layer having a faceted portion including an intervening air gap overlying said top layer surface.

17. The optical device as defined in claim 12 wherein said air gap layer is supported by at least one of an external support and an intra layer support between said first layer and said light redirecting means.

18. The optical device as defined in claim 12 wherein said light redirecting means comprises a specular reflector layer.

19. The optical device as defined in claim 12 further including an additional light redirecting means disposed above the top surface of said first layer.

20. The optical device as defined in claim 19 wherein said light redirecting means comprises an additional supported air gap disposed overlying said top surface of said first layer and a faceted layer underlying said air gap.

21. The optical device as defined in claim 19 wherein at least one of said light redirecting means and said additional light redirecting means comprises a plurality of facets wherein said facets have at least one of (a) different facet curvature and (b) substantially the same facet curvature.

22. The optical device as defined in claim 21 wherein said additional light redirecting means comprises a layer having a faceted surface for optically focusing the light for controlled angular distribution of light output into ambient.

23. The optical device as defined in claim 22 wherein $n_1$ is about 1.5, said additional air gap and said air gap have an optical index of refraction of unity and said layer having a faceted surface has an $n_3$ value of about 1.48–1.60.

24. The optical device as defined in claim 12 wherein said light redirecting means comprises a faceted portion for efficiently redirecting light within said angular width of $4\phi^{\frac{1}{2}}(n_1^2-1)^{\frac{1}{2}}$.

25. An optical device able to collect light, including light from a substantially incoherent, uncollimated light source and for selectively outputting the light, comprising:
   a first layer having an input surface capable of receiving light from said light source and an optical index of refraction $n_1$ and including converging top and bottom layer surfaces with said input surface forming the larger thickness end of said first layer and said first layer including a varying slope for at least one of said top and bottom layer surfaces, said varying slope able to include a converging and/or diverging portion of said first layer, and the light exiting said first layer when the light being reflected therein decreasing its angle of reflection relative to a normal to at least one of said top and bottom layer surfaces and achieves an angle of reflection less than the critical angle $\theta_c$ relative to the normal,
   layer means underlying said bottom layer surface of said first layer and having an optical index of refraction $n_2$; and
   light redirecting means underlying said layer means for selectively reflecting and transmitting light received from said layer means, at least one of said varying slope first layer and said light redirecting means providing a controlled angular, substantially spatially uniform output of the light into ambient.

26. The optical device as defined in claim 25 wherein said light source provides light having an angular width greater than or equal to arcsin $(1-(n_2/n_1)^2)^{\frac{1}{2}}$.

27. The optical device as defined in claim 25 further including a light coupler comprised of at least one of a compound parabolic concentrator portion around said light source, a reflector around said light source having an involute light source portion, a linear prism, a light diffuser, means for at least filling the numerical aperature of said first layer, a light source reflector element including one or more nearly semicircular arcs and a nonimaging reflector.

28. The optical device as defined in claim 25 wherein the controlled angular output of the light has angular width of less than $4\phi^{\frac{1}{2}}(n_1^2-1)^{\frac{1}{2}}$ wherein $\phi$ is the angle of convergence of said top and bottom surfaces.

29. An optical device above to collect light, including light from a substantially uncollimated, incoherent source and selectively outputting the light, comprising:
   a first layer having an optical index of refraction $n_1$, said first layer having a top layer surface converging toward a bottom layer surface and an input surface spanning said top and bottom surfaces to define an input end surface forming the larger thickness end of said first layer;
   an air gap layer underlying at least said bottom surface of said first layer creating a critical angle of incidence $\theta_c$ for the light in said first layer characteristic of the interface between said bottom layer surface and said air gap thereby causing the light to enter said air gap layer upon the light being reflected in said first layer decreasing its angle of reflection relative to a normal to at least one of said top and bottom surfaces to reach an angle of reflection less than the critical angle $\theta_c$ relative to the normal; and
   light reflecting means underlying said air gap layer for reflecting light received from said first layer through said air gap, said light reflecting means cooperating with said first layer and said air gap to form a beam of light for output into ambient over a controlled angular distribution.

30. The optical device as defined in claim 29 further including a light redirecting means disposed adjacent at least one of (a) said top wedge surface and (b) said input end surface with said light redirecting means of said input end surface comprised of means for at least filling the numerical aperture of said first layer.

31. The optical device as defined in claim 30 wherein said light redirecting means comprises a faceted portion.

32. The optical device as defined in claim 31 wherein said faceted portion includes a plurality of facets having at least one of (a) facets including progressively varied facet angles such that said plurality of facets form a layer comprising a section of a Fresnel parabola and/or a Fresnel cylinder, (b) each of said facets constructed to produce a desired light cone of particular angular distribution and (c) each of said facets constructed of selectable flat and curved facet face geometry.

33. The optical device as defined in claim 29 wherein said beam of controlled angular distribution is spread over an angle within about $\pm 30°$ from the average angle of output from said top layer surface.

34. The optical device as defined in claim 29 wherein said device comprises at least a portion of a wedge like disk having a central longitudinal passage for receiving said light source.

35. An optical device capable of collecting light, including a substantially uncollimated, incoherent light from a source and selectively outputting the light, comprising:
   a first layer having an optical index of refraction $n_1$, said first layer having a back surface and converging top and bottom layer surfaces positioned adjacent a gas containing gap with an optical index of refraction $n_2$ and light input through said back surface of said first layer entering said gap when the light being reflected in said first layer decreases its angle of reflection relative to a normal to said bottom surface to achieve an angle of reflection less than the critical angle of incidence $\theta_c$, relative to the normal, characteristic of the interface between said bottom layer surface and said gas containing gap; and
   light redirecting means underlying said gas containing gap, said light redirecting means for selectively reflecting light output from the first layer and outputting the light from said top layer surface, said light redirecting means further adapted to include means for focusing light output from said first layer.

36. The optical device as defined in claim 35 wherein said focusing means comprises at least one of a curved light redirecting means and a faceted portion having a particular facet angularity for providing a particular selected focusing.

37. The optical device as defined in claim 36 wherein said focusing means is configured to focus light from the end portions of said top layer surface to the central angle of light output from said top layer surface.

38. The optical device as defined in claim 36 wherein facets of said faceted portion comprise different angles of inclination for the facets on extreme ends of said focusing means.

39. The optical device as defined in claim 36 wherein said focusing means is constructed to control overlap of light output from different portions of said focusing means.

40. The optical device as defined in claim 36 wherein said faceted portion comprises facets providing at least one of (a) increased light overlap at selected viewing distances, (b) light overlap to form a preferred viewing output distribution, (c) particular facet angularity for providing a particular focusing and (d) different focal points for each of said facets.

41. The optical device as defined in claim 35 wherein said light redirecting means includes at least two portions configured to provide overlapping light output.

42. The optical device as defined in claim 36 wherein facets of said faceted portion comprise at least one of (a) facets of different angles of inclination for at least a fraction of the face of the facets, (b) facets of different angles of inclination progressively changed along the length of said focusing means and (c) facets of different angles of inclination at extreme ends of said focusing means.

43. The optical device as defined in claim 35 wherein said first layer includes a nonlinearly varying thickness near said back surface for at least one of controlling the uniformity of light output into ambient from said optical device and for optically compensating for the nonuniformity of the light input to said first layer.

44. The optical device as defined in claim 35 further including an overlying light redirecting layer and an overlying liquid crystal display operable with ambient light.

45. The optical device as defined in claim 35 further including a diffuser layer at least one of (a) disposed between said source of light and said first layer, (b) overlying said first layer and (c) disposed below said light redirecting means.

46. The optical device as defined in claim 45 wherein said diffuser layer comprises at least one of (a) a focusing layer (b) a translucent layer and (c) a lenticular array.

47. The optical device as defined in claim 35 wherein said source of light comprises a compound parabolic concentrator source.

48. The optical device as defined in claim 35 further including at least one additional layer disposed between at least one of (a) said first layer and said gas containing gap and (b) said gas containing gap and said light redirecting means.

49. The optical device as defined in claim 35 wherein said optical device is operable as a concentrator with light being input into at least one of said first layer and said light redirecting means and output from said back surface for collection.

50. An optical device for collecting light, including a substantially uncollimated, incoherent light from a source and outputting the light, comprising:

a first layer having a wedge shaped cross sectional area with an optical index of refraction $n_1$, said layer having a back surface and a converging top and bottom surface with at least one angle of convergence $\phi$;

a second layer with an optical index of refraction $n_2$ and light being input through said back surface of said first layer entering said second layer when the light being reflected in said first layer decreases its angle of reflection relative to a normal to said bottom surface to achieve an angle of reflection less than the critical angle of incidence $\theta_c$ relative to the normal with said bottom layer surface, characteristic of the interface between said bottom layer surface and said second layer; and third layer means disposed adjacent said second layer acting cooperatively with said first and second layer to control angular distribution of the light of said optical device and for outputting the light from said top layer surface.

51. The optical device as defined in claim 50 wherein said first layer has a plurality of angles $\phi$, thereby enabling control of light output.

52. The optical device as defined in claim 50 wherein said third layer means includes portions of varying curvature to output light over a preferred viewing area.

53. The optical device as defined in claim 50 wherein said third layer means portion includes at least one of (a) an individual facet, (b) a plurality of facets, (c) faceted portions disposed adjacent one another, (d) facets having a small focal point and (e) facets having their focus over a viewing area.

54. An optical device for collecting light from a source and for selectively outputting light, comprising:

a first layer capable of receiving light from said source and having an optical index of refraction $n_1$ and top and bottom layer surfaces converging to define at least one angle of inclination $\phi$, said first layer including a back surface spanning said top and bottom layer surfaces and the light exiting said first layer when the light being reflected therein decreases its angle of reflection relative to a normal to said top and bottom layer surfaces and achieves an angle of reflection less than the critical angle $\theta_c$ relative to the normal;

layer means including a first and second intermediate layer underlying said bottom layer surface and said top layer surface, respectively, and having an effective optical index of refraction $n_{2a}$ and $n_{2b}$, respectively, for allowing transmission of light output from said first layer; and light redirecting means underlying said layer means, at least one of said redirecting means allowing transmission of light across the thickness of said redirecting means for selectively redirecting light output from said layer means.

55. The optical device as defined in claim 54 wherein said indices $n_{2a}$ and $n_{2b}$ have the following relationship with the angle of inclination $\phi$:

$$|\arcsin(n_{2a}/n_1) - \arcsin(n_{2b}/n_1)| < \phi$$

56. The optical device as defined in claim 54 further including a diffuser layer disposed adjacent said light redirecting means for modifying the light output from said light redirecting means.

57. The optical device as defined in claim 56 wherein said diffuser layer comprises at least one of a lenticular diffuser, a volume diffuser and a surface diffuser.

58. The optical device as defined in claim 54 wherein said first and second intermediate layer comprise at least one of a gaseous gap layer and a transparent material having $n_2 \geq 1$ n.

59. The optical device as defined in claim 58 wherein said transparent material is selected from the group consisting of sol-gels, fluoropolymers, fluoride salts, silicones and adhesives.

60. The optical device as defined in claim 54 further including a reflective layer disposed on the ambient side of said light redirecting means.

61. The optical device as defined in claim 60 wherein said reflective layer comprises at least one of a planar specular reflector, a diffuse reflector and a faceted reflector.

62. The optical device as defined in claim 54 wherein at least one of said redirecting layer comprises a transparent right angle film.

63. An optical device for collecting light and selectively outputting the light to a viewer comprising:
   a light source;
   a first layer capable of receiving light from said source and having an optical index of refraction $n_1$ and top and bottom layer surfaces converging to define at least one angle of inclination $\phi$, said first layer including a back surface spanning said top and bottom layer surfaces and the light exiting said first layer when the light being reflected therein increases its angle of reflection relative to a normal to said top and bottom layer surfaces and achieves an angle of reflection less than the critical angle $\theta_c$ relative to the normal;
   layer means underlying said first layer having an optical index of refraction $n_2$; and
   a light redirecting layer disposed at least one of (a) overlying said first layer and (b) underlying said layer means, said light redirecting layer allowing transmission of light there across and further including facets whose angles of orientation can be constructed to vary across a planar dimension of said redirecting layer to control the angular output range of substantially uniform intensity as seen by the viewer.

64. The optical device as defined in claim 63 wherein said light redirecting layer comprises a layer of facets having changing facet angle across at least one of the planar width and length of said redirecting layer.

65. The optical device as defined in claim 63 wherein said light redirecting layer comprises a layer of facets disposed on at least one of a semi-cylindrical surface of radius R and a parabolic surface of focal length F, thereby causing changes of said angles of orientation of the surface of said facets.

66. The optical device as defined in claim 63 wherein said light redirecting layer comprises an underlying back reflector layer.

67. The optical device as defined in claim 63 wherein said light redirecting layer comprises an overlying faceted light redirecting layer.

68. The optical device as defined in claim 63 wherein said light redirecting layer comprises two of said layers comprised of at least one of (a) a diffraction grating and a hologram, (b) two faceted layers and selectively a lenticular diffuser, (c) two faceted layers with facets designed to refract and internally reflect light output from said first layer, (d) two refracting single facet layers; (e) a top surface refracting single facet layer with curved output surface and a bottom surface refracting/internally reflecting faceted layer, (f) a top surface refracting faceted layer and a bottom surface refracting/internally reflecting layer, (g) a top surface and bottom surface refracting/internally reflecting faceted layer and (h) a top surface refracting faceted layer and a bottom surface refracting/internally reflecting faceted layer.

69. The optical device as defined in claim 63 wherein said light redirecting layer comprises a transmissive and a reflective light redirecting layer, said layers comprised of at least one of the combination of layers (a) a bottom specular reflector and a top layer transmission diffraction grating or a transmission hologram, (b) a bottom specular reflector and a top layer refracting faceted layer, (c) a bottom specular reflector and a top layer refracting/internally reflecting faceted layer, (d) a bottom specular reflector and a top layer refracting/internally reflecting faceted layer, (e) a bottom reflector which is partially specular and partial diffuse transmitter and a top redirecting layer which is refracting/reflecting with curved reflecting surface, (f) a bottom reflector which is partially specular, partially diffuse and a top redirecting layer of refracting/internally reflecting flat faceted layer.

* * * * *

UNITED STATES PATENT AND TRADEMARK OFFICE
CERTIFICATE OF CORRECTION

PATENT NO. : 5,303,322

DATED : Apr. 12, 1994

INVENTOR(S) : Winston et al.

Page 1 of 11

It is certified that error appears in the above-identified patent and that said Letters Patent is hereby corrected as shown below:

The title page, showing the illustrative figure, should be deleted and substitute therefor the attached title page.

In the Drawings:
Sheets 1, 2, 6, 11, 12, 17, 18, 20, and 22, consisting of Figs. 1, 2A-2H, 3, 3A, 3B, 4A, 5A, 5B, 6A-6D, 7, 8, 12G-12L, 12O, 12P, 14, 15, 16A, and 16B, should be deleted and substitute therefor the attached Sheets 1, 2, 6, 11, 12, 17, 18, 20, and 22, consisting of Figs. 1, 2A-2H, 3, 3A, 3B, 4A, 5A, 5B, 6A-6D, 7, 8, 12G-12L, 12O, 12P, 14, 15, 16A, and 16B.

Signed and Sealed this

Twenty-third Day of May, 1995

*Attest:*

BRUCE LEHMAN

*Attesting Officer*     *Commissioner of Patents and Trademarks*

United States Patent [19]

Winston et al.

[11] Patent Number: 5,303,322
[45] Date of Patent: Apr. 12, 1994

[54] TAPERED MULTILAYER LUMINAIRE DEVICES

[75] Inventors: Roland Winston; Benjamin A. Jacobson, both of Chicago; Robert L. Holman, Naperville; Neil A. Gitkind, Chicago, all of Ill.

[73] Assignee: NiOptics Corporation, Evanston, Ill.

[21] Appl. No.: 29,883

[22] Filed: Mar. 11, 1993

Related U.S. Application Data

[63] Continuation-in-part of Ser. No. 855,838, Mar. 23, 1992, Pat. No. 5,237,641.

[51] Int. Cl.$^5$ .................................. G02B 6/26
[52] U.S. Cl. .................................. 385/146; 385/43; 385/901; 385/129; 385/131
[58] Field of Search ............... 385/43, 129, 130, 131, 385/140, 146, 147, 901, 31; 359/599, 833, 834

[56] References Cited

U.S. PATENT DOCUMENTS

| | | | |
|---|---|---|---|
| 2,347,665 | 5/1944 | Christensen et al. | 362/31 |
| 2,712,593 | 7/1955 | Merchant | 362/27 |
| 3,617,109 | 11/1971 | Tien | 385/43 |
| 3,752,974 | 8/1973 | Baker et al. | 240/1 |
| 3,832,028 | 8/1974 | Kapron | 385/43 |
| 3,980,392 | 9/1976 | Aunacher | 385/43 |
| 4,059,916 | 11/1977 | Tachihara et al. | 40/130 |
| 4,111,538 | 9/1978 | Sheridon | 353/122 |
| 4,114,592 | 9/1978 | Winston | 126/270 |
| 4,161,015 | 7/1979 | Dey et al. | 362/263 |
| 4,176,908 | 12/1979 | Wagner | 350/96.15 |
| 4,212,048 | 7/1980 | Castleberry | 362/19 |
| 4,240,692 | 12/1980 | Winston | 350/96.10 |
| 4,257,084 | 3/1981 | Reynolds | 362/31 |
| 4,277,817 | 7/1981 | Hehr | 362/31 |
| 4,323,951 | 4/1982 | Pasco | 362/27 |
| 4,373,282 | 2/1983 | Wragg | 40/546 |
| 4,420,796 | 12/1983 | Mori | 362/32 |
| 4,453,200 | 6/1984 | Troka et al. | 362/31 |
| 4,528,617 | 7/1985 | Blackington | 362/32 |
| 4,547,043 | 10/1985 | Penz | 362/32 |
| 4,573,766 | 3/1986 | Bournsy, Jr. et al. | 350/345 |
| 4,618,216 | 10/1986 | Suzawa | 359/49 |
| 4,648,690 | 3/1987 | Ohe | 350/321 |
| 4,649,462 | 3/1987 | Dobrowolski et al. | 362/2 |
| 4,706,173 | 11/1987 | Hamada et al. | 362/341 |
| 4,729,068 | 3/1988 | Ohe | 362/31 |
| 4,735,495 | 4/1988 | Henkes | 362/310 |
| 4,737,896 | 4/1988 | Mochizuki et al. | 362/301 |
| 4,747,223 | 5/1988 | Bonds | 40/219 |
| 4,765,718 | 8/1988 | Henkes | 359/49 |
| 4,799,050 | 1/1989 | Prine et al. | 340/765 |
| 4,799,137 | 1/1989 | Abo | 362/309 |
| 4,832,458 | 5/1989 | Fergason | 350/338 |

(List continued on next page.)

OTHER PUBLICATIONS

"Flat Panel Backlight Reflecting Device," R. L. Garwin and R. T. Hodgson, *IBM Technical Disclosure Bulletin*, vol. 31, No. 2, Jul. 1988, pp. 190–191.

"Dielectric Totally Internally Reflecting Concentrators" Xisohui, Ming, Roland Winston and Joseph O'Gallagher, *Applied Optics*, vol. 26, Jan. 15, 1987, pp. 300–305.

*Primary Examiner*—John D. Lee
*Assistant Examiner*—Phan Thi Heartney
*Attorney, Agent, or Firm*—Reinhart, Boerner, Van Deuren, Norris & Rieselbach

[57] ABSTRACT

An optical device for collecting light and selectively outputting or concentrating the light. A wedge layer has an optical index of refraction $n_1$, and top, bottom and side surfaces intersecting to define an angle of inclination d. A back surface spans the top, bottom and side surface. A first layer is coupled to the bottom surface of the layer and has an index of refraction $n_2$. The first layer index $n_2$ causes light input through the back surface of the layer to be preferentially output into the first layer. A second layer is coupled to the bottom of the first layer and selectively causes output of light into ambient. Additional layers, such as an air gap, can be provided adjacent to the wedge shaped layer. The wedge shaped layer can also have a variable index of refraction n (x,y,z).

69 Claims, 23 Drawing Sheets

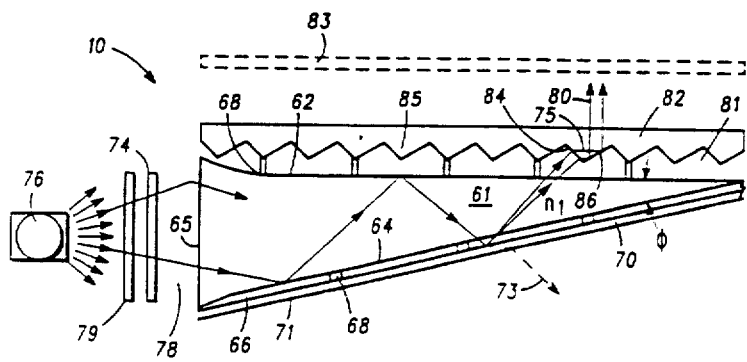

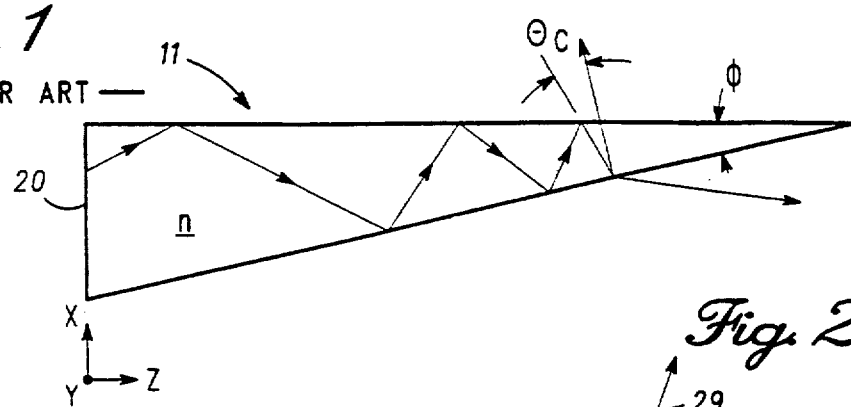
Fig. 1 — PRIOR ART —
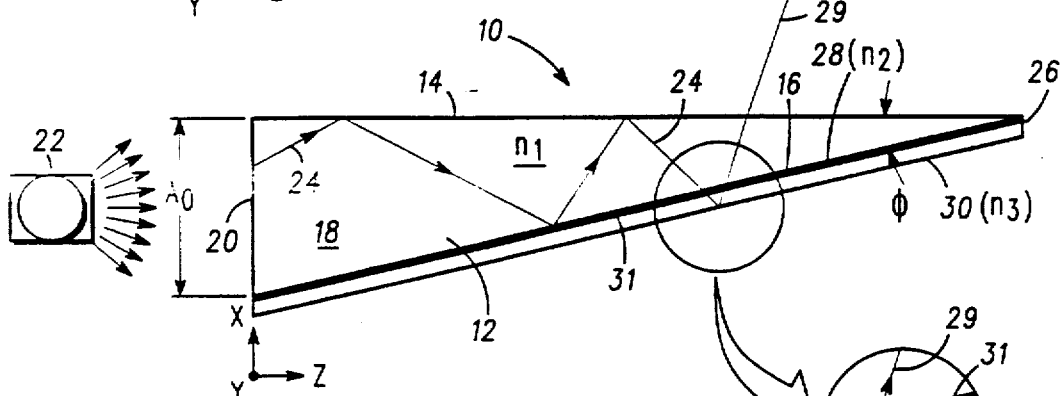
Fig. 2A
Fig. 2B
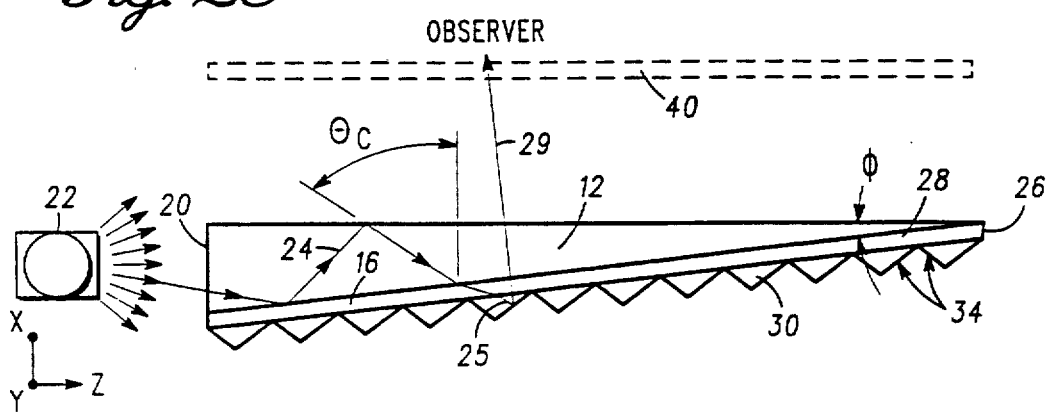
Fig. 2C
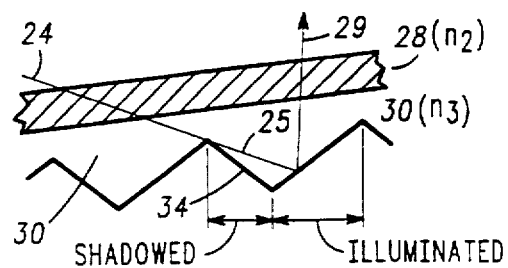
Fig. 2D

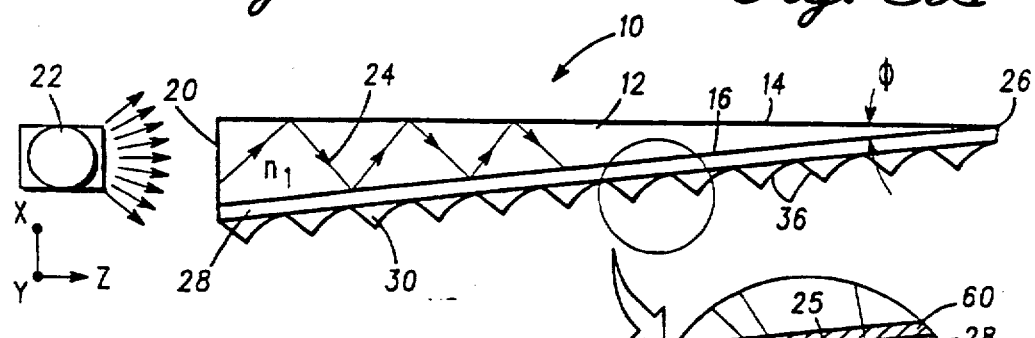
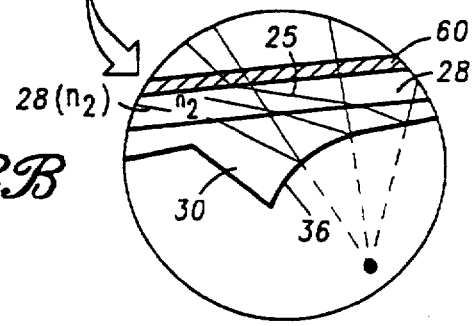
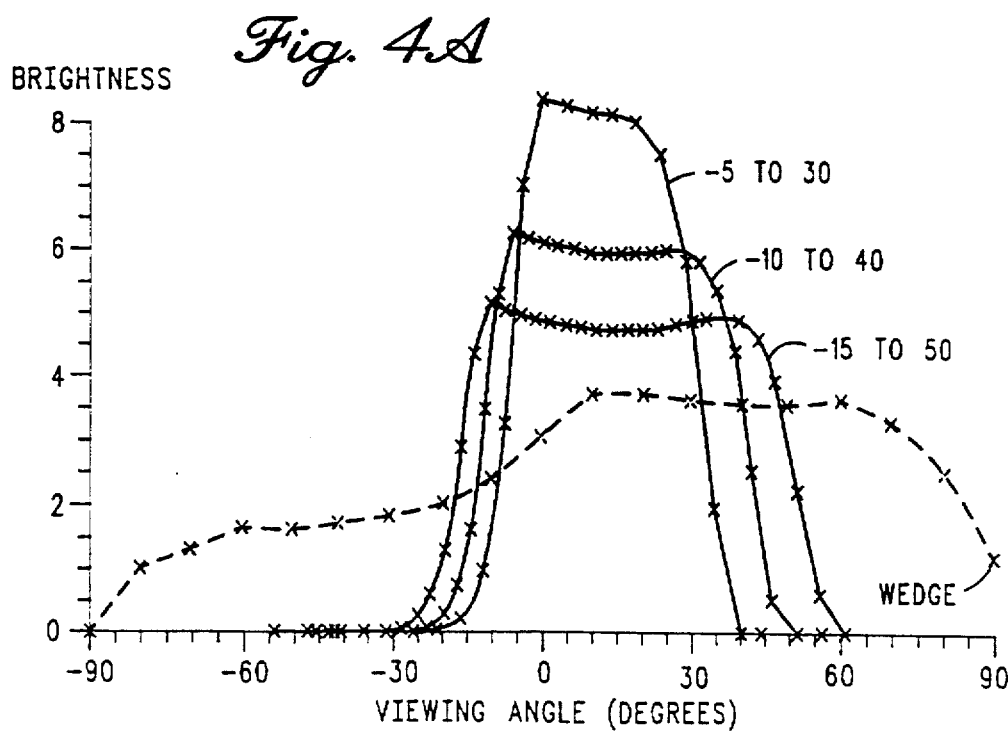

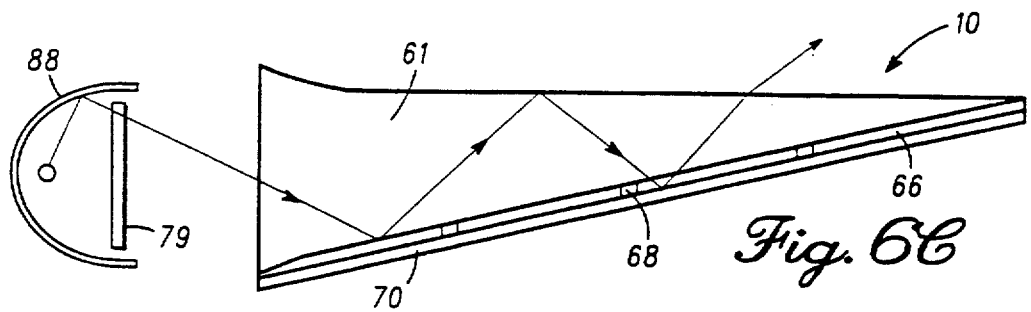
Fig. 6C
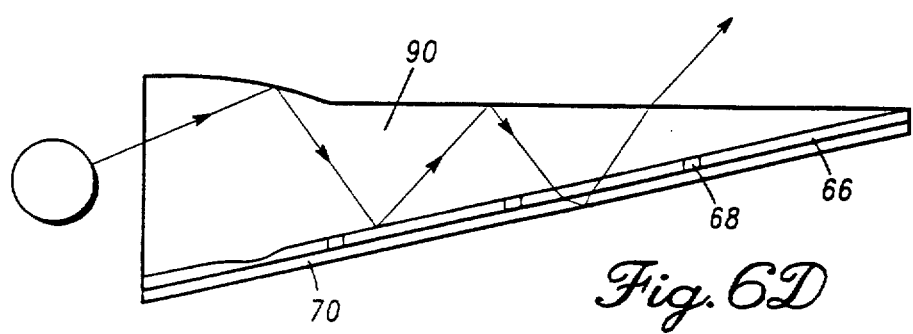
Fig. 6D
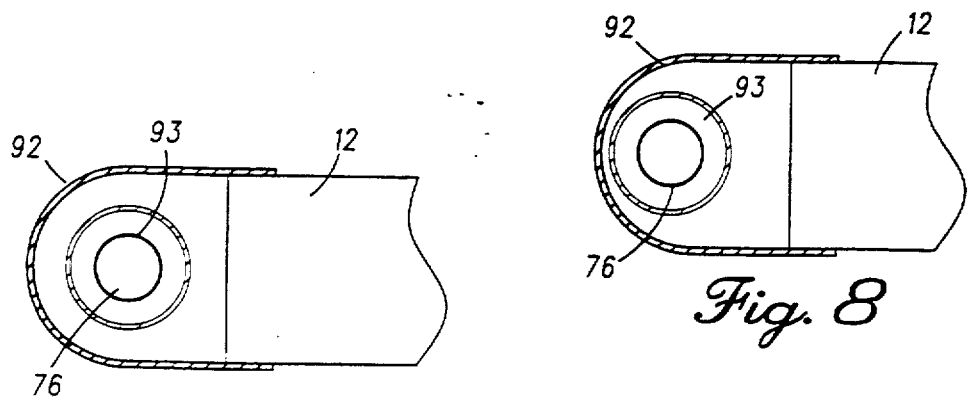
— PRIOR ART —
Fig. 7
Fig. 8

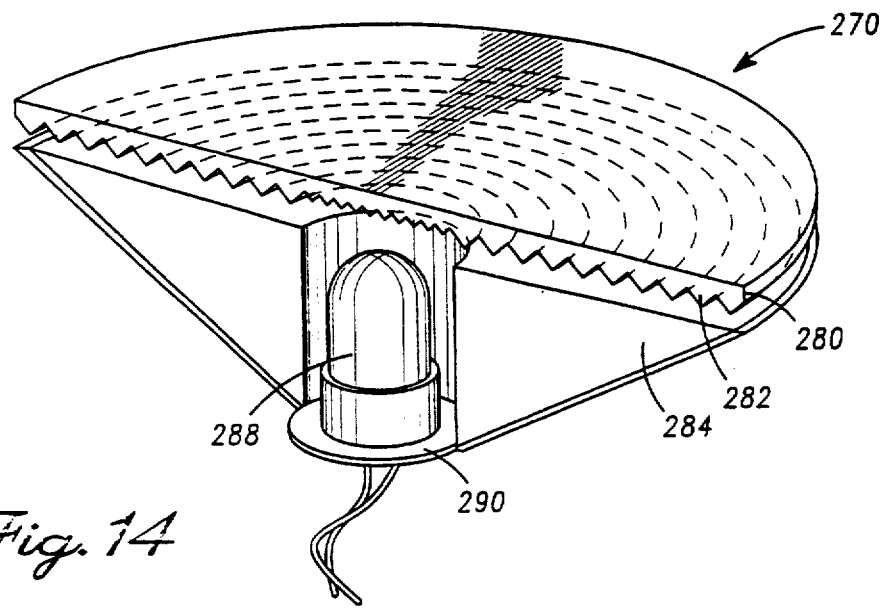
Fig. 14
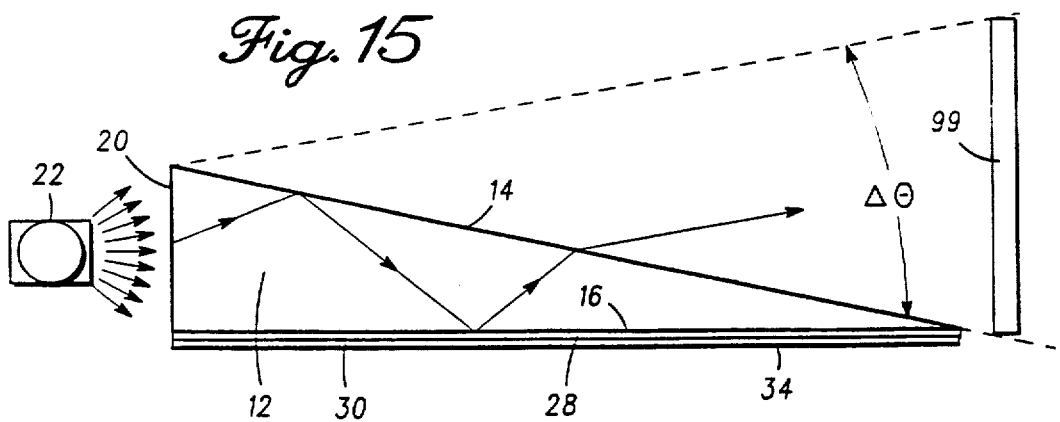
Fig. 15
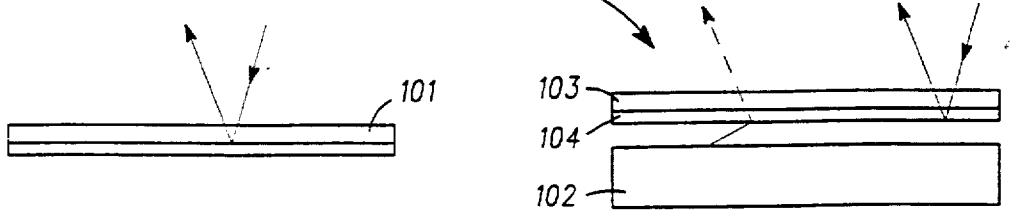
Fig. 16A
Fig. 16B